United States Patent
Sen et al.

(10) Patent No.: US 10,592,831 B2
(45) Date of Patent: Mar. 17, 2020

(54) METHODS AND SYSTEMS FOR RECOMMENDING ACTORS

(71) Applicant: Rovi Guides, Inc., San Carlos, CA (US)

(72) Inventors: Susanto Sen, Bangalore (IN); Gyanveer Singh, Bihar (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 302 days.

(21) Appl. No.: 15/655,619

(22) Filed: Jul. 20, 2017

(65) Prior Publication Data

US 2019/0026680 A1 Jan. 24, 2019

(51) Int. Cl.
| | | |
|---|---|---|
| G06Q 10/06 | (2012.01) | |
| H04N 21/466 | (2011.01) | |
| H04N 21/81 | (2011.01) | |
| G06F 16/35 | (2019.01) | |
| G06F 16/2457 | (2019.01) | |
| H04N 21/482 | (2011.01) | |

(52) U.S. Cl.
CPC ........... *G06Q 10/063112* (2013.01); *G06F 16/24578* (2019.01); *G06F 16/35* (2019.01); *G06Q 10/06398* (2013.01); *H04N 21/4668* (2013.01); *H04N 21/4821* (2013.01); *H04N 21/4828* (2013.01); *H04N 21/8133* (2013.01)

(58) Field of Classification Search
CPC .......... G06Q 10/00–50/00; H04N 1/00–21/00; G06F 1/00–21/00
USPC ................................................ 705/7.11–7.42
See application file for complete search history.

(56) References Cited

U.S. PATENT DOCUMENTS

| | | | |
|---|---|---|---|
| 5,754,939 A | * 5/1998 | Herz | G06Q 20/383 348/E7.056 |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 7,840,980 B2 | * 11/2010 | Gutta | H04N 7/163 706/54 |
| 8,046,801 B2 | 10/2011 | Ellis et al. | |

(Continued)

FOREIGN PATENT DOCUMENTS

EP 2763421 A1 * 8/2014 ........... H04N 21/251

*Primary Examiner* — Alan S Miller
(74) *Attorney, Agent, or Firm* — Haley Guiliano LLP

(57) ABSTRACT

Systems and methods are disclosed herein for updating, using a specific process that reduces the resource requirements and ensures recommendation relevancy, a particular database that is used for recommending actors. A media guidance application may infrequently search a set of irrelevant actors for an actor who can be classified as a promising actor. The media guidance application may add any promising actor to a set of promising actors. The media guidance application may more frequently search the set of promising actors for an actor who can be classified as a relevant actor. Upon identifying a relevant actor, the media guidance application may include the relevant actor in a set of relevant actors. The media guidance application may then recommend actors to a user based on actors included in the set of relevant actors.

20 Claims, 13 Drawing Sheets

(56) References Cited

U.S. PATENT DOCUMENTS

| | | | |
|---|---|---|---|
| 8,073,733 B1* | 12/2011 | Caland | G06Q 10/00 705/14.4 |
| 8,260,117 B1* | 9/2012 | Xu | H04N 21/4668 386/239 |
| 8,694,531 B1* | 4/2014 | Stearns | G06F 16/635 707/767 |
| 8,863,162 B2* | 10/2014 | Jagtiani | H04N 21/25891 725/13 |
| 9,756,394 B2* | 9/2017 | Jagtiani | H04N 21/25891 |
| 2002/0174430 A1 | 11/2002 | Ellis et al. | |
| 2003/0106058 A1* | 6/2003 | Zimmerman | H04N 7/163 725/46 |
| 2003/0110499 A1 | 6/2003 | Knudson et al. | |
| 2005/0251827 A1 | 11/2005 | Ellis et al. | |
| 2007/0112719 A1* | 5/2007 | Reich | G06Q 30/02 706/48 |
| 2008/0256579 A1* | 10/2008 | Verhaegh | H04N 5/44513 725/46 |
| 2009/0043725 A1* | 2/2009 | Gutta | H04N 7/163 706/54 |
| 2009/0064229 A1* | 3/2009 | Morris | H04N 7/17318 725/46 |
| 2009/0327193 A1* | 12/2009 | Eronen | G06Q 10/00 706/47 |
| 2010/0153885 A1 | 6/2010 | Yates | |
| 2010/0251305 A1* | 9/2010 | Kimble | H04N 7/17318 725/46 |
| 2011/0113051 A1* | 5/2011 | Lindahl | G11B 27/105 707/758 |
| 2011/0282759 A1* | 11/2011 | Levin | G06Q 30/02 705/26.41 |
| 2011/0320471 A1* | 12/2011 | Hiroi | H04N 21/4755 707/767 |
| 2012/0167141 A1* | 6/2012 | Arora | H04N 21/8133 725/40 |
| 2012/0222056 A1* | 8/2012 | Donoghue | H04N 5/44543 725/5 |
| 2014/0053209 A1 | 2/2014 | Young et al. | |
| 2014/0157295 A1* | 6/2014 | Jagtiani | H04N 21/25891 725/13 |
| 2015/0089543 A1* | 3/2015 | Westberg | H04N 5/44543 725/46 |
| 2015/0113013 A1 | 4/2015 | Rys et al. | |
| 2015/0227528 A1 | 8/2015 | Kang | |
| 2016/0179803 A1* | 6/2016 | Agarwal | G06F 16/48 707/728 |
| 2017/0171580 A1* | 6/2017 | Hirsch | H04N 21/252 |

* cited by examiner

METHODS AND SYSTEMS FOR RECOMMENDING ACTORS

BACKGROUND

In currently available media systems, a recommendation system may monitor information associated with actors to determine which actors to recommend. Given the plethora of actors, it is resource intensive to continuously monitor information associated with a huge data set of actors when selecting actors that are worth recommending. On the other hand, if the recommendation system monitors changes in actor information infrequently, the recommendation system may miss out on recommending actors who have recently become prominent and thus may not perform as well as other recommendation systems. Thus, current recommendation systems can be improved upon to optimize both the computational resource requirements and system performance. Furthermore, in some instances, a user may only be interested in content segments in which a recommended actor appears and in which the actor's quality of acting (e.g., good, bad, mediocre) is a pre-specified quality of acting. Current systems are limited to providing a user with content segments in which a selected actor appears and thus can be improved upon to provide content that is more customized to a user's preferences.

SUMMARY

Therefore, systems and methods are disclosed herein for updating, using a specific process that reduces the resource requirements and ensures recommendation relevancy, a particular database that is used for recommending actors. For example, a media guidance application may infrequently search a set of irrelevant actors for an actor who can be classified as a promising actor. The media guidance application may add any promising actor to a set of promising actors. The media guidance application may more frequently search the set of promising actors for an actor who can be classified as a relevant actor. Upon identifying a relevant actor, the media guidance application may include the relevant actor in a set of relevant actors. The media guidance application may then recommend actors to a user based on actors included in the set of relevant actors. By recommending actors from a smaller set of relevant actors, rather than a larger set of all available actors, the media guidance application requires fewer resources. Further resource savings is achieved by monitoring the set of irrelevant actors and the set of promising actors at different frequencies. By more frequently monitoring the set of promising actors, the media guidance application ensures that the media guidance application is not delayed in recommending an actor who has recently become relevant.

Furthermore, systems and methods are disclosed herein for providing a user with segments of content where the segments include a given actor and where the quality of acting of the given actor in the segments of content matches a user-specified quality of acting. For example, a user may wish to view media asset clips in which a given actor appears and in which the given actor acts poorly. The media guidance application may receive, from a user, a request for a media asset segment, where the request specifies an actor and a level of acting associated with the actor. For example, the user-specified level of acting associated with the actor may be below a threshold level of acting that is required for a given level of acting to be categorized as good acting. The media guidance application may determine a media asset in which the user-specified actor plays a leading role. The media guidance application may then determine a segment of the media asset in which the actor appears and in which a level of acting associated with the actor matches the user-specified level of acting. The media guidance application may generate for display the segment.

In some aspects, the media guidance application may be configured to recommend actors based on entries in a particular database. For example, the media guidance application may access a data set of irrelevant actors (e.g., C list actors and D list actors) to determine whether any one of actors in the data set has undergone a change in status and can now be considered to be a promising actor (e.g., a B list actor). As referred to herein, the term "irrelevant actors" refers to actors who are moderately famous or popular in their respective industries. As referred to herein, the term "relevant actors" refers to actors who are most famous in their respective industries. As referred to herein, the term "promising actors" refers to actors who are up and coming. "Promising actors" are more famous than "irrelevant actors" but not as famous as "relevant actors."

Specifically, the media guidance application may access an irrelevant actors database to determine whether the irrelevant actors database includes a promising actor, where the irrelevant actors database includes a first plurality of entries and where each entry of the first plurality of entries includes an actor identifier field and an actor score field. The actor identifier field and the actor score field associated with a given entry provide descriptive information about an actor associated with the given entry. ****Values corresponding to the actor identifier field may be any unique identifier that can be used to identify an actor. Values corresponding to the actor identifier field can be, but are not limited to, actor name, actor user name, actor nickname, actor ID number and any unique string of characters. The term "actor score," as used herein, is defined to mean a qualitative or quantitative indicator of an actor's degree of fame and/or relevance. For example, actor score may be fuzzy logic variables such as "moderately famous," "famous" and "very famous." The actor score may be a numerical value (e.g., five) on a predefined scale (e.g., scale ranging from zero to ten where zero corresponds to no fame and ten corresponds to maximum degree of fame). As an illustrative example, the irrelevant actors database may include an entry that has values "Chris Pratt" and "six" corresponding to the actor identifier field and the actor score field respectively. The irrelevant actors database may include another entry that has values "Famke Janssen" and "four" corresponding to the actor identifier field and the actor score field respectively. The irrelevant actors database may include yet another entry that has values "Jeff Daniels" and "three" corresponding to the actor identifier field and the actor score field respectively.

The media guidance application may retrieve two threshold values that define a minimum actor score required to be classified as a promising actor and a minimum actor score required to be classified as a relevant actor. Specifically, the media guidance application may retrieve a first threshold value, where the first threshold value corresponds to a minimum actor score required for including an actor in a promising actors database. For example, the media guidance application may access a threshold parameters data structure to retrieve the first threshold value. As a matter of example, the media guidance application may retrieve a value of five corresponding to the first threshold value. The promising actors database may include a second plurality of entries, where each entry of the second plurality of entries includes the actor identifier field and the actor score field.

As an illustrative example, promising actors database may include an entry that has values "Chris Messina" and "six" corresponding to the actor identifier field and the actor score field respectively. The promising actors database may include another entry that has values "Emily Blunt" and "six" corresponding to the actor identifier field and the actor score field respectively. The promising actors database may include yet another entry that has values "Rose Byrne" and "seven" corresponding to the actor identifier field and the actor score field respectively. The media guidance application may retrieve a second threshold value, where the second threshold value corresponds to a minimum actor score required for including an actor in a relevant actors database. For example, the media guidance application may access a threshold parameters data structure to retrieve the second threshold value. As a matter of example, the media guidance application may retrieve a value of seven corresponding to the second threshold value.

The media guidance application may search, at a low frequency, the irrelevant actors database for an actor with a score that matches the actor score range corresponding to a promising actor. The media guidance application may, upon identifying an actor in the irrelevant actors database who should be classified as a promising actor, delete the identified actor from the irrelevant actors database and include the identified actor in the promising actors database. Specifically, the media guidance application may search, at a first frequency, the irrelevant actors database for an actor associated with a first entry having a value corresponding to the actor score field that is between the first threshold value and the second threshold value. The media guidance application may retrieve, based on the searching, the first entry. For example, the media guidance application may query (e.g., by using database management languages such as SQL, JAPQL, CODASYL or another suitable language) the irrelevant actors database every six months for an actor who is associated with an actor score that is between five and seven.

As an illustrative example, the media guidance application may use SQL SELECT command (e.g., SELECT*FROM irrelevant actors WHERE actor score BETWEEN five AND seven) to perform the query. Following from the previous example, the media guidance application may receive, because the actor score associated with the actor Chris Pratt is six, the entry associated with actor Chris Pratt as a result of the query. In some embodiments, the query result may include a unique or specific identifier associated with the entry associated with actor Chris Pratt. In some embodiments, the media guidance application may receive, as a result of the query, a pointer or link to the entry associated with Chris Pratt, which the media guidance application may use to retrieve the entry associated with "Chris Pratt." The media guidance application may update the promising actors database by including the first entry in the promising actors database. The media guidance application may update the irrelevant actors database by deleting the first entry from the irrelevant actors database. For example, the media guidance application may delete the entry associated with Chris Pratt from the irrelevant actors database and include the entry associated with "Chris Pratt" in the promising actors database.

The media guidance application may update the scores of actors in the promising actors database and the media guidance application may search, at a higher frequency, the promising actors database for an actor with a score that matches the actor score range corresponding to a relevant actor. The media guidance application may, upon identifying an actor in the promising actors database who should be classified as a relevant actor, include the identified actor in the relevant actors database. Specifically, the media guidance application may update the actor score field corresponding to the second plurality of entries based on a pre-defined factor. In some embodiments, the pre-defined factor, based on which the actor score field associated with a given entry of the second plurality of entries is updated, may be a score assigned to a given actor, corresponding to a given entry, by a review source. For example, the pre-defined factor may be an actor rating assigned to Chris Pratt by an online movie review sources (e.g., the Internet Movie Database, IMDb which is a comprehensive online database of information related to movies, television programs, video games and other similar content).

In some embodiments, the pre-defined factor, based on which the actor score field associated with a given entry of the second plurality of entries is updated, may be number of media assets that the given actor has acted in. In some embodiments, the media guidance application may increase the actor score for given actor if the number of media assets that the given actor has acted in has increased. For example, the media guidance application may retrieve a total number of movies that actor Chris Pratt has acted in to date for determining Chris Pratt's actor score. For example, the media guidance application may determine, based on comparing the total number of movies Chris Pratt acted in at the current date with a total number of movies Chris Pratt had acted in at a previous current date, that number of movies that Chris Pratt has acted in has increased from ten to thirteen. Accordingly, the media guidance application may compute a new actor score for Chris Pratt.

In some embodiments, the pre-defined factor, based on which the actor score field associated with a given entry of the second plurality of entries is updated, may be popularity of a media assets in which the given actor has acted. In some embodiments, the media guidance application may increase the actor score for given actor if the given actor has recently acted in a popular media asset. For example, the media guidance application may determine, based on accessing a data structure associated with actor Chris Pratt, that Chris Pratt has recently acted in the movie "Jurassic Park." The media guidance application may determine, based on a review associated with the movie "Jurassic Park," that "Jurassic Park" is a popular movie. As an illustrative example, the media guidance application may access an online review website (e.g., Rotten Tomatoes) and retrieve a popularity indicator for "Jurassic Park" (e.g., audience rating of seventy-two percent) that indicates "Jurassic Park" was popular. Accordingly, the media guidance application may increase the actor score of Chris Pratt.

In some embodiments, the pre-defined factor, based on which the actor score field associated with a given entry of the second plurality of entries is updated, may be level of acting of the given actor. As an illustrative example, the media guidance application may determine that Chris Pratt has recently acted in the movie "Guardians of the Galaxy." The media guidance application may determine, based on natural language processing of reviews associated with "Guardians of the Galaxy," that Chris Pratt's acting in the movie was generally accoladed. The media guidance application may compute a new actor score based on these factors and update the entry associated with Chris Pratt. For example, the media guidance application may update value of the actor score field associated with Chris Pratt to eight.

In some embodiments, the pre-defined factor, based on which the actor score field associated with a given entry of the second plurality of entries is updated, may be popularity of the given actor. In some embodiments, the media guidance application may increase the actor score for given actor if popularity of the given actor has increased. For example, the media guidance application may retrieve an indicator of actor popularity and based on the retrieved indicator of actor popularity, compute a new actor score. As an illustrative example, the media guidance application may access a website associated with Chris Pratt (e.g., Chris Pratt's official website) and retrieve a number of people following the website. The media guidance application may determine, based on the number of people following the website, a popularity of the actor Chris Pratt.

In some embodiments, the pre-defined factor, based on which the actor score field associated with a given entry of the second plurality of entries is updated, may be salary of the given actor. In some embodiments, the media guidance application may increase the actor score for given actor if salary of the given actor has increased. In some embodiments, the pre-defined factor, based on which the actor score field associated with a given entry of the second plurality of entries is updated, may be number of pre-defined awards that the given actor has received. For example, the media guidance application may determine a number of pre-defined awards (e.g., Oscar, Golden Globe, Saturn award and other similar awards) that Chris Pratt has won and compute an actor score based on the number of awards won.

The media guidance application may search, at a second frequency, the promising actors database to determine whether the promising actors database includes a relevant actor, where the second frequency is greater than the first frequency. The media guidance application may retrieve the second threshold value. The media guidance application may determine whether the value corresponding to the actor score field associated with the first entry exceeds the second threshold value. Following from the previous example, the media guidance application may retrieve a value of seven for the second threshold value. The media guidance application may query (e.g., by using database management languages such as SQL, JAPQL, CODASYL or another suitable language) the promising actors database every month for an actor who is associated with an actor score that is greater than seven. Based on whether the query results include the first entry, the media guidance application may determine whether actor score associated with the first entry exceeds the second threshold value. Alternatively, the media guidance application may execute a Boolean comparison function that returns a true result upon determining that a given actor score is greater than the second threshold value to determine whether value of actor score field associated with the first entry exceeds the second threshold value.

Following from the previous example, the media guidance application may query the promising actors database for all entries that are associated with actor scores greater than seven. The media guidance application may receive, because the actor score associated with the actor Chris Pratt is eight, the entry associated with actor Chris Pratt as a result of the query. Accordingly, the media guidance application may determine that actor score associated with the entry corresponding to Chris Pratt exceeds the second threshold value. The media guidance application may, in response to determining that the value corresponding to the actor score field associated with the first entry exceeds the second threshold value, update the relevant actors database to include the first entry. The media guidance application may include the entry associated with "Chris Pratt" in the relevant actors database.

In some embodiments, there may be a single database of actors, where each entry in the single database of actor includes an actor identifier field, an actor score field and an actor status field. Possible values of the actor status field are irrelevant, promising and relevant. The media guidance application may, in manners described previously, search, at a first frequency, set of entries associated with value irrelevant in the actor status field for an actor associated with an actor score that is between a promising actor threshold score and a relevant actor threshold score. The media guidance application may, in response to identifying the actor associated with the actor score that is between the promising actor threshold score and the relevant actor threshold score, update the value of the actor status field of the identified actor to promising. The media guidance application may update, based on a plurality of factors, actor scores of actors included in the single database of actors. The media guidance application may search, at a second frequency greater than the first frequency, set of entries associated with value promising in the actor status field for an actor associated with an actor score that exceeds the relevant actor threshold score. The media guidance application may, in response to identifying an actor associated with an actor score that exceeds the relevant actor threshold score, update the value of the actor status field of the identified actor to relevant.

The media guidance application may receive a request for an actor recommendation. The media guidance application may, in response to receiving a request for an actor recommendation, provide the actor recommendation based on entries in the relevant actors database. The media guidance application may receive, upon a user selecting a selectable "receive actor recommendations" option, a request from a user for an actor recommendation. The media guidance application may then recommend an actor based on entries in the relevant actors database. For example, the media guidance application may recommend the actor Chris Pratt, who is now included in the relevant actors database, but not Famke Janssen, who is in the irrelevant actors database.

In some embodiments, the media guidance application may search the irrelevant actors database for an actor with a score that matches the actor score range corresponding to a relevant actor. The media guidance application may, upon identifying an actor in the irrelevant actors database who should be classified as a relevant actor, delete the identified actor from the irrelevant actors database and include the identified actor in the relevant actors database. Specifically, the media guidance application may search, at the first frequency, the irrelevant actors database for a second actor associated with a second entry having a value corresponding to the actor score field that exceeds the second threshold value. The media guidance application may retrieve, based on the searching for the second actor associated with a second entry, the second entry. The media guidance application may update the relevant actors database by including the second entry in the relevant actors database. The media guidance application may update the irrelevant actors database by deleting the second entry from the irrelevant actors database.

Following from the previous example where the second threshold value is seven, the media guidance application may query (e.g., by using database management languages such as SQL, JAPQL, CODASYL or another suitable language) the irrelevant actors database every six months for an actor associated with an actor score greater than seven. As an illustrative example, the irrelevant actors database may include an entry with values "Dwayne Johnson" and "eight" corresponding to the actor identifier field and actor score field respectively. The media guidance application may receive the entry associated with actor Dwayne Johnson as a result of the query and responsively, the media guidance application may delete the entry associated with Dwayne Johnson from the irrelevant actors database and include it in the relevant actors database instead.

In some embodiments, the media guidance application may periodically search the relevant actors database for actors who should no longer be classified as relevant actors. Upon identifying, in the relevant actors database, an actor who should no longer be classified as a relevant actor, the media guidance application may move, based on the actor score associated with the identified actor, the identified actor to either the promising actors database or the irrelevant actors database. Specifically, the media guidance application may search, at a third frequency, the relevant actors database for a third actor associated with a third entry having a value corresponding to the actor score field that is less than the second threshold value. In some embodiments, the third frequency may be less than the first frequency. In some embodiments, the third frequency may be greater than the second frequency. In some embodiments, the third frequency may be in between the first frequency and the second frequency. Following from the example where the second threshold value is seven, the media guidance application may query the relevant actors database every three months for an actor associated with an actor score of less than seven.

The media guidance application may retrieve, based on the searching for the third actor associated with a third entry, the third entry. The media guidance application may determine whether the value corresponding to the actor score field of the third entry is less than the first threshold value. As an illustrative example, the relevant actors database may include an entry with values "Will Smith" and "six" corresponding to the actor identifier field and actor score field respectively. The media guidance application may receive the entry associated with actor Will Smith as a result of the query and determine whether the actor score for Will Smith is less than the first threshold value of five. For example, the media guidance application may execute a Boolean comparison function that returns a true result upon determining that a given actor score is less than the first threshold value. For example, the media guidance application may receive a "false" result when the actor score for Will Smith (e.g., six) is compared with the first threshold value (e.g., five).

The media guidance application may, in response to determining that the value corresponding to the actor score field of the third entry is less than the first threshold value, update the irrelevant actors database by including the third entry in the irrelevant actors database. The media guidance application may, in response to determining that the value corresponding to the actor score field of the third entry is not less than the first threshold value, update the promising actors database by including the third entry in the promising actors database. The media guidance application may update the relevant actors database by deleting the third entry from the relevant actors database. In this instance, the media guidance application may determine that the actor score associated with actor Will Smith is between the first and second threshold values of five and seven respectively. Accordingly, the media guidance application may delete the entry associated with Will Smith from the relevant actors database and include it in the promising actors database instead.

In some embodiments, the media guidance application may determine an updated actor score of an actor by computing a weighted average of actor scores assigned to the actor by various review sources. Specifically, the media guidance application may, when updating the actor score field corresponding to a given entry of the second plurality of entries based on the pre-defined factor, retrieve a first actor score assigned to a given actor, corresponding to the given entry, by a first review source. The media guidance application may retrieve a first importance level associated with the first review source, where the first importance level is an indicator of how important inclusion of the first actor score is in the computation of a new actor score corresponding to the given actor. As an illustrative example, the media guidance application may retrieve an actor score of nine that has been assigned to Chris Pratt by the Internet Movie Database, an online review source. The importance level may be quantitative values of a scale of zero to four, where zero is corresponds to the lowest importance level. As a matter of example, the media guidance application may retrieve an importance level of three from? the Internet Movie Database.

In some embodiments, the first importance level may be based on popularity of the first review source. For example, importance level of a given review source may be directly proportional to popularity of the given review source. In some embodiments, the first importance level may be based on accuracy of the first review source. Some review sources may be more accurate than other review sources. More accurate review sources may be assigned greater importance levels than less accurate review sources. In some embodiments, the first importance level may be based on the entity providing the first review source. The entity providing the first review source may include, but is not limited to, a corporation, a private individual (e.g., a movie buff blogger), a public personality (e.g., an acclaimed movie critic), or a social media group (e.g., a social media group of novice movie reviewers). As a matter of example, an acclaimed movie critic may be given a greater importance level than a movie blogger. In some embodiments, the first importance level may be based on a user preference. A review source that matches user preferences may be given a higher importance level than a movie that does not match user preferences. As a matter of example, the media guidance application may determine, based on accessing a user's web browsing history, that the user regularly visits the Internet Movie Database homepage and rarely visits the homepage of Rotten Tomatoes, another online review source. Accordingly, the media guidance application may assign the Internet Movie Database a higher importance level than Rotten Tomatoes.

The media guidance application may retrieve a second score assigned to the given actor by a second review source. The media guidance application may retrieve a second importance level associated with the second review source, where the second importance level is an indicator of how important inclusion of the second actor score is in the computation of the new actor score corresponding to the given actor and wherein the second importance level is less than the first importance level. As an illustrative example, the media guidance application may retrieve an actor score of five that has been assigned to Chris Pratt by Rotten Tomatoes, an online review source. Following from the example where the importance level is defined on a scale of zero to four, the media guidance application may retrieve an importance level of one for Rotten Tomatoes.

The media guidance application may compute the new actor score, where the new actor score is a weighted average of the first actor score and the second actor score and where the first actor score is weighted more heavily than the second actor score. The media guidance application may determine, based on accessing a look-up table that defines the relationship between an importance level of a review source and a weighting factor for an actor score provided by the review source, a weighting factor for a given actor score. As an illustrative example, the media guidance application may determine that the actor score assigned by the Internet Movie Database has a weighting factor of seventy-five percent and the actor score assigned by Rotten Tomatoes has a weighting factor of twenty-five percent. Accordingly, the media guidance application may compute an updated actor score for Chris Pratt using the formula "actor score=[(seventy five-percent*IMDb actor score)+(twenty-five percent*Rotten Tomatoes actor score)]". In this instance, the media guidance application may compute an actor score of eight for Chris Pratt. The media guidance application may update the value of the actor score field corresponding to the given entry to the new actor score. For example, the media guidance application may update the value of the actor score field associated with Chris Pratt to eight.

In some embodiments, the media guidance application may recommend another actor whose most common role is the same as the most common role of an actor that the user likes. Specifically, the media guidance application may, when providing the actor recommendation based on entries in the relevant actors database, determine a user associated with the request for the actor recommendation. The media guidance application may determine a user associated with the request based on a unique identifier, such as a string of characters or bio-metric data (e.g., finger print, retina scan, voice recognition or other suitable bio-metric data), received from the user. As an illustrative example, the media guidance application may receive a user name "TD5774" from the user and determine, based on accessing a user profile associated with user name "TJ5774," that the user is Teddy Jones. Additionally and/or alternatively, the media guidance application may determine a user associated with the request based on an identifier associated with user equipment (e.g., a device identifier (ID), Internet protocol (IP) address and other suitable identifiers) on which the recommendation request is received. The media guidance application may determine the identity of the user by retrieving, based on the identifier associated with the user equipment, a unique user identifier associated with the user equipment. For example, the media guidance application may determine, based on the device ID of a user equipment, a log-in ID associated with a user who uses the user equipment. The media guidance application may then access a data structure (e.g., user's profile) associated with the user identifier to determine the identity of the user.

The media guidance application may access a media consumption history data structure, associated with the user, to determine a first actor that the user prefers. The media guidance application may identify the media consumption history data structure (e.g., the user's profile) associated with the user based on a unique identifier associated with the user. The Media consumption history data structure of the user may include information about the user's media consumption habits. For example, the media consumption history data structure may include information about the user's preferred media assets, genre, actor, director, producer, content sources, review sources and other similar information. As a matter of example, the media guidance application may determine, based on a list of preferred actors included in user Teddy Jones' user profile, that user Teddy Jones likes the actor Leonardo DiCaprio.

The media guidance application may determine a prominent role associated with the first actor, where the prominent role associated with the first actor is the most common role of the first actor. For example, the media guidance application may access a data structure associated with the first actor to retrieve a table that includes all media assets in which the first actor has featured and a role associated with the first actor corresponding to each media asset included in the table. The media guidance application may filter (e.g., using a filter function or a query function) the retrieved table based on different roles associated with the actor (e.g., leading actor, supporting character, cameo appearance and other suitable roles) and determine a number of media assets corresponding to each role associated with the actor. The media guidance application may then select the role that is associated with the highest number of media assets of the table as the prominent role associated with the first actor.

As an illustrative example, the media guidance application may retrieve, for Leonardo DiCaprio, a table that includes ten movies (e.g., a Leonardo DiCaprio movie table) as the complete table of all movies in which Leonardo DiCaprio has featured. The media guidance application may filter the "Leonardo DiCaprio movie table" for movies in which Leonardo DiCaprio played a supporting character. For example, the filtering may yield two results and accordingly, the media guidance application may determine that two media assets of the "Leonardo DiCaprio movie table" are associated with the supporting character role. Similarly, the media guidance application may filter the "Leonardo DiCaprio movie table" for movies in which Leonardo DiCaprio was the lead actor. The filtering may yield six results and accordingly, the media guidance application may determine that six media assets of the "Leonardo DiCaprio movie table" are associated with the leading actor role. The media guidance application may update the value of a counter associated with the supporting character role to two and value of a counter associated with the leading actor role to six. The media guidance application may repeat this process for all other roles associated with Leonardo DiCaprio in the Leonardo DiCaprio movie table. Once counters for all the roles have been updated, the media guidance application may determine (e.g., by executing a function that determines a counter with the maximum value) the counter with the maximum value. The media guidance application may select the role corresponding to the counter with the maximum value as the prominent role. For example, the media guidance application may determine, based on the Leonardo DiCaprio movie table, that the counter corresponding to leading actor role has the maximum value and accordingly, the media guidance application may determine that Leonardo DiCaprio's prominent role is leading actor.

The media guidance application may determine a plurality of actors, included in the relevant actors database, where the prominent role associated with each actor of the plurality of actors matches the prominent role of the first actor. The media guidance application may recommend a second actor of the plurality of actors. For example, each entry in the relevant actors database may include an additional prominent role field, where the value of the prominent role field of a given entry is the most common role corresponding to the actor associated with the given entry. The media guidance application may query, in manners discussed previously in relation to querying databases for actors associated with a specific range of actor score, the relevant actors database for entries that are associated with the prominent role of the first actor. As an illustrative example, the media guidance application may query the relevant actors database for actors who are associated with a value of leading actor in the prominent role field. As an illustrative example, the media guidance application may receive entries associated with actors Chris Pratt, Shah Rukh Khan and Jennifer Lawrence as a result of the query. The media guidance application may randomly select an actor returned by the query for recommendation to the user. For example, the media guidance application may recommend actor Chris Pratt.

In some embodiments, the media guidance application may use a probability distribution to determine the prominent role associated with an actor. The probability distribution may be either discrete or continuous. For example, in a given media asset, there are very few leading actors (male protagonist, female protagonist, antagonist) and very few background actors. Most of the actors may be supporting characters. As an illustrative example, the probability distribution of the different unique roles in a media asset (leading actor, supporting actor, background actor), where the different roles are ordered according to importance, may be a normal distribution. The media guidance application may, when determining a prominent role of a given actor, compute an average rank percentage of the given actor. The media guidance application may compute the rank percentage of the given actor in a given media asset using the formula (rank of actor in an ordered list of all actors in the given media asset/total number of actors in the media asset). The media guidance application may compute an average of rank percentages of the given actor in various media assets to determine the average rank percentage of the given actor. The media guidance application may then retrieve a pre-defined role probability distribution that provides probabilities of various roles in media assets. As an illustrative example, the role probability distribution may be a normal distribution where the most important roles are at the tail end of the distribution and the least important roles are at the head end of the distribution. The media guidance application may compute the cumulative probability range associated with each role in role probability distribution. For example, the cumulative probability range associated with roles leading actor, supporting actor, background actor may be zero to seven percent, thirty to seventy percent and ninety-three to hundred percent respectively. As an illustrative example, if the average rank percentage of the given actor is three percent, the actor would be classified as a lead actor.

Specifically, the media guidance application may, when determining the prominent role associated with a first actor, determine a first media asset in which the first actor appears. For example, the media guidance application may access a data structure associated with the first actor to retrieve a table that includes all media assets in which the first actor has featured. As a matter of example, the first actor may be Jennifer Lawrence and she may have appeared in two movies (e.g., "The Hunger Games" and "Silver Linings Playbook"). The media guidance application may select "The Hunger Games" as the first media asset. The media guidance application may retrieve a first credit list associated with the first media asset, where the first credit lists all actors appearing in the first media asset. The media guidance application may determining a first position of the first actor in the first credit list and a total number of actors in the first credit list. For example, the media guidance application may retrieve the credit list for "The Hunger Games" from a data structure associated with "The Hunger Games." For example, the data structure may be located at the media guidance data source. The media guidance application may determine, based on the credit list for "The Hunger Games," that there is a total of twenty-two actors in "The Hunger Games" and Jennifer Lawrence's rank in the credit list is one. The media guidance application may compute a first rank percentage of the first actor based on the first position of the first actor in the first credit list and the total number of actors in the first credit list. For example, the media guidance application may compute the first rank percentage using the formula (rank of first actor in first credit list/total number of actors in the first credit list). As an illustrative example, the media guidance application may compute the first rank to be four-and-half percent in this case.

The media guidance application may determine a second media asset in which the first actor appears. For example, the media guidance application may determine "Silver Linings Playbook" as the second media asset. The media guidance application may retrieve a second credit list associated with the second media asset, where the second credit lists all actors appearing in the second media asset. The media guidance application may determine a second position of the first actor in the second credit list and a total number of actors in the second credit list. For example, the media guidance application may retrieve the credit list for "Silver Linings Playbook" and determine that there is a total of twenty-eight actors in "Silver Linings Playbook" and Jennifer Lawrence's rank in the credit list is two. The media guidance application may compute a second rank percentage of the first actor based on the second position of the first actor in the second credit list and the total number of actors in the second credit list. The media guidance application may compute, in manners described previously in relation to computing the first rank percentage, a second rank percentage of seven-point-one percent for Jennifer Lawrence.

The media guidance application may compute, based on the first rank percentage and the second rank percentage, an average rank percentage of the first actor. In this example, the media guidance application may calculate an average rank percentage of five-point-eight. The media guidance application may retrieve a role probability distribution where the role probability distribution provides probabilities of various roles in media assets. As an illustrative example, the role probability distribution may be a pre-defined normal distribution where the most important roles (e.g., lead actor) are at the tail end of the distribution and the least important roles (e.g., background actor) are at the head end of the distribution. The media guidance application may determine a first role associated with the role probability distribution that has a cumulative probability range that includes the average rank percentage of the first actor. The media guidance application may select the first role as the prominent role. As a matter of example, the cumulative probability range associated with roles leading actor, supporting actor, background actor may be zero to seven percent, thirty to seventy percent and ninety-three to hundred percent respectively. In this example, the media guidance application may determine, because the average rank percentage of Jennifer Lawrence (e.g., five-point-eight percent) is included in the cumulative probability range associated with leading actor role (e.g., zero to seven percent), that the prominent role of Jennifer Lawrence is lead actor.

In some embodiments, the media guidance application may recommend another actor whose most common role and most common genre are the same as the most common role and most common genre of an actor that the user likes. Specifically, the media guidance application may, further, when recommending the second actor of the plurality of actors, determine a prominent genre associated with the first actor, where the prominent genre associated with the first actor is the most common genre associated with the first actor. The media guidance application may determine, in manners described previously in relation to determining the prominent role associated with the first actor, the prominent genre associated with the first actor. As an illustrative example, the media guidance application may determine that the prominent genre associated with Leonardo DiCaprio is drama. The media guidance application may determine an actor of the plurality of actors, where the prominent genre associated with the actor of the plurality of actors matches the prominent genre associated with the first actor. The media guidance application may select the actor of the plurality of actors as the second actor.

For example, each entry in the relevant actors database may include an additional prominent genre field, where the value of the prominent genre field of a given entry is the most common genre corresponding to the actor associated with the given entry. The media guidance application may query, in manners discussed previously in relation to querying databases for actors associated with a specific range of actor score, the entries corresponding to the plurality of actors for an actor that is associated with the prominent genre of the first actor. The media guidance application may select the actor of the plurality of actors as the second actor. As an illustrative example, the media guidance application may query the entries corresponding to the plurality of actors (e.g., Chris Pratt, Shah Rukh Khan and Jennifer Lawrence) for actors who are associated with a value of drama in the prominent genre field. The prominent genre associated with Chris Pratt, Shah Rukh Khan and Jennifer Lawrence may be drama, romantic comedy and action respectively. In this example, the media guidance application may receive the entry associated with actor Chris Pratt as a result of the query and recommend actor Chris Pratt.

In some embodiments, the media guidance application may recommend another actor whose most common role and most common media asset industry are the same as the most common role and most common media asset industry of an actor that the user likes. The term "media asset industry," as used herein, is defined to mean an entertainment industry involved in producing and distributing movies. Media asset industry may include, but is not limited to, geographically distinct film industries such as cinema of the United States (generally referred to as Hollywood), cinema of the United Kingdom, cinema of China, cinema of India (Bollywood), cinema of Nigeria, cinema of Persia and other suitable film industries. Media asset industry may include, but is not limited to, different streaming services such as Netflix, Hulu, Amazon Instant video and HBO. Media asset industry may include, but is not limited to, different production companies such as Time Warner, Sony, the Walt Disney Company and NBCUniversal.

Specifically, the media guidance application may further, when recommending the second actor of the plurality of actors, determine a prominent media asset industry associated with the first actor, where the prominent media asset industry associated with the first actor is the most common media asset industry associated with the first actor. The media guidance application may determine, in manners described previously in relation to determining the prominent role associated with the first actor, the prominent media asset industry associated with the first actor. As an illustrative example, the media guidance application may determine that the prominent media asset industry associated with Leonardo DiCaprio is Hollywood. The media guidance application may determine an actor of the plurality of actors, where the prominent media asset industry associated with the actor of the plurality of actors matches the prominent media asset industry associated with the first actor. The media guidance application may select the actor of the plurality of actors as the second actor.

For example, each entry in the relevant actors database may include an additional prominent media asset industry field, where the value of the prominent media asset industry field of a given entry is the most common media asset industry corresponding to the actor associated with the given entry. The media guidance application may query, in manners discussed previously in relation to querying databases for actors associated with a specific range of actor score, the entries corresponding to the plurality of actors for an actor that is associated with the prominent media asset industry of the first actor. As an illustrative example, the media guidance application may query the entries corresponding to the plurality of actors (e.g., Chris Pratt, Shah Rukh Khan and Jennifer Lawrence) for actors who are associated with a value of Hollywood in the prominent media asset industry field. The prominent media asset industry associated with Chris Pratt, Shah Rukh Khan and Jennifer Lawrence may be Hollywood, Bollywood and Hollywood respectively. In this example, the media guidance application may receive the entries associated with actors Chris Pratt and Jennifer Lawrence as a result of the query and recommend either Chris Pratt or Jennifer Lawrence.

In some embodiments, the media guidance application may recommend another actor whose most common role and most common level of acting are the same as the most common role and most common level of acting of an actor that the user likes. The term "level of acting," as used herein, is defined to mean a qualitative or quantitative indicator of an actor's quality of acting. For example, level of acting may be fuzzy logic variables such as "bad," "mediocre," "good" and "phenomenal." The actor score may be a numerical value (e.g., three) on a pre-defined scale (e.g., a scale ranging from zero to ten where zero corresponds to worst possible quality of acting and ten corresponds to best possible quality of acting).

Specifically, the media guidance application may further, when recommending the second actor of the plurality of actors, determine a prominent level of acting associated with the first actor, where the prominent level of acting associated with the first actor is the most common level of acting associated with the first actor. The media guidance application may determine, in manners described previously in relation to determining the prominent role associated with the first actor, the prominent level of acting associated with the first actor. As an illustrative example, the media guidance application may determine that the prominent level of acting associated with Leonardo DiCaprio is excellent. The media guidance application may determine an actor of the plurality of actors, where the prominent level of acting associated with the actor of the plurality of actors matches the prominent level of acting associated with the first actor. The media guidance application may select the actor of the plurality of actors as the second actor.

For example, each entry in the relevant actors database may include an additional prominent level of acting field, where the value of the prominent level of acting field of a given entry is the most common level of acting corresponding to the actor associated with the given entry. The media guidance application may query, in manners discussed previously in relation to querying databases for actors associated with a specific range of actor score, the entries corresponding to the plurality of actors for an actor that is associated with the prominent level of acting of the first actor. The media guidance application may select the actor of the plurality of actors as the second actor. As an illustrative example, the media guidance application may query the entries corresponding to the plurality of actors (e.g., Chris Pratt, Shah Rukh Khan and Jennifer Lawrence) for actors who are associated with a value of excellent in the prominent level of acting field. The prominent level of acting associated with Chris Pratt, Shah Rukh Khan and Jennifer Lawrence may be excellent, good and mediocre respectively. In this example, the media guidance application may receive the entry associated with actor Chris Pratt as a result of the query and recommend actor Chris Pratt.

In some embodiments, the media guidance application may recommend another actor whose most common role and gender are the same as the most common role and gender of an actor that the user likes. From the previous example, the media guidance application may recommend actor Chris Pratt because both most common role of both Chris Pratt and Leonardo DiCaprio is leading actor and both Chris Pratt and Leonardo DiCaprio are male. In this instance, the media guidance application may not recommend actor Jennifer Lawrence, who is female. In some embodiments, the media guidance application may recommend another actor who shares any combination of features with an actor that the user likes.

In some aspects, the media guidance application is configured to provide segments of content that are associated with a pre-specified quality of acting. The media guidance application may receive a request from a user for a media asset clip in which a given actor acted poorly. Specifically, the media guidance application may receive, from a user, a request for a media asset segment. The request may specify an actor and a level of acting associated with the actor, where the level of acting associated with the actor is below a threshold level of acting that is required for a given level of acting to be categorized as good acting. The threshold level of acting that is required for a given level of acting to be categorized as good acting may corresponding to a pre-defined minimum value that is required for given level of acting to be categorized as good acting. The media guidance application may retrieve, by accessing a default parameters data structure, the threshold level of acting. As a matter of example, for the case where quality of acting is quantified on a scale of zero to ten with zero being the worst possible quality, the media guidance application may retrieve a value of six corresponding to the threshold level of acting. For example, the media guidance application may receive a user input that indicates that the user would like to view a movie clip associated with actor Chris Pratt, where Chris Pratt's level of acting is "poor." The media guidance application may access a look-up table that defines a relationship between a qualitative indicator of level of acting and a quantitative indicator of level of acting, to convert the qualitative indicator of level of acting into a quantitative value. Following from the example where quality of acting is quantified on a scale of zero to ten, the media guidance application may determine, based on the look-up table, that the "poor" level of acting corresponds to values zero through three.

The media guidance application may search a data structure associated with the actor for a first media asset in which the actor plays a leading role. For example, the media guidance application may access a database (e.g., a media content data source database) where each entry includes information about a movie, contributors to the movie and roles of the contributors in the movie (e.g., lead actor, supporting actor, director). The media guidance application may then query the database, using database management languages (e.g., SQL, JAPQL, CODASYL or another suitable language), for an entry where actor Chris Pratt is a contributor and where the role of Chris Pratt is lead actor. As an illustrative example, the media guidance application may use the SQL SELECT command to perform this query. The media guidance application may receive an entry in which actor Chris Pratt is listed as a lead actor as a result of the query. In some embodiments, the query result may include a unique or specific identifier associated with the entry in which actor Chris Pratt is listed as a lead actor. In some embodiments, the media guidance application may receive, as a result of the query, a pointer or link to the entry in which actor Chris Pratt is listed as a lead actor, which the media guidance application may use to retrieve the entry. As an illustrative example, the media guidance application may receive the movie "Jurassic Park" in which Chris Pratt appear as a lead actor.

The media guidance application may determine, based on metadata associated with the first media asset, a plurality of segments of the first media asset in which the actor appears. For example, the media guidance application may parse metadata associated with "Jurassic Park" to retrieve the start time and end time of each segment of "Jurassic Park" in which Chris Pratt appears. The start time and end time may be time codes associated with frames in the media asset. For example, the time code may be in the format (hour:minute:second:frame) where the (hour:minute:second) portion indicates an amount of time elapsed from the start point of the media asset and (frame) identifies a frame associated with point in time indicated by the (hour:minute:second) portion. For example, the media guidance application may retrieve time codes (00:10:00:00) and (00:12:00:00) as the start time and end time respectively of a first segment of "Jurassic Park" in which Chris Pratt appears. The media guidance application may retrieve time codes (00:15:00:00) and (00:18:00:00) as the start time and end time respectively of a second segment of "Jurassic Park" in which Chris Pratt appears.

The media guidance application may identify a segment of the first media asset in which the given actor has acted poorly based on keywords in a review associated with the first media asset. Specifically, the media guidance application may retrieve a review associated with the first media asset. For example, the media guidance application may access a source that provides information about media assets to retrieve a review associated with the first media asset. A source that provides information about media assets can be, but is not limited to, online databases providing information related to media assets, social media platform, blogs and articles. For example, the media guidance application may access the Internet Movie Database (IMDb) to retrieve a review associated with "Jurassic Park."

In some embodiments, the media guidance application may use a review provided by a review source that the user prefers when identifying a segment of content associated with pre-specified quality of acting. Specifically, the media guidance application may, when retrieving a review associated with the first media asset, determine, based on accessing a data structure associated with the user, a review source preferred by the user. The media guidance application may access the review source preferred by the user to retrieve the review associated with the first media asset. For example, the media guidance application may determine, based on accessing the user's web browsing history, that the user regularly visits the website of Rotten Tomatoes but rarely visits the website of Internet Movie Database. Accordingly, the media guidance application may select Rotten Tomatoes as the review source preferred by the user. The media guidance application may then access the Rotten Tomatoes website to retrieve a review associated with "Jurassic Park."

In some embodiments, the media guidance application may parse the review for a portion of the review that is associated with the first segment. For example, the media guidance application may determine the portion of the review discussing Chris Pratt's first appearance in the movie "Jurassic Park" refers to the first segment with start and end time codes (00:10:00:00) and (00:12:00:00) respectively. The media guidance application may then extract, from the portion of the review, certain keywords that are frequently used to describe actor performances (e.g., "weak," "wooden," "stagy," "fake," "realistic," "layered" and other frequently used words for describing quality of acting). ****

In some embodiments, the media guidance application may analyze the context of a given keyword, using natural language processing techniques for example, to determine an entity that the given keyword is referring to. As an illustrative example, the media guidance application may use text mining techniques (e.g., named entity recognition, coreference, sentiment analysis, semantic analysis, etc.) to determine context of a given keyword. For example, the media guidance application may determine that the words "unrealistic" and "wooden" were used to describe Chris Pratt's acting in the first segment with start and end time codes of (00:10:00:00) and (00:12:00:00) respectively. The media guidance application may determine, based on keywords included in the review, a first level of acting associated with the actor in a first segment of the plurality of segments. As a matter of example, the media guidance application may use natural language processing to determine a degree of positivity corresponding to the keywords included in the review. The media guidance application may then access a look-up table that defines the relationship between a given degree of positivity and a corresponding level of acting to retrieve the first level of acting associated with the actor.

In some embodiments, the media guidance application may, when determining the first level of acting based on keywords included in the review, access a data structure that contains a score corresponding to each keyword of a plurality of keywords and determine scores corresponding to the keywords included in the review. The media guidance application may compute, based on the scores corresponding to the keywords included in the review, the first level of acting associated with the actor. As an illustrative example, the media guidance application may use a formula that averages scores associated with keywords to compute the first level of acting in the first segment. The media guidance application may access a look-up table containing numerical values corresponding to different keywords to determine a score associated with a given keyword. As an illustrative example, a look-up table may contain values, corresponding to keywords, on a scale of zero to ten, where a higher value corresponds to a higher quality of acting. For example, the media guidance application may retrieve values of two and three corresponding to the keywords "unrealistic" and "wooden" respectively. Accordingly, the media guidance application may compute a level of acting of two-and-a half for Chris Pratt's acting in segment of "Jurassic Park" with start and end time codes of (00:10:00:00) and (00:12:00:00) respectively.

The media guidance application may determine, based on comparing the first level of acting with the user-specified level of acting, whether the first level of acting associated with the actor in the first segment matches the user-specified level of acting. The media guidance application may, in response to determining that the first level of acting associated with the actor in the first segment matches the user-specified level of acting, generate for display the first segment. For example, the media guidance application may determine, based on comparing computed level of acting (e.g., two-and-a-half) with the level of acting received from the user (e.g., "poor" acting corresponding to range of zero through three level of acting), that Chris Pratt's acting in segment of "Jurassic Park" with start and end time codes of (00:10:00:00) and (00:12:00:00) respectively matches the user-specified level of acting. Accordingly, the media guidance application may display the segment of "Jurassic Park" with start and end time codes of (00:10:00:00) and (00:12:00:00) respectively to the user.

In some embodiments, the media guidance application may, upon receiving a request for segments of content that are associated with pre-specified quality of acting, provide segments from popular movies only. Specifically, the media guidance application may, when searching the data structure associated with the actor for the first media asset, retrieve a media asset popularity threshold score, where the media asset popularity threshold score corresponds to a minimum score required for any media asset to be categorized as a popular media asset. As an illustrative example, popularity score may be defined on a scale of zero to ten, with zero corresponding to the lowest popularity and ten corresponding to the highest popularity. The media guidance application may retrieve (e.g., by accessing a default parameters data structure) a media asset popularity threshold score of seven.

The media guidance application may retrieve a popularity score associated with a given media asset included in the data structure associated with the actor. Following from the previous example where the media guidance application retrieved "Jurassic Park" as a movie in which Chris Pratt appears, the media guidance application may retrieve a popularity score associated with "Jurassic Park." As a matter of example, the media guidance application may access review source IMDb and retrieve a popularity score of eight for "Jurassic Park." The media guidance application may determine whether the popularity score associated with the given media asset exceeds the media asset popularity threshold score. The media guidance application may, in response to determining that the popularity score associated with the given media asset exceeds the media asset popularity threshold score, select the given media asset as the first media asset. For example, the media guidance application may execute a Boolean comparison function that returns a "true" result upon determining that a given media asset popularity score is greater than the media asset popularity threshold score. In this case, the media guidance application may, responsive to receiving, upon comparing popularity score of "Jurassic Park" with the media asset popularity threshold score, a "true" result, select "Jurassic Park" as a movie from which to present to the user segment associated with actor Chris Pratt.

In some embodiments, the media guidance application may be configured to provide segments of content that are associated with both a pre-specified quality of acting and a characteristic that is of interest to the user. Specifically, the media guidance application may, when determining the plurality of segments of the first media asset in which the actor appears, determine, based on metadata associated with the first media asset, a second segment of the first media asset in which the actor appears. The media guidance application may determine, based on metadata associated with the first media asset, a plurality of characteristics associated with the second segment. As an illustrative example, the media guidance application may determine, in manners discussed previously, that Chris Pratt appears in a segment with the start time code and end time code of (00:20:00:00) and (00:22:00:00) respectively. The media guidance application may parse metadata associated with the segment with the start time code and end time code of (00:20:00:00) and (00:22:00:00) respectively for characteristics associated with the segment. For example, the segment with the start time code and end time code of (00:20:00:00) and (00:22:00:00) respectively may be a scene where Chris Pratt's character is chased by a dinosaur in a jungle. Accordingly, the media guidance application may retrieve "jungle," "action," "chase" and "dinosaur" as characteristics associated with the segment.

The media guidance application may determine, based on accessing a data structure associated with the user, a media asset preference of the user. The media asset preference of the user may be one of a genre, an event, a character, a second actor and a setting. For example, a user profile associated with the user may include a media asset preferences of the user. As a matter of example, the user profile associated with the user Teddy Jones may include media asset preferences such as action (genre), Leonardo DiCaprio (actor) and urban landscapes (setting). The media guidance application may determine, based on comparing the plurality of characteristics associated with the second segment with the media asset preference of the user, whether a characteristic associated with the second segment matches the media asset preference of the user.

As an illustrative example, the media guidance application may execute a function that iteratively queries a list of media asset preferences included in Teddy Jones' user profile for each characteristic associated with the segment with the start time code and end time code of (00:20:00:00) and (00:22:00:00) respectively. For example, the media guidance application may query the media asset preferences list for "jungle," "action," "chase" and "dinosaur" to determine if the media asset preferences list includes any of those characteristics. The media guidance application may, in response to determining that the characteristic associated with the second segment matches the media asset preference of the user, include the second segment in the plurality of segments of the first media asset in which the actor appears. For example, the media guidance application may receive a positive result for the characteristic "action" and responsively, the media guidance application may include the segment with start time code and end time code of (00:20:00:00) and (00:22:00:00) respectively in a list of segments of "Jurassic Park," associated with Chris Pratt, from which to select a segment for presentation to the user.

In some embodiments, the media guidance application may be configured to automatically display, after displaying a segment of a media asset that matched the user-specified quality of acting, a playlist of other media asset segments in which the level of acing of a lead actor matches the user-specified quality of acting. Specifically, the media guidance application may, subsequent to generating for display the first segment, automatically generate for display a playlist that includes a plurality of media asset segments, where the level of acting associated with each media asset segment of the plurality of media asset segments matches the user specified level of acting. Following from the previous example, after displaying a segment from "Jurassic Park" in which Chris Pratt acted poorly, the media guidance application may automatically display a playlist of other movie segments in which Chris Pratt acted poorly.

In some embodiments, the media guidance application may include, in a playlist automatically presented after display of a first media asset segment that matched the user-specified quality of acting, another media asset segment that is associated with the same actor and also included in the same media asset as the first media asset segment. Specifically, the media guidance application may, when determining a first media asset segment to include in the playlist, select a second segment of the plurality of segments of the first media asset in which the actor appears. For example, the media guidance application may determine, in manners discussed previously, Chris Pratt appears in a segment of "Jurassic Park" with start and end time codes of (00:23:00:00) and (00:24:00:00) respectively. The media guidance application may determine, based on keywords included in the review, a second level of acting associated with the actor in the second segment of the plurality of segments. For example, the media guidance application may retrieve a review for "Jurassic Park" from a review source (e.g., Rotten Tomatoes) and determine a portion of the review discussing the segment of "Jurassic Park" with start and end time codes of (00:23:00:00) and (00:24:00:00) respectively. As an illustrative example, the media guidance application may determine that the words "fake" and "ludicrous" were used to describe Chris Pratt's acting in the segment of "Jurassic Park" with start and end time codes of (00:23:00:00) and (00:24:00:00) respectively. Accordingly, the media guidance application may, in manners discussed previously in relation to determining a level of acting, compute a level of acting of one for Chris Pratt's acting in the segment of "Jurassic Park" with start and end time codes of (00:23:00:00) and (00:24:00:00) respectively.

The media guidance application may determine, based on comparing the second level of acting with the user-specified level of acting, whether the second level of acting associated with the actor in the second segment matches the user-specified level of acting. The media guidance application may, in response to determining that the second level of acting associated with the actor in the second segment matches the user-specified level of acting, include the second segment in the playlist. For example, the media guidance application may execute a Boolean comparison function to determine whether the computed level of acting (e.g., one) matches the level of acting received from the user (e.g., "poor" acting corresponding to range of zero through three level of acting). In this case, the media guidance application may, upon receiving a true result from the Boolean comparison function, determine that Chris Pratt's acting in the segment of "Jurassic Park" with start and end time codes of (00:23:00:00) and (00:24:00:00) respectively matches the user-specified level of acting. Accordingly, the media guidance application may include the segment of "Jurassic Park" with start and end time codes of (00:23:00:00) and (00:24:00:00) respectively in the playlist.

In some embodiments, the media guidance application may include, in a playlist automatically presented after display of a first media asset segment that matched the user-specified quality of acting, another media asset segment that is associated with the same actor as the first media asset segment but is from a different media asset. Specifically, the media guidance application may, when determining a first media asset segment to include in the playlist, search the data structure associated with the actor for a second media asset in which the actor plays a leading role. Following from the previous example, the media guidance application may determine, in manners described previously, that Chris Pratt is a lead actor in the movie "Passengers." The media guidance application may determine, based on metadata associated with the second media asset, a segment of the second media asset in which the actor appears. The media guidance application may retrieve a review associated with the second media asset. The media guidance application may determine, based on keywords included in the review associated with the second media asset, a second level of acting associated with the actor in the segment of the second media asset in which the actor appears.

As a matter of example, the media guidance application may determine, in manners discussed previously, that Chris Pratt appears in a segment of movie "Passengers" with start and end time codes of (00:3:00:00) and (00:4:00:00) respectively. The media guidance application may retrieve a review for "Passengers" from a review source (e.g., Internet Movie Database) and determine a portion of the review discussing the segment of "Passengers" with start and end time codes of (00:03:00:00) and (00:04:00:00) respectively. As an illustrative example, the media guidance application may determine that the words "unconvincing" and "trite" were used to describe Chris Pratt's acting in the segment of "Passengers" with start and end time codes of (00:03:00:00) and (00:04:00:00) respectively. Accordingly, the media guidance application may, in manners discussed previously in relation to determining a level of acting, compute a level of acting of one-and-a-half for Chris Pratt's acting in the segment of "Passengers" with start and end time codes of (00:03:00:00) and (00:04:00:00) respectively.

The media guidance application may determine, based on comparing the second level of acting with the user-specified level of acting, whether the second level of acting associated with the actor matches the user-specified level of acting. The media guidance application may, in response to determining that the second level of acting associated with the actor matches the user-specified level of acting, include the segment of the second media asset in the playlist. For example, the media guidance application may execute a Boolean comparison function to determine whether the computed level of acting (e.g., one-and-a-half) matches the level of acting received from the user (e.g., "poor" acting corresponding to range of zero through three level of acting). In this case, the media guidance application may, upon receiving a true result from the Boolean comparison function, determine that Chris Pratt's acting in segment of "Passengers" with start and end time codes of (00:03:00:00) and (00:04:00:00) respectively matches the user-specified level of acting. Accordingly, the media guidance application may include the segment of "Passengers" with start and end time codes of (00:03:00:00) and (00:04:00:00) respectively in the playlist.

In some embodiments, the media guidance application may include, in a playlist automatically presented after display of a first media asset segment that matched the user-specified quality of acting, another media asset segment that is associated with another lead actor who is similar to the lead actor in the first media asset segment. Specifically, the media guidance application may, when determining a first media asset segment to include in the playlist, determine another actor who shares a pre-defined characteristic with the actor specified by the user. The pre-defined characteristic may be, but is not limited to, a prominent genre, career trajectory, gender, school of acting, award and degree of popularity. As a matter of example, the prominent genre associated with Chris Pratt may be drama. The media guidance application may determine, in manners discussed previously in relation to determining prominent genre of a given actor, that the prominent genre associated with Leonardo DiCaprio is also drama. Accordingly, the media guidance application may select Leonardo DiCaprio as an actor similar to Chris Pratt.

The media guidance application may search a data structure associated with the another actor for a second media asset in which the another actor plays a leading role. The media guidance application may determine, in manners discussed previously, that Leonardo DiCaprio plays a leading role in the movie "Titanic". The media guidance application may determine, based on metadata associated with the second media asset, a segment of the second media asset in which the another actor appears. The media guidance application may retrieve a review associated with the second media asset. The media guidance application may determine, based on keywords included in the review associated with the second media asset, a level of acting associated with the another actor in the segment of the second media asset in which the another actor appears. The media guidance application may determine, in manners discussed previously, Leonardo DiCaprio appears in a segment of movie "Titanic" with start and end time codes of (00:55:00:00) and (00:57:00:00) respectively and compute a level of acting of one for Leonardo DiCaprio's acting in that segment.

The media guidance application may determine, based on comparing the level of acting associated with the another actor with the user-specified level of acting, whether the level of acting associated with the another actor matches the user-specified level of acting. The media guidance application may, in response to determining that the level of acting associated with the another actor matches the user-specified level of acting, include the segment of the second media asset in the playlist. For example, the media guidance application may execute a Boolean comparison function to determine whether the computed level of acting (e.g., one) matches the level of acting received from the user (e.g., "poor" acting corresponding to range of zero through three level of acting). In this case, the media guidance application may, upon receiving a true result from the Boolean comparison function, determine that Leonardo DiCaprio's acting in segment of "Titanic" with start and end time codes of (00:55:00:00) and (00:57:00:00) respectively matches the user-specified level of acting. Accordingly, the media guidance application may include the segment of "Titanic" with start and end time codes of (00:55:00:00) and (00:57:00:00) respectively in the playlist.

It should be noted that the systems, methods, apparatuses, and/or aspects described above may be applied to, or used in accordance with, other systems, methods, apparatuses, and/or aspects described in this disclosure. It should also be noted, the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 1A-1D show three data structures that the media guidance application may access for determining actor recommendations, in accordance with some embodiments of the disclosure;

DETAILED DESCRIPTION

Figure 2:
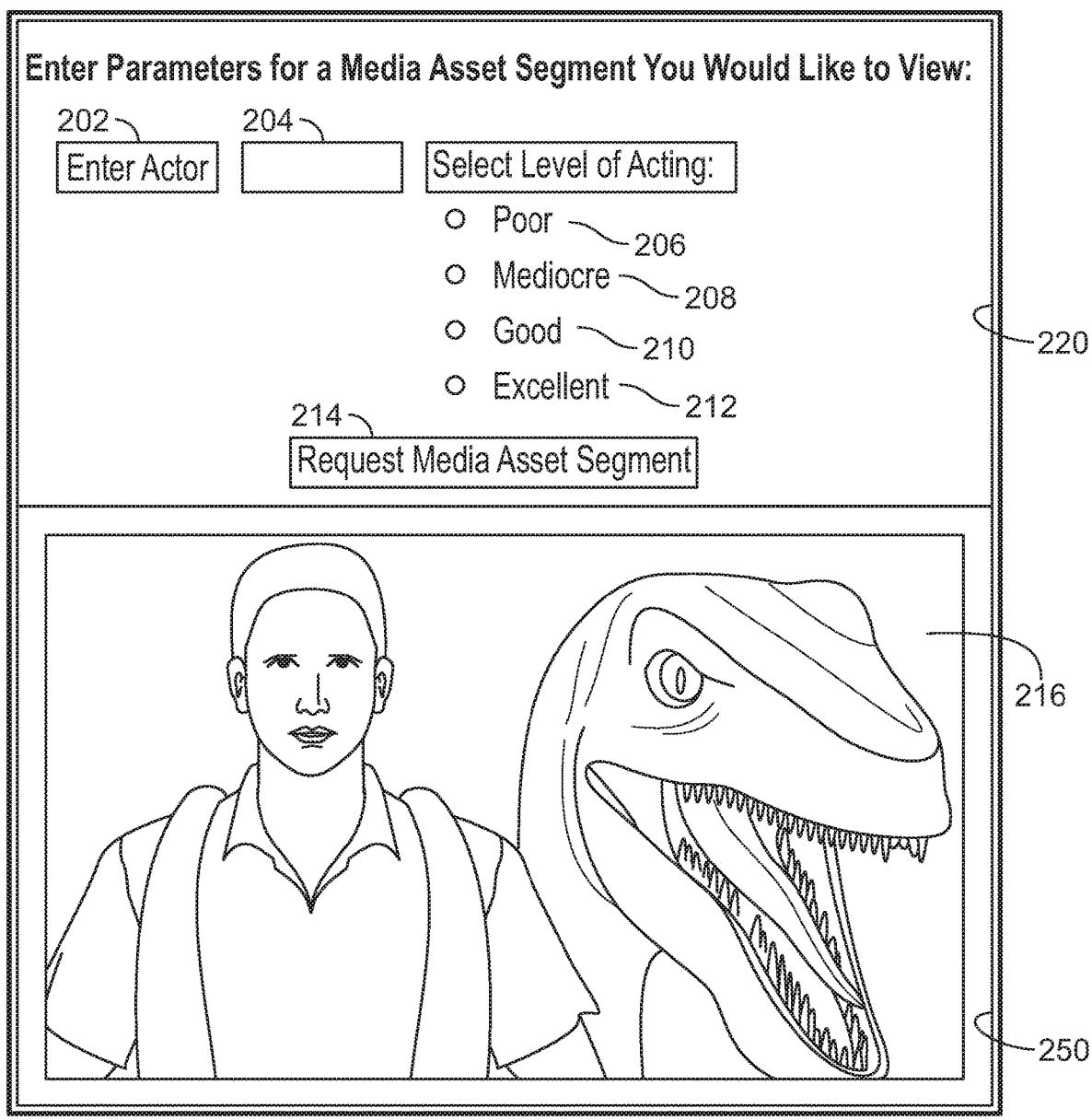
FIG. 2 depicts an illustrative display that the media guidance application may generate for display during presentation of segments of content associated with pre-specified quality of acting, in accordance with some embodiments of the disclosure.

The described systems and methods update, using a specific process that reduces the resource requirements and ensures recommendation relevancy, a particular database that is used for recommending actors. For example, the media guidance application may infrequently search a set of irrelevant actors for an actor who can be classified as a promising actor. The media guidance application may add any promising actor to a set of promising actors. The media guidance application may more frequently search the set of promising actors for an actor who can be classified as a relevant actor. Upon identifying a relevant actor, the media guidance application may include the relevant actor in a set of relevant actors. The media guidance application may then recommend actors to a user based on actors included in the set of relevant actors. By recommending actors from a smaller set of relevant actors, rather than a larger set of all available actors, the media guidance application requires fewer resources. Further resource savings is achieved by monitoring the set of irrelevant actors and the set of promising actors at different frequencies. By more frequently monitoring the set of promising actors, the media guidance application ensures that the media guidance application is not delayed in recommending an actor who has recently become relevant.

The described systems and methods also provide a user with segments of content where the segments include a given actor and where the quality of acting of the given actor in the segments of content matches a user-specified quality of acting. For example, a user may wish to view media asset clips in which a given actor appears and acts poorly. The media guidance application may receive, from a user, a request for a media asset segment, where the request specifies an actor and a level of acting associated with the actor. For example, the user-specified level of acting associated with the actor may be below a threshold level of acting that is required for a given level of acting to be categorized as good acting. The media guidance application may determine a media asset in which the user-specified actor plays a leading role. The media guidance application may then determine a segment of the media asset in which the actor appears and in which a level of acting associated with the actor matches the user-specified level of acting. The media guidance application may generate for display the segment.

Figures 1A, 1B, 1C, 1D:
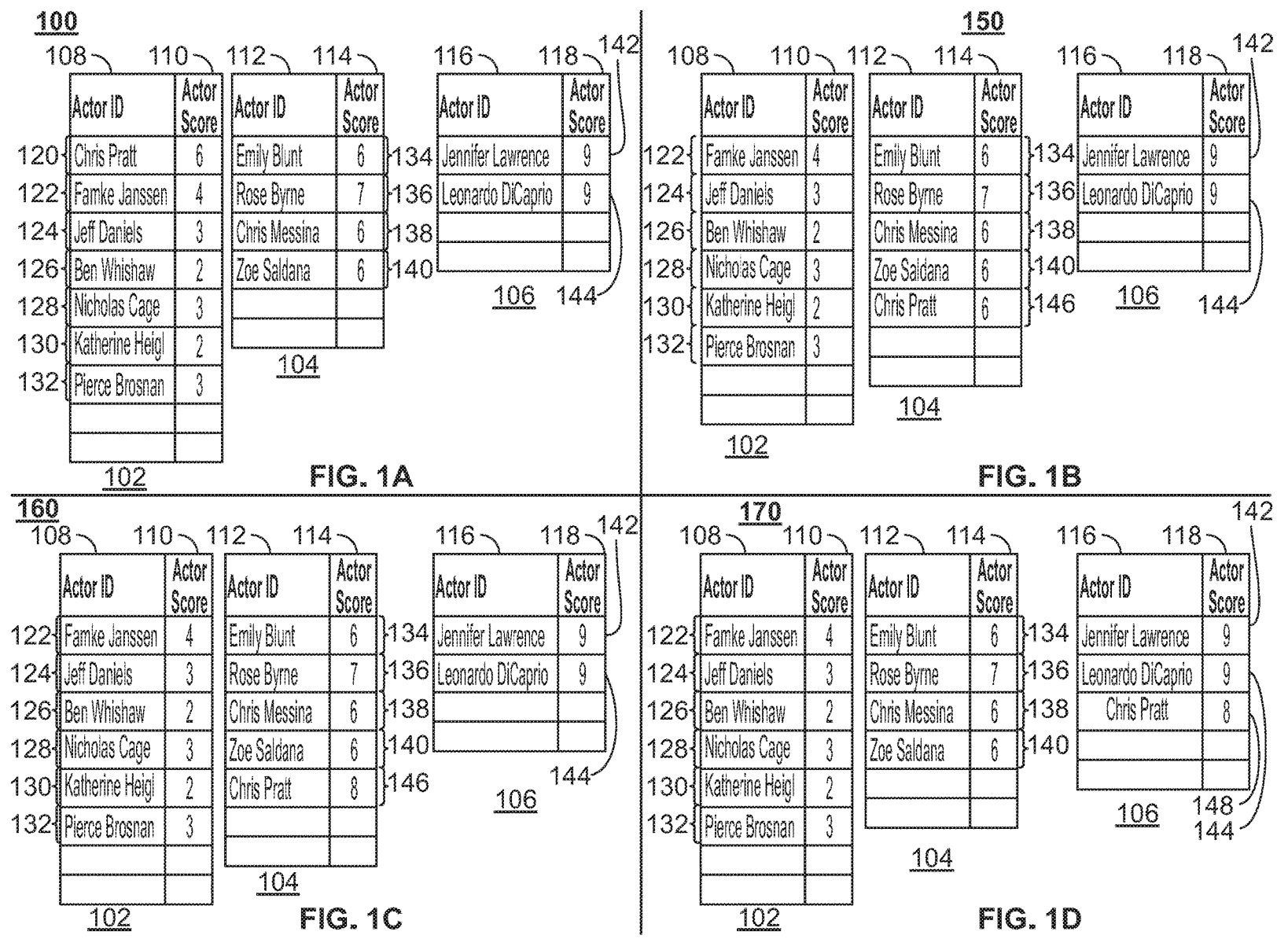

FIGS. 1A-1D show three data structures that the media guidance application may access for determining actor recommendations, in accordance with some embodiments of the disclosure. It should be noted that the data structures of FIGS. 1A-1D are used for illustrative purposes and other data structures may be used to illustrate the disclosed systems and methods. Specifically, information about media asset playback, interrupting events and segments of a media asset may be stored and categorized using other suitable data storage structures (e.g., linked lists, arrays) without departing from the scope of this disclosure. FIGS. 1A-1D depict the three different data structures (data structure 102, data structure 104 and data structure 106) at four time times-time 100, time 150, time 160 and time 170, where time 100 precedes time 150, which in turn precedes time 160, which in turn precedes time 170.

In some aspects, the media guidance application may be configured to recommend actors based on entries in a particular database. For example, the media guidance application may access data structure 102 (e.g., a data structure of irrelevant actors) to determine whether any one of the actors in data structure 102 has undergone a change in status and can now be considered to be a promising actor (e.g., a B list actor). Upon determining that a given actor in data structure 102 can be classified as a promising actor, the media guidance application may delete the entry associated with the given actor from data structure 102 and include it in data structure 104 (e.g., a data structure of promising actors) instead. The media guidance application may access data structure 104 to determine whether any one of the actors in data structure 104 has undergone a change in status and can now be considered to be a relevant actor (e.g., an A list actor). Upon determining that a given actor in data structure 104 can be classified as a relevant actor, the media guidance application may delete the entry associated with the given actor from data structure 104 and include it in data structure 106 (e.g., a data structure of relevant actors) instead. The media guidance application may then recommend actors based on entries in data structure 106. As referred to herein, the term "irrelevant actors" refers to actors who are moderately famous or popular their respective industries. As referred to herein, the term "relevant actors" refers to actors who are most famous in their respective industries. As referred to herein, the term "promising actors" refers to actors who are up-and-coming. "Promising actors" are more famous than "irrelevant actors" but not as famous as "relevant actors."

Specifically, the media guidance application may access an irrelevant actors database to determine whether the irrelevant actors database includes a promising actor, where the irrelevant actors database includes a first plurality of entries and where each entry of the first plurality of entries includes an actor identifier field and an actor score field. As an illustrative example, at time 100, data structure 102 may include entries 120, 122, 124, 126, 128, 130 and 132. Each entry in data structure 102 may include an actor ID 108 field and an actor score 110 field. The actor identifier field and the actor score field associated with a given entry provide descriptive information about an actor associated with the given entry. Values corresponding to the actor identifier field may be any unique identifier that can be used to identify an actor. Values corresponding to the actor identifier field can be, but are not limited to, actor name, actor user name, actor nickname, actor ID number and any unique string of characters.

The term "actor score," as used herein, is defined to mean a qualitative or quantitative indicator of an actor's degree of fame and/or relevance. For example, an actor score may be fuzzy logic variables such as "moderately famous," "famous" and "very famous." The actor score may be a numerical value (e.g., five) on a pre-defined scale (e.g., a scale ranging from zero to ten where zero corresponds to no fame and ten corresponds to maximum degree of fame). As an illustrative example, data structure 102, at time 100, may include entry 120 that has values "Chris Pratt" and "six" corresponding to the actor ID 108 field and actor score 110 field respectively. The data structure 102 may include another entry 122 that has values "Famke Janssen" and "four" corresponding to the actor ID 108 field and the actor score 110 field respectively. Data structure 102 may include yet another entry 124 that has values "Jeff Daniels" and "three" corresponding to the actor ID 108 field and the actor score 110 field respectively.

The media guidance application may retrieve two threshold values that define a minimum actor score required to be classified as a promising actor and a minimum actor score required to be classified as a relevant actor. Specifically, the media guidance application may retrieve a first threshold value, where the first threshold value corresponds to a minimum actor score required for including an actor in a promising actors database. For example, the media guidance application may access a threshold parameters data structure, located at any of storage 508, media content source 616 and media guidance data source 618, to retrieve the first threshold value. As a matter of example, the media guidance application may retrieve a value of five corresponding to the first threshold value. The promising actors database may include a second plurality of entries, where each entry of the second plurality of entries includes the actor identifier field and the actor score field. As an illustrative example, at time 100, data structure 104 may include entries 134, 136, 138 and 140. Each entry in data structure 104 may include an actor ID 112 field and an actor score 114 field.

As an illustrative example, data structure 104 (i.e., promising actors data structure) may include entry 138 that has values "Chris Messina" and "six" corresponding to the actor ID 112 field and the actor score 114 field respectively. The promising actors database may include another entry 134 that has values "Emily Blunt" and "six" corresponding to the actor ID 112 field and the actor score 114 field respectively. The promising actors database may include yet another entry 136 that has values "Rose Byrne" and "seven" corresponding to the actor ID 112 field and the actor score 114 field respectively. The media guidance application may retrieve a second threshold value, where the second threshold value corresponds to a minimum actor score required for including an actor in a relevant actors database. For example, the media guidance application may access a threshold parameters data structure, located at any of storage 508, media content source 616 and media guidance data source 618, to retrieve the second threshold value. As a matter of example, the media guidance application may retrieve a value of seven corresponding to the second threshold value.

The media guidance application may search, at a low frequency, the irrelevant actors database for an actor with a score that matches the actor score range corresponding to a promising actor. The media guidance application may, upon identifying an actor in the irrelevant actors database who should be classified as a promising actor, delete the identified actor from the irrelevant actors database and include the identified actor in the promising actors database. Specifically, the media guidance application may search, at a first frequency, the irrelevant actors database for an actor associated with a first entry having a value corresponding to the actor score field that is between the first threshold value and the second threshold value. The media guidance application may retrieve, based on the searching, the first entry. For example, the media guidance application may query (e.g., by using database management languages such as SQL, JAPQL, CODASYL or another suitable language) data structure 102 every six months for an actor who is associated with an actor score that is between five and seven.

As an illustrative example, the media guidance application may use SQL SELECT command (e.g., SELECT*FROM irrelevant actors WHERE actor score BETWEEN five AND seven) to perform the query. Following from the previous example, the media guidance application may receive, because the actor score associated with the actor Chris Pratt is six, entry 120 associated with actor Chris Pratt as a result of the query. In some embodiments, the query result may include a unique or specific identifier associated with entry 120 associated with actor Chris Pratt. In some embodiments, the media guidance application may receive, as a result of the query, a pointer or link to entry 120 associated with Chris Pratt, which the media guidance application may use to retrieve the entry associated with "Chris Pratt." The media guidance application may update the promising actors database by including the first entry in the promising actors database. The media guidance application may update the irrelevant actors database by deleting the first entry from the irrelevant actors database. For example, the media guidance application may delete entry 120 associated with Chris Pratt from data structure 102 (i.e., the irrelevant actors database) and include an entry associated with "Chris Pratt" in data structure 104. FIG. 1B depicts data structures 102, 104 and 106 following the update, at a time 150 later than time 100. Data structure 102 no longer includes an entry associated with Chris Pratt. Data structure 104 has been updated to include entry 146 associated with Chris Pratt.

The media guidance application may update the scores of actors in the promising actors database and the media guidance application may search, at a higher frequency, the promising actors database for an actor with a score that matches the actor score range corresponding to a relevant actor. The media guidance application may, upon identifying an actor in the promising actors database who should be classified as a relevant actor, include the identified actor in the relevant actors database. Specifically, the media guidance application may update the actor score field corresponding to the second plurality of entries based on a pre-defined factor. In some embodiments, the pre-defined factor, based on which the actor score field associated with a given entry of the second plurality of entries is updated, may be a score assigned to a given actor, corresponding to a given entry, by a review source. For example, the pre-defined factor may be an actor rating assigned to Chris Pratt by an online movie review sources (e.g., the Internet Movie Database (IMDb), which is a comprehensive online database of information related to movies, television programs, video games and other similar content).

In some embodiments, the pre-defined factor, based on which the actor score field associated with a given entry of the second plurality of entries is updated, may be number of media assets that the given actor has acted in. In some embodiments, the media guidance application may increase the actor score for a given actor if the number of media assets that the given actor has acted in has increased. For example, the media guidance application may retrieve a total number of movies that actor Chris Pratt has acted in to date for determining Chris Pratt's actor score. For example, the media guidance application may determine, based on comparing the total number of movies Chris Pratt acted in at the current date with a total number of movies Chris Pratt had acted in at a previous date, that the number of movies that Chris Pratt has acted in has increased from ten to thirteen. Accordingly, the media guidance application may compute a new actor score for Chris Pratt.

In some embodiments, the pre-defined factor, based on which the actor score field associated with a given entry of the second plurality of entries is updated, may be popularity of a media asset in which the given actor has acted. In some embodiments, the media guidance application may increase the actor score for given actor if the given actor has recently acted in a popular media asset. For example, the media guidance application may determine, based on accessing a data structure associated with actor Chris Pratt, located at any of storage 508, media content source 616 and media guidance data source 618, that Chris Pratt has recently acted in the movie "Jurassic Park." The media guidance application may determine, based on a review associated with the movie "Jurassic Park," that "Jurassic Park" is a popular movie. As an illustrative example, the media guidance application may access an online review website (e.g., Rotten Tomatoes) and retrieve a popularity indicator for "Jurassic Park" (e.g., an audience rating of seventy-two percent) that indicates "Jurassic Park" was popular. Accordingly, the media guidance application may increase the actor score of Chris Pratt.

In some embodiments, the pre-defined factor, based on which the actor score field associated with a given entry of the second plurality of entries is updated, may be the level of acting of the given actor. As an illustrative example, the media guidance application may determine that Chris Pratt has recently acted in the movie "Guardians of the Galaxy." The media guidance application may determine, based on natural language processing of reviews associated with "Guardians of the Galaxy," that Chris Pratt's acting in the movie was generally acclaimed. The media guidance application may compute a new actor score based on these factors and update the entry associated with Chris Pratt.

In some embodiments, the pre-defined factor, based on which the actor score field associated with a given entry of the second plurality of entries is updated, may be popularity of the given actor. In some embodiments, the media guidance application may increase the actor score for given actor if popularity of the given actor has increased. For example, the media guidance application may retrieve an indicator of actor popularity and, based on the retrieved indicator of actor popularity, compute a new actor score. As an illustrative example, the media guidance application may access a website associated with Chris Pratt (e.g., Chris Pratt's official website) and retrieve a number of people following the website. The media guidance application may determine, based on the number of people following the website, a popularity of the actor Chris Pratt.

In some embodiments, the pre-defined factor, based on which the actor score field associated with a given entry of the second plurality of entries is updated, may be the salary of the given actor. In some embodiments, the media guidance application may increase the actor score for given actor if the salary of the given actor has increased. In some embodiments, the pre-defined factor, based on which the actor score field associated with a given entry of the second plurality of entries is updated, may be the number of pre-defined awards that the given actor has received. For example, the media guidance application may determine a number of pre-defined awards (e.g., Oscar, Golden Globe, Saturn award and other similar awards) that Chris Pratt has won and compute an actor score based on the number of awards won. As an illustrative example, the media guidance application may update value of the actor score 114 field of entry 146, associated with Chris Pratt, to eight. FIG. 1C depicts data structures 102, 104 and 106 following the update to Chris Pratt's actor score, at a time 160 later than time 150.

The media guidance application may search, at a second frequency, the promising actors database to determine whether the promising actors database includes a relevant actor, where the second frequency is greater than the first frequency. The media guidance application may retrieve the second threshold value. The media guidance application may determine whether the value corresponding to the actor score field associated with the first entry exceeds the second threshold value. Following from the previous example, the media guidance application may retrieve a value of seven for the second threshold value. The media guidance application may query (e.g., by using database management languages such as SQL, JAPQL, CODASYL or another suitable language) data structure 104 (i.e., the promising actors database) every month for an actor who is associated with an actor score that is greater than seven. Based on whether the query results include the first entry, the media guidance application may determine whether the actor score associated with the first entry exceeds the second threshold value. Alternatively, the media guidance application may execute a Boolean comparison function that returns a true result upon determining that a given actor score is greater than the second threshold value to determine whether the value of the actor score field associated with the first entry exceeds the second threshold value.

Following from the previous example, the media guidance application may query data structure 104 (i.e., the promising actors database) for all entries that are associated with actor scores greater than seven. The media guidance application may receive, because the actor score associated with the actor Chris Pratt is eight, entry 146 associated with actor Chris Pratt as a result of the query. Accordingly, the media guidance application may determine that actor score associated with the entry corresponding to Chris Pratt exceeds the second threshold value. The media guidance application may, in response to determining that the value corresponding to the actor score field associated with the first entry exceeds the second threshold value, update the relevant actors database to include the first entry. The media guidance application may include the entry associated with "Chris Pratt" in the relevant actors database. For example, the media guidance application may delete entry 146 associated with Chris Pratt from data structure 104 (i.e., the promising actors database) and include an entry associated with "Chris Pratt" in data structure 106. FIG. 1D depicts data structures 102, 104 and 106 following the update, at a time 170 later than time 160. Data structure 104 no longer includes an entry associated with Chris Pratt. Data structure 106 has been updated to include entry 148 associated with Chris Pratt.

The media guidance application may receive a request for an actor recommendation. The media guidance application may, in response to receiving a request for an actor recommendation, provide the actor recommendation based on entries in the relevant actors database. The media guidance application may receive, upon a user selecting, via user input interface 510 on any of user television equipment 602, user computer equipment 604 and wireless user communications device 606, a selectable "receive actor recommendations" option, a request from a user for an actor recommendation. The media guidance application may then recommend an actor based on entries in the relevant actors database. For example, the media guidance application may recommend the actor Chris Pratt, who is now included in data structure 106 (i.e., the relevant actors database), but not Famke Janssen, who is included in data structure 102 (i.e., the irrelevant actors database).

In some embodiments, the media guidance application may search the irrelevant actors database or an actor with a score that matches the actor score range corresponding to a relevant actor. The media guidance application may, upon identifying an actor in the irrelevant actors database who should be classified as a relevant actor, delete the identified actor from the irrelevant actors database and include the identified actor in the relevant actors database. Specifically, the media guidance application may search, at the first frequency, the irrelevant actors database for a second actor associated with a second entry having a value corresponding to the actor score field that exceeds the second threshold value. The media guidance application may retrieve, based on the searching for the second actor associated with a second entry, the second entry. The media guidance application may update the relevant actors database by including the second entry in the relevant actors database. The media guidance application may update the irrelevant actors database by deleting the second entry from the irrelevant actors database.

Following from the previous example where the second threshold value is seven, the media guidance application may query (e.g., by using database management languages such as SQL, JAPQL, CODASYL or another suitable language) data structure 102 (i.e., the irrelevant actors database) every six months for an actor associated with an actor score greater than seven. As an illustrative example, data structure 102 (i.e., the irrelevant actors database) may include an entry with values "Dwayne Johnson" and "eight" (not shown in FIGS. 1A-1D) corresponding to the actor ID 108 field and actor 110 score field respectively. The media guidance application may receive the entry associated with actor Dwayne Johnson as a result of the query, and responsively, the media guidance application may delete the entry associated with Dwayne Johnson from data structure 102 and include it in data structure 106 (i.e., the relevant actors database) instead.

In some embodiments, the media guidance application may periodically search the relevant actors database for actors who should no longer be classified as relevant actors. Upon identifying, in the relevant actors database, an actor who should no longer be classified as a relevant actor, the media guidance application may move, based on an actor score associated with the identified actor, the identified actor to either the promising actors database or the irrelevant actors database. Specifically, the media guidance application may search, at a third frequency, the relevant actors database for a third actor associated with a third entry having a value corresponding to the actor score field that is less than the second threshold value. In some embodiments, the third frequency may be less than the first frequency. In some embodiments, the third frequency may be greater than the second frequency. In some embodiments, the third frequency may be in between the first frequency and the second frequency. Following from the example where the second threshold value is seven, the media guidance application may query data structure 106 (i.e., the relevant actors database) every three months for an actor associated with an actor score of less than seven.

The media guidance application may retrieve, based on the searching for the third actor associated with a third entry, the third entry. The media guidance application may determine whether the value corresponding to the actor score field of the third entry is less than the first threshold value. As an illustrative example, data structure 106 (i.e., the relevant actors database) may include an entry (not shown in FIGS. 1A-1D) with values "Will Smith" and "six" corresponding to the actor ID 116 field and actor score 118 field respectively. The media guidance application may receive the entry associated with actor Will Smith as a result of the query and determine whether the actor score for Will Smith is less than the first threshold value of five. For example, the media guidance application may execute a Boolean comparison function that returns a true result upon determining that a given actor is less than the first threshold value. For example, the media guidance application may receive a "false" result when actor score for Will Smith (e.g., six) is compared with the first threshold value (e.g., five).

The media guidance application may, in response to determining that the value corresponding to the actor score field of the third entry is less than the first threshold value, update the irrelevant actors database by including the third entry in the irrelevant actors database. The media guidance application may, in response to determining that the value corresponding to the actor score field of the third entry is not less than the first threshold value, update the promising actors database by including the third entry in the promising actors database. The media guidance application may update the relevant actors database by deleting the third entry from the relevant actors database. In this instance, the media guidance application may determine that the actor score associated with actor Will Smith is between the first and second threshold values of five and seven respectively. Accordingly, the media guidance application may delete the entry associated with Will Smith from data structure 106 (i.e., the relevant actors database) and include it in data structure 104 (i.e., the promising actors database) instead.

In some embodiments, the media guidance application may determine an updated actor score of an actor by computing a weighted average of actor scores assigned to the actor by various review sources. Specifically, the media guidance application may, when updating the actor score field corresponding to a given entry of the second plurality of entries based on the pre-defined factor, retrieve a first actor score assigned to a given actor, corresponding to the given entry, by a first review source. The media guidance application may retrieve a first importance level associated with the first review source, where the first importance level is an indicator of how important inclusion of the first actor score is in the computation of a new actor score corresponding to the given actor. As an illustrative example, the media guidance application may retrieve, from any of storage 508, media content source 616 and media guidance data source 618, an actor score of nine that has been assigned to Chris Pratt by the Internet Movie Database, an online review source. The importance level may be quantitative values of a scale of zero to four, where zero is corresponds to the lowest importance level. As a matter of example, the media guidance application may retrieve an importance level of three for the Internet Movie Database.

In some embodiments, the first importance level may be based on popularity of the first review source. For example, importance level of a given review source may be directly proportional to the popularity of the given review source. In some embodiments, the first importance level may be based on accuracy of the first review source. Some review sources may be more accurate than other review sources. More accurate review sources may be assigned greater importance levels than less accurate review sources. In some embodiments, the first importance level may be based on the entity providing the first review source. The entity providing the first review source may include, but is not limited to, a corporation, a private individual (e.g., a movie buff blogger), a public personality (e.g., an acclaimed movie critic), or a social media group (e.g., a social media group of novice movie reviewers). As a matter of example, an acclaimed movie critic may be given a greater importance level than movie blogger. In some embodiments, the first importance level may be based on a user preference. A review source that matches user preferences may be given a higher importance level than a movie that does not match user preferences. As a matter of example, the media guidance application may determine, based on accessing a user's web browsing history, that the user regularly visits the Internet Movie Database homepage and rarely visits homepage of Rotten Tomatoes, another online review source. Accordingly, the media guidance application may assign the Internet Movie Database a higher importance level than Rotten Tomatoes.

The media guidance application may retrieve a second score assigned to the given actor by a second review source. The media guidance application may retrieve a second importance level associated with the second review source, where the second importance level is an indicator of how important inclusion of the second actor score is in the computation of the new actor score corresponding to the given actor and wherein the second importance level is less than the first importance level. As an illustrative example, the media guidance application may retrieve, from any of storage 508, media content source 616 and media guidance data source 618, an actor score of five that has been assigned to Chris Pratt by Rotten Tomatoes, an online review source. Following from the example where the importance level is defined on a scale of zero to four, the media guidance application may retrieve an importance level of one for Rotten Tomatoes.

The media guidance application may compute the new actor score, where the new actor score is a weighted average of the first actor score and the second actor score and where the first actor score is weighted greater than the second actor score. The media guidance application may determine, based on accessing a look-up table that defines the relationship between an importance level of a review source and a weighting factor for an actor score provided by the review source, a weighting factor for a given actor score. As an illustrative example, the media guidance application may determine that the actor score assigned by the Internet Movie Database has a weighting factor of seventy-five percent and the actor score assigned by Rotten Tomatoes has a weighting factor of twenty-five percent. Accordingly, the media guidance application may compute an updated actor score for Chris Pratt using the formula "actor score=[(seventy five percent*IMDb actor score)+(twenty five percent*Rotten Tomatoes actor score)]". In this instance, the media guidance application may compute an actor score of eight for Chris Pratt. The media guidance application may update the value of the actor score field corresponding to the given entry to the new actor score. For example, the media guidance application may update the value of the actor score field associated with Chris Pratt to eight.

In some embodiments, the media guidance application may recommend another actor whose most common role is the same as the most common role of an actor that the user likes. Specifically, the media guidance application may, when providing the actor recommendation based on entries in the relevant actors database, determine a user associated with the request for the actor recommendation. The media guidance application may determine a user associated with the request based on an unique identifier, such as a string of characters or bio-metric data (e.g., finger print, retina scan, voice recognition or another suitable bio-metric data), received from the user. As an illustrative example, the media guidance application may receive a user name "TD5774" from the user and determine, based on accessing a user profile associated with user name "TJ5774," that the user is Teddy Jones. Additionally and/or alternatively, the media guidance application may determine a user associated with the request based on an identifier associated with user equipment (e.g., a device identifier (ID), Internet protocol (IP) address and other suitable identifiers) on which the recommendation request is received. The media guidance application may determine the identity of the user by retrieving, based on the identifier associated with the user equipment, a unique user identifier associated with the user equipment. For example, the media guidance application may determine, based on device ID of a user equipment, a log-in ID associated with a user who uses the user equipment. The media guidance application may then access a data structure (e.g., the user's profile located at any of storage 508, media content source 616 and media guidance data source 618) associated with the user identifier to determine identity of the user.

The media guidance application may access a media consumption history data structure, associated with the user, to determine a first actor that the user prefers. The media guidance application may identify the media consumption history data structure (e.g., the user's profile) associated with the user based on a unique identifier associated with the user. The media consumption history data structure of the user may include information about the user's media consumption habits. For example, the media consumption history data structure may include information about the user's preferred media assets, genre, actor, director, producer, content sources, review sources and other similar information. As a matter of example, the media guidance application may determine, based on a list of preferred actors included in user Teddy Jones' user profile, that user Teddy Jones likes the actor Leonardo DiCaprio.

The media guidance application may determine a prominent role associated with the first actor, where the prominent role associated with the first actor is the most common role of the first actor. For example, the media guidance application may access a data structure associated with the first actor, located at any of storage 508, media content source 616 and media guidance data source 618, to retrieve a table that includes all media assets in which the first actor has featured and a role associated with the first actor corresponding to each media asset included in the table. The media guidance application may filter (e.g., using a filter function or a query function) the retrieved table based on different roles associated with the actor (e.g., leading actor, supporting character, cameo appearance and other suitable roles) and determine a number of media assets corresponding to each role associated with the actor. The media guidance application may then select the role that is associated with the highest number of media assets of the table as the prominent role associated with the first actor.

As an illustrative example, the media guidance application may retrieve, for Leonardo DiCaprio, a table that includes ten movies (e.g., the Leonardo DiCaprio movie table) as the complete table of all movies in which Leonardo DiCaprio has featured. The media guidance application may filter the "Leonardo DiCaprio movie table" for movies in which Leonardo DiCaprio played a supporting character. For example, the filtering may yield two results and accordingly, the media guidance application may determine that two media assets of the "Leonardo DiCaprio movie table" are associated with the supporting character role. Similarly, the media guidance application may filter the "Leonardo DiCaprio movie table" for movies in which Leonardo DiCaprio was the lead actor. The filtering may yield six results and accordingly, the media guidance application may determine that six media assets of the "Leonardo DiCaprio movie table" are associated with the leading actor role. The media guidance application may update the value of a counter associated with the supporting character role to two and the value of a counter associated with the leading actor role to six. The media guidance application may repeat this process for all other roles associated with Leonardo DiCaprio in the Leonardo DiCaprio movie table. Once counters for all the roles have been updated, the media guidance application may determine (e.g., by executing a function that determines an entry with the maximum value) the counter with the maximum value. The media guidance application may select the role corresponding to the counter with the maximum value as the prominent role. For example, the media guidance application may determine, based on the Leonardo DiCaprio movie table, that the counter corresponding to the leading actor role has the maximum value and accordingly, the media guidance application may determine that Leonardo DiCaprio's prominent role is leading actor.

The media guidance application may determine a plurality of actors, included in the relevant actors database, where the prominent role associated with each actor of the plurality of actors matches the prominent role of the first actor. The media guidance application may recommend a second actor of the plurality of actors. For example, each entry in data structure 106 may include an additional prominent role field (not shown in FIGS. 1A-1D), where the value of the prominent role field of a given entry is the most common role corresponding to the actor associated with the given entry. The media guidance application may query, in manners discussed previously in relation to querying databases for actors associated with a specific range of actor score, data structure 106 for entries that are associated with the prominent role of the first actor. As an illustrative example, the media guidance application may query data structure 106 for actors who are associated with a value of leading actor in the prominent role field. As an illustrative example, the media guidance application may receive entries associated with actors Chris Pratt (entry 148), Shah Rukh Khan (not shown in FIGS. 1A-1D) and Jennifer Lawrence (entry 142) as a result of the query. The media guidance application may randomly select an actor returned by the query for recommendation to the user. For example, the media guidance application may recommend actor Chris Pratt.

In some embodiments, the media guidance application may use a probability distribution to determine the prominent role associated with an actor. The probability distribution may be either discrete or continuous. For example, in a given media asset, there are very few leading actors (male protagonist, female protagonist, antagonist) and very few background actors. Most of the actors may be supporting characters. As an illustrative example, the probability distribution of the different unique roles in a media asset (leading actor, supporting actor, background actor), where the different roles are ordered according to importance, may be a normal distribution. The media guidance application may, when determining a prominent role of a given actor, compute an average rank percentage of the given actor. The media guidance application may compute the rank percentage of the given actor in a given media asset using the formula (rank of actor in an ordered list of all actors in the given media asset/total number of actors in the media asset). The media guidance application may compute an average of rank percentages of the given actor in various media assets to determine the average rank percentage of the given actor. The media guidance application may then retrieve a predefined role probability distribution that provides probabilities of various roles in media assets. As an illustrative example, the role probability distribution may be a normal distribution where the most important roles are at the tail end of the distribution and the least important roles are at the head end of the distribution. The media guidance application may compute the cumulative probability range associated with each role in role probability distribution. For example, the cumulative probability range associated with roles leading actor, supporting actor, background actor may be zero to seven percent, thirty to seventy percent and ninety-three to hundred percent respectively. As an illustrative example, if the average rank percentage of the given actor is three percent, the actor would be classified as a lead actor.

Specifically, the media guidance application may, when determining the prominent role associated with a first actor, determine a first media asset in which the first actor appears. For example, the media guidance application may access a data structure associated with the first actor to retrieve a table that includes all media assets in which the first actor has featured. As a matter of example, the first actor may be Jennifer Lawrence and she may have appeared in two movies (e.g., "The Hunger Games" and "Silver Linings Playbook"). The media guidance application may select "The Hunger Games" as the first media asset. The media guidance application may retrieve a first credit list associated with the first media asset, where the first credit lists all actors appearing in the first media asset. The media guidance application may determining a first position of the first actor in the first credit list and a total number of actors in the first credit list. For example, the media guidance application may retrieve the credit list for "The Hunger Games" from a data structure associated with "The Hunger Games." For example, the data structure may be located at the media guidance data source. The media guidance application may determine, based on the credit list for "The Hunger Games," that there is a total of twenty-two actors in "The Hunger Games" and Jennifer Lawrence's rank in the credit list is one. The media guidance application may compute a first rank percentage of the first actor based on the first position of the first actor in the first credit list and the total number of actors in the first credit list. For example, the media guidance application may compute the first rank percentage using the formula (rank of first actor in first credit list/total number of actors in the first credit list). As an illustrative example, the media guidance application may compute the first rank to be four-and-half percent in this case.

The media guidance application may determine a second media asset in which the first actor appears. For example, the media guidance application may determine "Silver Linings Playbook" as the second media asset. The media guidance application may retrieve a second credit list associated with the second media asset, where the second credit lists all actors appearing in the second media asset. The media guidance application may determine a second position of the first actor in the second credit list and a total number of actors in the second credit list. For example, the media guidance application may retrieve the credit list for "Silver Linings Playbook" and determine that there is a total of twenty-eight actors in "Silver Linings Playbook" and Jennifer Lawrence's rank in the credit list is two. The media guidance application may compute a second rank percentage of the first actor based on the second position of the first actor in the second credit list and the total number of actors in the second credit list. The media guidance application may compute, in manners described previously in relation to computing the first rank percentage, a second rank percentage of seven-point-one percent for Jennifer Lawrence.

The media guidance application may compute, based on the first rank percentage and the second rank percentage, an average rank percentage of the first actor. In this example, the media guidance application may calculate an average rank percentage of five-point-eight. The media guidance application may retrieve a role probability distribution where the role probability distribution provides probabilities of various roles in media assets. As an illustrative example, the role probability distribution may be a pre-defined normal distribution where the most important roles (e.g., lead actor) are at the tail end of the distribution and the least important roles (e.g., background actor) are at the head end of the distribution. The media guidance application may determine a first role associated with the role probability distribution that has a cumulative probability range that includes the average rank percentage of the first actor. The media guidance application may select the first role as the prominent role. As a matter of example, the cumulative probability range associated with roles leading actor, supporting actor, background actor may be zero to seven percent, thirty to seventy percent and ninety-three to hundred percent respectively. In this example, the media guidance application may determine, because the average rank percentage of Jennifer Lawrence (e.g., five-point-eight percent) is included in the cumulative probability range associated with leading actor role (e.g., zero to seven percent), that the prominent role of Jennifer Lawrence is lead actor.

In some embodiments, the media guidance application may recommend another actor whose most common role and most common genre are the same as the most common role and most common genre of an actor that the user likes. Specifically, the media guidance application may further, when recommending the second actor of the plurality of actors, determine a prominent genre associated with the first actor, where the prominent genre associated with the first actor is most common genre associated with the first actor. The media guidance application may determine, in manners described previously in relation to determining the prominent role associated with the first actor, the prominent genre associated with the first actor. As an illustrative example, the media guidance application may determine that the prominent genre associated with Leonardo DiCaprio is drama. The media guidance application may determine an actor of the plurality of actors, where the prominent genre associated with the actor of the plurality of actors matches the prominent genre associated with the first actor. The media guidance application may select the actor of the plurality of actors as the second actor.

For example, each entry in data structure 106 (i.e., the relevant actors database) may include an additional prominent genre field (now shown in FIGS. 1A-1D), where the value of the prominent genre field of a given entry is the most common genre corresponding to the actor associated with the given entry. The media guidance application may query, in manners discussed previously in relation to querying databases for actors associated with a specific range of actor score, the entries corresponding to the plurality of actors for an actor that is associated with the prominent genre of the first actor. The media guidance application may select the actor of the plurality of actors as the second actor. As an illustrative example, the media guidance application may query the entries corresponding to the plurality of actors (e.g., Chris Pratt, Shah Rukh Khan and Jennifer Lawrence) for actors who are associated with a value of drama in the prominent genre field. The prominent genre associated with Chris Pratt, Shah Rukh Khan and Jennifer Lawrence may be drama, romantic comedy and action respectively. In this example, the media guidance application may receive the entry associated with actor Chris Pratt (entry 148) as a result of the query and recommend actor Chris Pratt.

In some embodiments, the media guidance application may recommend another actor whose most common role and most common media asset industry are the same as the most common role and most common media asset industry of an actor that the user likes. The term "media asset industry," as used herein, is defined to mean an entertainment industry involved in producing and distributing movies. Media asset industry may include, but is not limited to, geographically distinct film industries such as cinema of the United States (generally referred to as Hollywood), Cinema of the United Kingdom, Cinema of China, Cinema of India (Bollywood), Cinema of Nigeria, Cinema of Persia and other suitable film industries. Media asset industry may include, but is not limited to, different streaming services such as Netflix, Hulu, Amazon Instant video and HBO. Media asset industry may include, but is not limited to, different production companies such as Time Warner, Sony, the Walt Disney Company and NBCUniversal.

Specifically, the media guidance application may further, when recommending the second actor of the plurality of actors, determine a prominent media asset industry associated with the first actor, where the prominent media asset industry associated with the first actor is most common media asset industry associated with the first actor. The media guidance application may determine, in manners described previously in relation to determining the prominent role associated with the first actor, the prominent media asset industry associated with the first actor. As an illustrative example, the media guidance application may determine that the prominent media asset industry associated with Leonardo DiCaprio is Hollywood. The media guidance application may determine an actor of the plurality of actors, where prominent media asset industry associated with the actor of the plurality of actors matches the prominent media asset industry associated with the first actor. The media guidance application may select the actor of the plurality of actors as the second actor.

For example, each entry in data structure 106 (i.e., the relevant actors database) may include an additional prominent media asset industry field (not shown in FIGS. 1A-D), where value of prominent media asset industry field of a given entry is the most common media asset industry corresponding to the actor associated with the given entry. The media guidance application may query, in manners discussed previously in relation to querying databases for actors associated with a specific range of actor score, the entries corresponding to the plurality of actors for an actor that is associated with the prominent media asset industry of the first actor. As an illustrative example, the media guidance application may query the entries corresponding to the plurality of actors (e.g., Chris Pratt, Shah Rukh Khan and Jennifer Lawrence) for actors who are associated with a value of Hollywood in the prominent media asset industry field. The prominent media asset industry associated with Chris Pratt, Shah Rukh Khan and Jennifer Lawrence may be Hollywood, Bollywood and Hollywood respectively. In this example, the media guidance application may receive the entries associated with actors Chris Pratt and Jennifer Lawrence (entry 142 and entry 148) as a result of the query and recommend either Chris Pratt or Jennifer Lawrence.

In some embodiments, the media guidance application may recommend another actor whose most common role and most common level of acting are the same as the most common role and most common level of action of an actor that the user likes. The term "level of acting," as used herein, is defined to mean a qualitative or quantitative indicator of an actor's quality of acting. For example, level of acting may be fuzzy logic variables such as "bad" "mediocre," "good" and "phenomenal." The actor score may be a numerical value (e.g., three) on a pre-defined scale (e.g., a scale ranging from zero to ten where zero corresponds to worst possible quality of acting and ten corresponds to best possible quality of acting).

Specifically, the media guidance application may further, when recommending the second actor of the plurality of actors, determine a prominent level of acting associated with the first actor, where the prominent level of acting associated with the first actor is most common level of acting associated with the first actor. The media guidance application may determine, in manners described previously in relation to determining the prominent role associated with the first actor, the prominent level of acting associated with the first actor. As an illustrative example, the media guidance application may determine that the prominent level of acting associated with Leonardo DiCaprio is excellent. The media guidance application may determine an actor of the plurality of actors, where the prominent level of acting associated with the actor of the plurality of actors matches the prominent level of acting associated with the first actor. The media guidance application may select the actor of the plurality of actors as the second actor.

For example, each entry in data structure 106 (i.e., the relevant actors database) may include an additional prominent level of acting field, where value of prominent level of acting field of a given entry is the most common level of acting corresponding to the actor associated with the given entry. The media guidance application may query, in manners discussed previously in relation to querying databases for actors associated with a specific range of actor score, the entries corresponding to the plurality of actors for an actor that is associated with the prominent level of acting of the first actor. The media guidance application may select the actor of the plurality of actors as the second actor. As an illustrative example, the media guidance application may query the entries corresponding to the plurality of actors (e.g., Chris Pratt, Shah Rukh Khan and Jennifer Lawrence) for actors who are associated with a value of excellent in the prominent level of acting field. The prominent level of acting associated with Chris Pratt, Shah Rukh Khan and Jennifer Lawrence may be excellent, good and mediocre respectively. In this example, the media guidance application may receive the entry associated with actor Chris Pratt as a result of the query and recommend actor Chris Pratt.

In some embodiments, the media guidance application may recommend another actor whose most common role and gender are the same as the most common role and most common gender of an actor that the user likes. From the previous example, the media guidance application may recommend actor Chris Pratt because the most common role of both Chris Pratt and Leonardo DiCaprio is leading actor, and both Chris Pratt and Leonardo DiCaprio are male. In this instance, the media guidance application may not recommend actor Jennifer Lawrence, who is female. In some embodiments, the media guidance application may recommend another actor who shares any combination of features with an actor that the user likes.

FIG. 2 depicts an illustrative display that the media guidance application may generate for display during presentation of segments of content associated with a pre-specified quality of acting, in accordance with some embodiments of the disclosure. FIG. 2 depicts an illustrative display 200, which may be presented by control circuitry that executes a media guidance application on any user equipment. The functionality of user equipment, control circuitry, and the media guidance application is described in further detail below with respect to FIGS. 3-6. Control circuitry may cause display 200 to be presented using the one or more of the processes described in FIGS. 7-13. Display 200 may include a variety of displays such as displays 220 and 250.

Display 220 is an example of a display the media guidance application may generate for receiving a user selection of a given actor and a pre-specified quality of acting associated with the given actor. As an illustrative example, the media guidance application may include, in display 220, a prompt such as "Enter parameters for a media asset segment you would like to view" to instruct the user to provide the required parameters. The media guidance application may include, in display 220, enter actor 202 prompt with a text entry 204 option. The media guidance application may also include several selectable options (e.g., selectable option 206 [poor], selectable option 208 [mediocre], selectable option 210 [good], and selectable option 212 [excellent]) corresponding to various levels of acting to allow a user to specify a level of action. The media guidance application may include selectable option 214 (request media asset segment) to allow a user to request a media asset segment associated with the specified parameters. Display 250 is an example of a display the media guidance application may generate for presenting the user with the media asset segment that matches the parameters specified via display 220. As an illustrative example, the media guidance application may present media asset segment 216 in display 250.

In some aspects, the media guidance application is configured to provide segments of content that are associated with pre-specified quality of acting. The media guidance application may receive a request from a user for a media asset clip in which a given actor acted poorly. Specifically, the media guidance application may receive, from a user, a request for a media asset segment. The request may specify an actor and a level of acting associated with the actor, where the level of acting associated with the actor is below a threshold level of acting that is required for a given level of acting to be categorized as good acting. The threshold level of acting that is required for a given level of acting to be categorized as good acting may correspond to a predefined minimum value that is required for a given level of acting to be categorized as good acting. The media guidance application may retrieve, by accessing a default parameters data structure, the threshold level of acting.

As a matter of example, for the case where quality of acting is quantified on a scale of zero to ten with zero being the worst possible quality, the media guidance application may retrieve a value of six corresponding to the threshold level of acting. For example, the media guidance application may receive a user input, via display 220, that indicates that the user would like to view a movie clip associated with actor Chris Pratt (e.g., user enters "Chris Pratt" in text entry 204 option), where Chris Pratt's level of acting is "poor" (e.g., user selects selectable option 206). The media guidance application may access a look-up table, located at any of storage 508, media content source 616 and media guidance data source 618, that defines a relationship between a qualitative indicator of level of acting and a quantitative indicator of level of acting, to convert the qualitative indicator of level of acting into a quantitative value. Following from the example where quality of acting is quantified on a scale of zero to ten, the media guidance application may determine, based on the look-up table, that "poor" level of acting corresponds to values zero through three.

The media guidance application may search a data structure associated with the actor for a first media asset in which the actor plays a leading role. For example, the media guidance application may access a database (e.g., a media content data source database), located at any of storage 508, media content source 616 and media guidance data source 618, where each entry includes information about a movie, contributors to the movie and roles of the contributors in the movie (e.g., lead actor, supporting actor, director). The media guidance application may then query the database, using database management languages (e.g., SQL, JAPQL, CODASYL or another suitable language), for an entry where actor Chris Pratt is a contributor and where the role of Chris Pratt is a lead actor. As an illustrative example, the media guidance application may use the SQL SELECT command to perform this query. The media guidance application may receive an entry in which actor Chris Pratt is listed as a lead actor as a result of the query. In some embodiments, the query result may include a unique or specific identifier associated with the entry associated within which actor Chris Pratt is listed as a lead actor. In some embodiments, the media guidance application may receive, as a result of the query, a pointer or link to the entry in which actor Chris Pratt is listed as a lead actor, which the media guidance application may use to retrieve the entry. As an illustrative example, the media guidance application may receive the movie "Jurassic Park" in which Chris Pratt appears as a lead actor.

The media guidance application may determine, based on metadata associated with the first media asset, a plurality of segments of the first media asset in which the actor appears. For example, the media guidance application may parse metadata associated with "Jurassic Park" to retrieve the start time and end time of each segment of "Jurassic Park" in which Chris Pratt appears. The start time and end time may be time codes associated with frames in the media asset. For example, the time code may be in the format (hour:minute:second:frame) where (hour:minute:second) portion indicates an amount of time elapsed from start point of the media asset and (frame) identifies a frame associated with point in time indicated by the (hour:minute:second) portion. For example, the media guidance application may retrieve time codes (00:10:00:00) and (00:12:00:00) as the start time and end time respectively of a first segment of "Jurassic Park" in which Chris Pratt appears. As an illustrative example, the first segment of "Jurassic Park" in which Chris Pratt appears may be media asset segment 216. The media guidance application may retrieve time codes (00:15:00:00) and (00:18:00:00) as the start time and end time respectively of a second segment of "Jurassic Park" in which Chris Pratt appears.

The media guidance application may identify a segment of the first media asset in which the given actor has acted poorly based on keywords in a review associated with the first media asset. Specifically, the media guidance application may retrieve a review associated with the first media asset. For example, the media guidance application may access a source that provides information about media assets to retrieve a review associated with the first media asset. A source that provides information about media assets can be, but is not limited to, online databases providing information related to media assets, social media platforms, blogs and articles. For example, the media guidance application may access the Internet Movie Database (IMDb) to retrieve a review associated with "Jurassic Park."

In some embodiments, the media guidance application may use a review provided by a review source that the user prefers when identifying a segment of content associated with a pre-specified quality of acting. Specifically, the media guidance application may, when retrieving a review associated with the first media asset, determine, based on accessing a data structure associated with the user, a review source preferred by the user. The media guidance application may access the review source preferred by the user to retrieve the review associated with the first media asset. For example, the media guidance application may determine, based on accessing the user's web browsing history, located at any of storage 508, media content source 616 and media guidance data source 618, that the user regularly visits the website of Rotten Tomatoes but rarely visits the website of Internet Movie Database. Accordingly, the media guidance application may select Rotten Tomatoes as the review source preferred by the user. The media guidance application may then access the Rotten Tomatoes website to retrieve a review associated with "Jurassic Park."

In some embodiments, the media guidance application may parse the review for a portion of the review that is associated with the first segment. For example, the media guidance application may determine the portion of the review discussing Chris Pratt's first appearance in the movie "Jurassic Park" refers to media asset segment 216 (i.e., the first segment with the start and end time codes (00:10:00:00)

and (00:12:00:00) respectively). The media guidance application may then extract, from the portion of the review, certain keywords that are frequently used to describe actor performances (e.g., "weak," "wooden," "stagy," "fake," "realistic," "layered" and other frequently used words for describing quality of acting).

In some embodiments, the media guidance application may analyze the context of a given keyword, using natural language processing techniques for example, to determine an entity that the given keyword is referring to. As an illustrative example, the media guidance application may use text mining techniques (e.g., named entity recognition, coreference, sentiment analysis, semantic analysis, etc.) to determine context of a given keyword. For example, the media guidance application may determine that the words "unrealistic" and "wooden" were used to describe Chris Pratt's acting in media asset segment 216. The media guidance application may determine, based on keywords included in the review, a first level of acting associated with the actor in a first segment of the plurality of segments. As a matter of example, the media guidance application may use natural language processing to determine a degree of positivity corresponding to the keywords included in the review. The media guidance application may then access a look-up table that defines the relationship between a given degree of positivity and a corresponding level of acting to retrieve the first level of acting associated with the actor.

In some embodiments, the media guidance application may, when determining the first level of acting based on keywords included in the review, access a data structure that contains a score corresponding to each keyword of a plurality of keywords and determine scores corresponding to the keywords included in the review. The media guidance application may compute, based on the scores corresponding to the keywords included in the review, the first level of acting associated with the actor. As an illustrative example, the media guidance application may use a formula that averages scores associated with keywords to compute the first level of acting in the first segment. The media guidance application may access a look-up table, located at any of storage 508, media content source 616 and media guidance data source 618, containing numerical values corresponding to different keywords to determine a score associated with a given keyword. As an illustrative example, a look-up table may contain values, corresponding to keywords, on a scale of zero to ten, where a higher value corresponds to a higher quality of acting. For example, the media guidance application may retrieve values of two and three corresponding to the keywords "unrealistic" and "wooden" respectively. Accordingly, the media guidance application may compute a level of acting of two-and-a half for Chris Pratt's acting in media asset segment 216 of "Jurassic Park."

The media guidance application may determine, based on comparing the first level of acting with the user-specified level of acting, whether the first level of acting associated with the actor in the first segment matches the user-specified level of acting. The media guidance application may, in response to determining that the first level of acting associated with the actor in the first segment matches the user-specified level of acting, generate for display the first segment. For example, the media guidance application may determine, based on comparing a computed level of acting (e.g., two-and-a-half) with the level of acting received from the user (e.g., "poor" acting corresponding to range of zero through three level of acting), that Chris Pratt's acting in media asset segment 216 of "Jurassic Park" matches the user-specified level of acting. Accordingly, the media guidance application may display media asset segment 216 of "Jurassic Park" to the user in display 250.

In some embodiments, the media guidance application may, upon receiving a request for segments of content that are associated with a pre-specified quality of acting, provide segments from popular movies only. Specifically, the media guidance application may, when searching the data structure associated with the actor for the first media asset, retrieve a media asset popularity threshold score, where the media asset popularity threshold score corresponds to a minimum score required for any media asset to be categorized as a popular media asset. As an illustrative example, a popularity score may be defined on a scale of zero to ten, with zero corresponding to the lowest popularity and ten corresponding to the highest popularity. The media guidance application may retrieve (e.g., by accessing a default parameters data structure located at any of storage 508, media content source 616 and media guidance data source 618) a media asset popularity threshold score of seven.

The media guidance application may retrieve a popularity score associated with a given media asset included in the data structure associated with the actor. Following from the previous example where the media guidance application retrieved "Jurassic Park" as a movie in which Chris Pratt appears, the media guidance application may retrieve a popularity score associated with "Jurassic Park." As a matter of example, the media guidance application may access review source IMDb and retrieve a popularity score of eight for "Jurassic Park." The media guidance application may determine whether the popularity score associated with the given media asset exceeds the media asset popularity threshold score. The media guidance application may, in response to determining that the popularity score associated with the given media asset exceeds the media asset popularity threshold score, select the given media asset as the first media asset. For example, the media guidance application may execute a Boolean comparison function that returns a "true" result upon determining that a given popularity score is greater than the popularity threshold score. In this case, the media guidance application may, responsive to receiving, upon comparing the popularity score of "Jurassic Park" with the media asset popularity threshold score, a "true" result, select "Jurassic Park" as a movie from which to present the user segment associated with actor Chris Pratt.

In some embodiments, the media guidance application may be configured to provide segments of content that are associated with both a pre-specified quality of acting and a characteristic that is of interest to the user. Specifically, the media guidance application may, when determining the plurality of segments of the first media asset in which the actor appears, determine, based on metadata associated with the first media asset, a second segment of the first media asset in which the actor appears. The media guidance application may determine, based on metadata associated with the first media asset, a plurality of characteristics associated with the second segment. As an illustrative example, the media guidance application may determine, in manners discussed previously, that Chris Pratt appears in a segment with start time code and end time code of (00:20:00:00) and (00:22:00:00) respectively. The media guidance application may parse metadata associated with the segment with start time code and end time code of (00:20:00:00) and (00:22:00:00) respectively for characteristics associated with the segment. For example, the segment with start time code and end time code of (00:20:00:00) and (00:22:00:00) respectively may be a scene where Chris Pratt's character is chased by a dinosaur in a jungle. Accordingly, the media guidance application may retrieve "jungle," "action," "chase" and "dinosaur" as characteristics associated with the segment.

The media guidance application may determine, based on accessing a data structure associated with the user, a media asset preference of the user. The media asset preference of the user may be one of a genre, an event, a character, a second actor and a setting. For example, a user profile associated with the user may include media asset preferences of the user. As a matter of example, the user profile associated with the user Teddy Jones may include media asset preferences such as action (genre), Leonardo DiCaprio (actor) and urban landscapes (setting). The media guidance application may determine, based on comparing the plurality of characteristics associated with the second segment with a media asset preference of the user, whether a characteristic associated with the second segment matches the media asset preference of the user.

As an illustrative example, the media guidance application may execute a function that iteratively queries a list of media asset preferences included in Teddy Jones' user profile for each characteristic associated with the segment with start time code and end time code of (00:20:00:00) and (00:22:00:00) respectively. For example, the media guidance application may query the media asset preferences list for "jungle," "action," "chase" and "dinosaur" to determine if the media asset preferences list includes any of those characteristics. The media guidance application may, in response to determining that the characteristic associated with the second segment matches the media asset preference of the user, include the second segment in the plurality of segments of the first media asset in which the actor appears. For example, the media guidance application may receive a positive result for characteristic "action" and responsively, the media guidance application may include the segment with start time code and end time code of (00:20:00:00) and (00:22:00:00) respectively in a list of segments of "Jurassic Park," associated with Chris Pratt, from which to select a segment for presentation to the user.

In some embodiments, the media guidance application may be configured to automatically display, after displaying a segment of a media asset that matched the user-specified quality of acting, a playlist of other media asset segments in which the level of acting of a lead actor matches the user-specified quality of acting. Specifically, the media guidance application may, subsequent to generating for display the first segment, automatically generate for display a playlist that includes a plurality of media asset segments, where the level of acting associated with each media asset segment of the plurality of media asset segments matches the user-specified level of acting. Following from the previous example, after displaying media asset segment 216 from "Jurassic Park" in which Chris Pratt acted poorly, the media guidance application may automatically display a playlist of other movie segments in which Chris Pratt acted poorly.

In some embodiments, the media guidance application may include, in a playlist automatically presented after the display of a first media asset segment that matched the user-specified quality of acting, another media asset segment that is associated with the same actor and also included in the same media asset as the first media asset segment. Specifically, the media guidance application may, when determining a first media asset segment to include in the playlist, select a second segment of the plurality of segments of the first media asset in which the actor appears. For example, the media guidance application may determine, in manners discussed previously, Chris Pratt appears in a segment of "Jurassic Park" with start and end time codes of (00:23:00:00) and (00:24:00:00) respectively. The media guidance application may determine, based on keywords included in the review, a second level of acting associated with the actor in the second segment of the plurality of segments. For example, the media guidance application may retrieve a review for "Jurassic Park" from a review source (e.g., Rotten Tomatoes) and determine a portion of the review discussing the segment of "Jurassic Park" with start and end time codes of (00:23:00:00) and (00:24:00:00) respectively. As an illustrative example, the media guidance application may determine that the words "fake" and "ludicrous" were used to describe Chris Pratt's acting in the segment of "Jurassic Park" with start and end time codes of (00:23:00:00) and (00:24:00:00) respectively. Accordingly, the media guidance application may, in manners discussed previously in relation to determining a level of acting, compute a level of acting of one for Chris Pratt's acting in the segment of "Jurassic Park" with start and end time codes of (00:23:00:00) and (00:24:00:00) respectively.

The media guidance application may determine, based on comparing the second level of acting with the user-specified level of acting, whether the second level of acting associated with the actor in the second segment matches the user-specified level of acting. The media guidance application may, in response to determining that the second level of acting associated with the actor in the second segment matches the user-specified level of acting, include the second segment in the playlist. For example, the media guidance application may execute a Boolean comparison function to determine whether the computed level of acting (e.g., one) matches the level of acting received from the user (e.g., "poor" acting corresponding to range of zero through three level of acting). In this case, the media guidance application may, upon receiving a true result from the Boolean comparison function, determine that Chris Pratt's acting in the segment of "Jurassic Park" with start and end time codes of (00:23:00:00) and (00:24:00:00) respectively matches the user specified level of acting. Accordingly, the media guidance application may include the segment of "Jurassic Park" with start and end time codes of (00:23:00:00) and (00:24: 00:00) respectively in the playlist presented after the display of media asset segment 216.

In some embodiments, the media guidance application may include, in a playlist automatically presented after display of a first media asset segment that matched the user-specified quality of acting, another media asset segment that is associated with the same actor as the first media asset segment but is from a different media asset. Specifically, the media guidance application may, when determining a first media asset segment to include in the playlist, search the data structure associated with the actor for a second media asset in which the actor plays a leading role. Following from the previous example, the media guidance application may determine, in manners described previously, that Chris Pratt is a lead actor in the movie "Passengers." The media guidance application may determine, based on metadata associated with the second media asset, a segment of the second media asset in which the actor appears. The media guidance application may retrieve, from any of storage 508, media content source 616 and media guidance data source 618, a review associated with the second media asset. The media guidance application may determine, based on keywords included in the review associated with the second media asset, a second level of acting associated with the actor in the segment of the second media asset in which the actor appears.

As a matter of example, the media guidance application may determine, in manners discussed previously, that Chris Pratt appears in a segment of the movie "Passengers" with start and end time codes of (00:3:00:00) and (00:4:00:00) respectively. The media guidance application may retrieve a review for "Passengers" from a review source (e.g., Internet Movie Database) and determine a portion of the review discussing the segment of "Passengers" with start and end time codes of (00:03:00:00) and (00:04:00:00) respectively. As an illustrative example, the media guidance application may determine that the words "unconvincing" and "trite" were used to describe Chris Pratt's acting in the segment of "Passengers" with start and end time codes of (00:03:00:00) and (00:04:00:00) respectively. Accordingly, the media guidance application may, in manners discussed previously in relation to determining a level of acting, compute a level of acting of one-and-a-half for Chris Pratt's acting in the segment of "Passengers" with start and end time codes of (00:03:00:00) and (00:04:00:00) respectively.

The media guidance application may determine, based on comparing the second level of acting with the user-specified level of acting, whether the second level of acting associated with the actor matches the user-specified level of acting. The media guidance application may, in response to determining that the second level of acting associated with the actor matches the user-specified level of acting, include the segment of the second media asset in the playlist. For example, the media guidance application may execute a Boolean comparison function to determine whether the computed level of acting (e.g., one-and-a-half) matches the level of acting received from the user (e.g., "poor" acting corresponding to a range of zero through three level of acting). In this case, the media guidance application may, upon receiving a true result from the Boolean comparison function, determine that Chris Pratt's acting in the segment of "Passengers" with start and end time codes of (00:03:00:00) and (00:04:00:00) respectively matches the user-specified level of acting. Accordingly, the media guidance application may include the segment of "Passengers" with start and end time codes of (00:03:00:00) and (00:04:00:00) respectively in the playlist presented after the display of media asset segment 216.

In some embodiments, the media guidance application may include, in a playlist automatically presented after display of a first media asset segment that matched the user-specified quality of acting, another media asset segment that is associated with another lead actor who is similar to the lead actor in the first media asset segment. Specifically, the media guidance application may, when determining a first media asset segment to include in the playlist, determine another actor who shares a pre-defined characteristic with the actor specified by the user. In some embodiments, the media guidance application may access data structure 106 to determine the another actor who shares a pre-defined characteristic with the actor specified by the user. The pre-defined characteristic may be, but is not limited to, a prominent genre, career trajectory, gender, school of acting, award and degree of popularity. As a matter of example, the prominent genre associated with Chris Pratt may be drama. The media guidance application may determine, in manners discussed previously in relation to determining prominent genre of a given actor, that prominent genre associated with Leonardo DiCaprio is also drama. Accordingly, the media guidance application may select Leonardo DiCaprio as an actor similar to Chris Pratt.

The media guidance application may search a data structure associated with the another actor for a second media asset in which the another actor plays a leading role. The media guidance application may determine, in manners discussed previously, that Leonardo DiCaprio plays a leading role in the movie "Titanic." The media guidance application may determine, based on metadata associated with the second media asset, a segment of the second media asset in which the another actor appears. The media guidance application may retrieve, from any of storage 508, media content source 616 and media guidance data source 618, a review associated with the second media asset. The media guidance application may determine, based on keywords included in the review associated with the second media asset, a level of acting associated with the another actor in the segment of the second media asset in which the another actor appears. The media guidance application may determine, in manners discussed previously, Leonardo DiCaprio appears in a segment of movie "Titanic" with start and end time codes of (00:55:00:00) and (00:57:00:00) respectively and compute a level of acting of one for Leonardo DiCaprio's acting in that segment.

The media guidance application may determine, based on comparing the level of acting associated with the another actor with the user specified level of acting, whether the level of acting associated with the another actor matches the user specified level of acting. The media guidance application may, in response to determining that the level of acting associated with the another actor matches the user specified level of acting, include the segment of the second media asset in the playlist. For example, the media guidance application may execute a Boolean comparison function to determine whether the computed level of acting (e.g., one) matches the level of acting received from the user (e.g., "poor" acting corresponding to range of zero through three level of acting). In this case, the media guidance application may, upon receiving a true result from the Boolean comparison function, determine that Leonardo DiCaprio's acting in segment of "Titanic" with start and end time codes of (00:55:00:00) and (00:57:00:00) respectively match the user specified level of acting. Accordingly, the media guidance application may include the segment of "Titanic" with start and end time codes of (00:55:00:00) and (00:57:00:00) respectively in the playlist presented after the display of media asset segment 216.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 3:
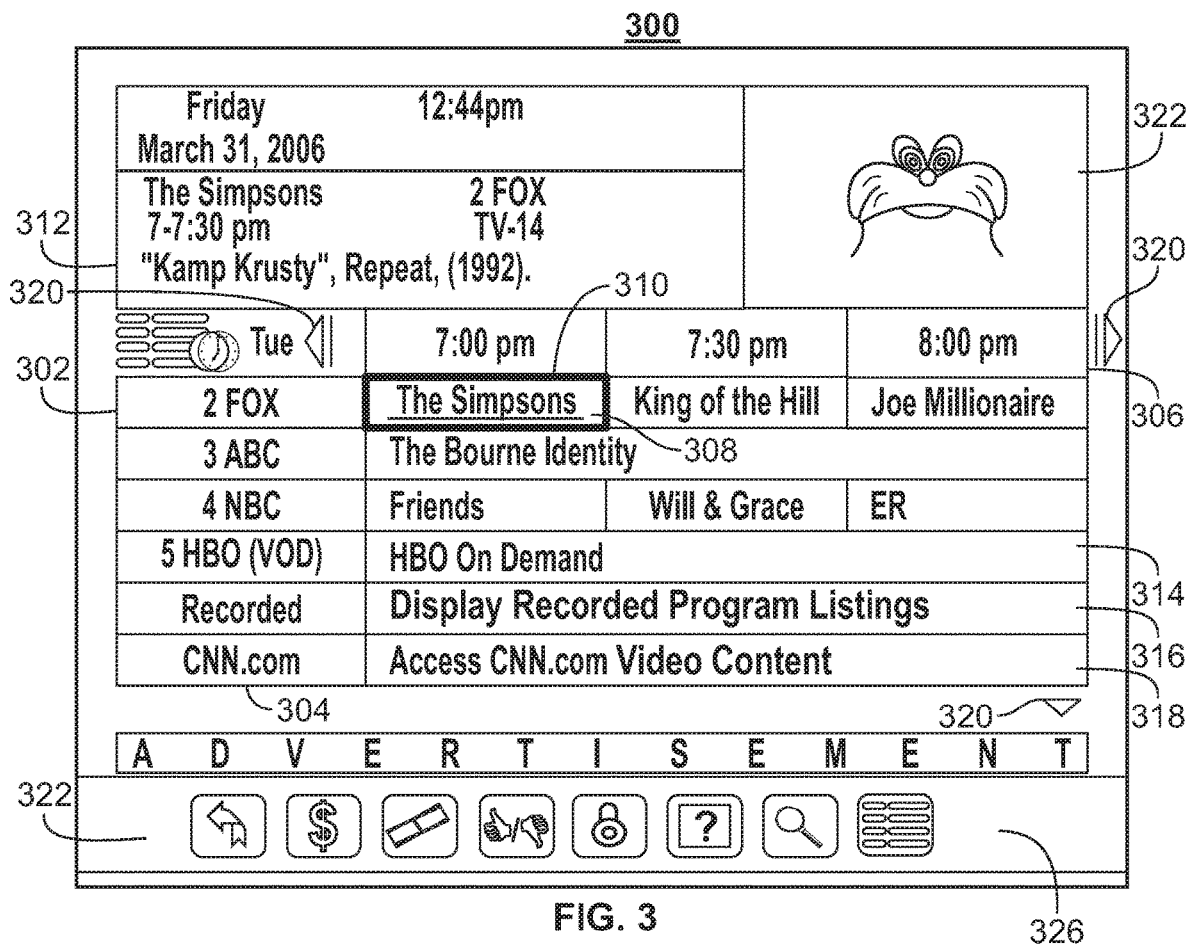
FIG. 3 shows an illustrative example of a display screen for use in accessing media content in accordance with some embodiments of the disclosure.
Figure 4:
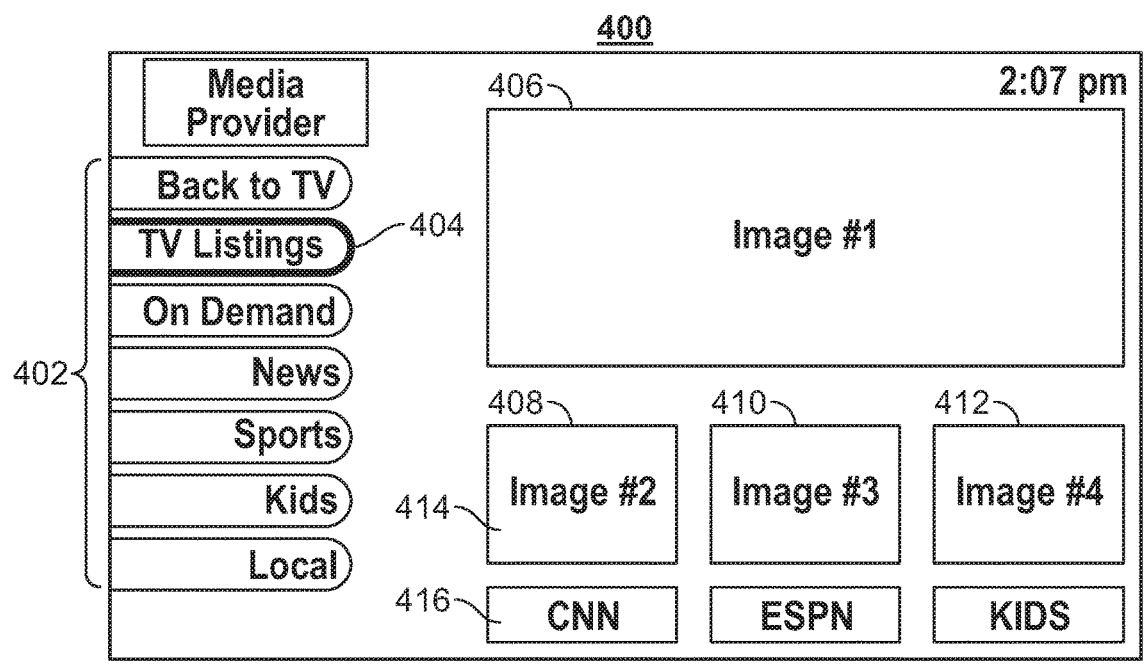
FIG. 4 shows another illustrative example of a display screen for use in accessing media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
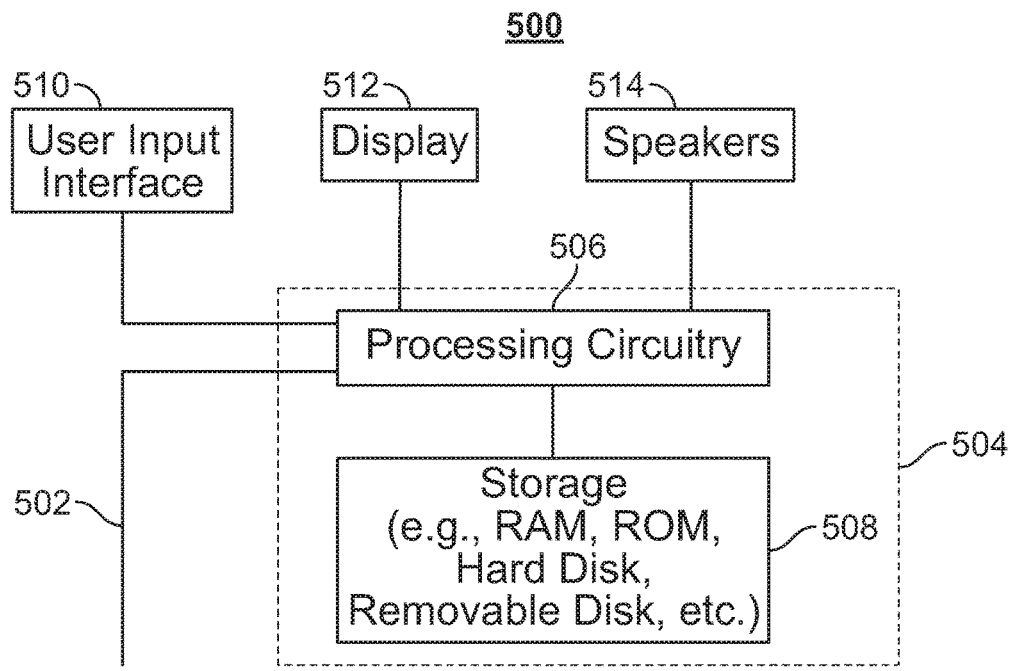
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
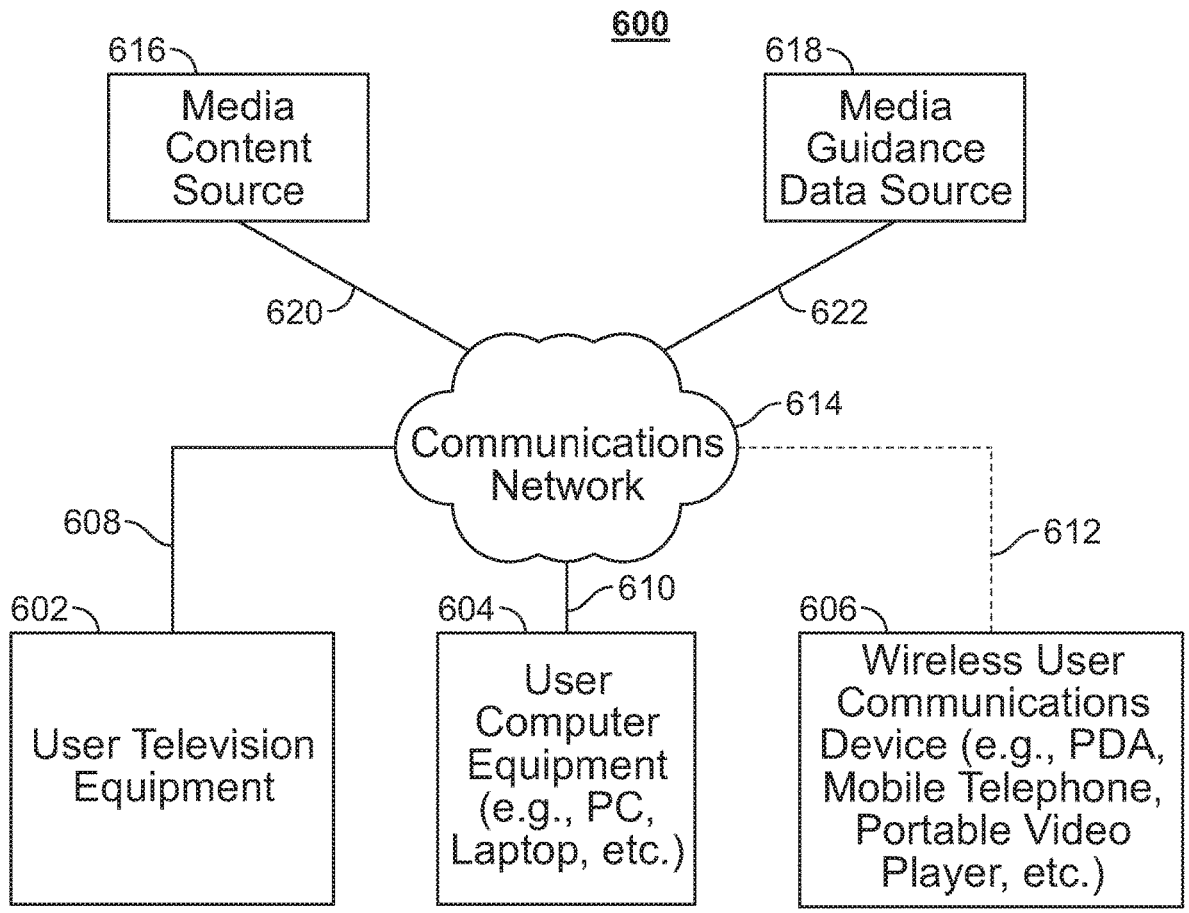
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some user television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

Figure 7:
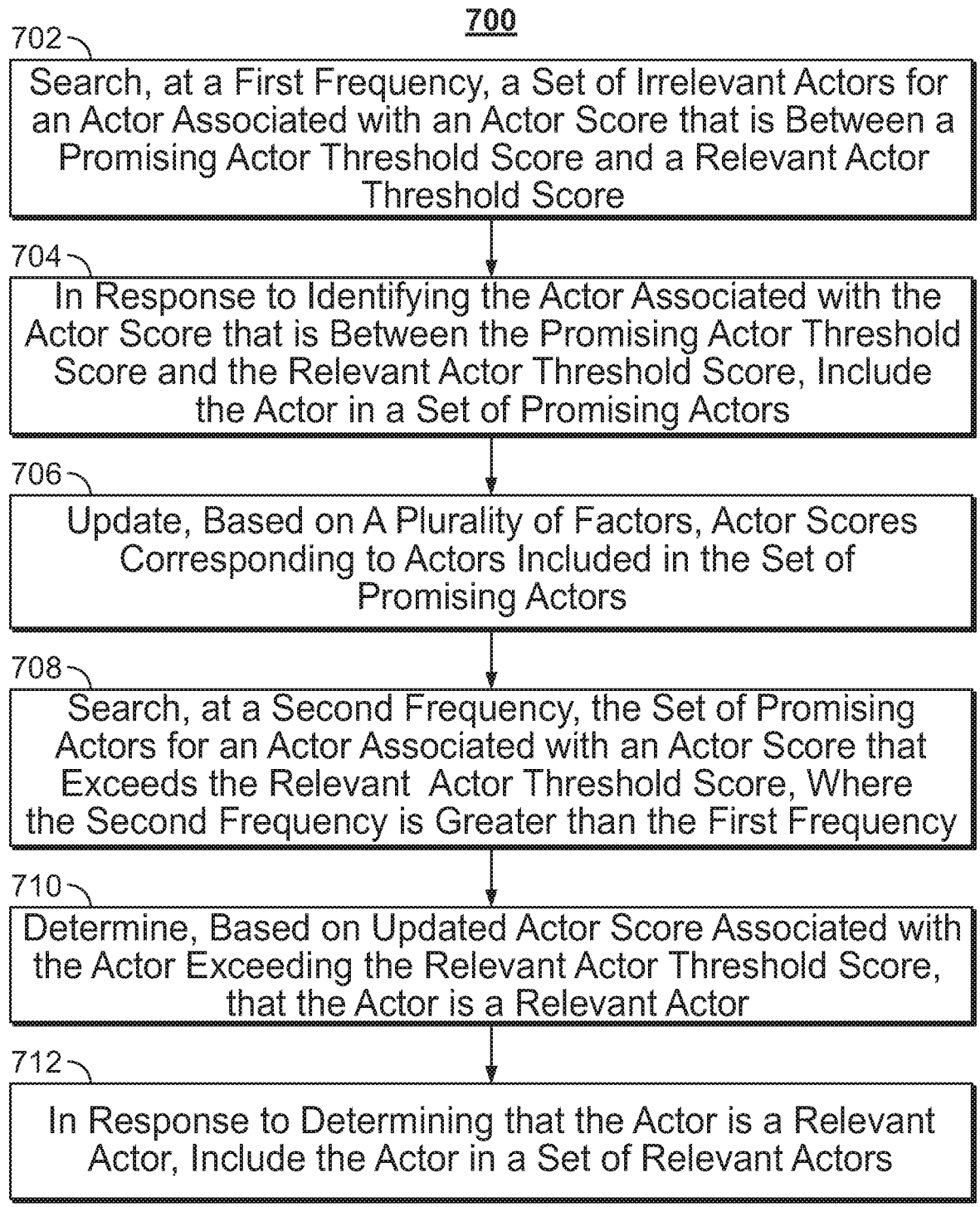
FIG. 7 is a flowchart of illustrative steps involved in determining a set of relevant actors from which to recommend an actor to a user, in accordance with some embodiments of the disclosure.

FIG. 7 is a flowchart of illustrative steps involved in determining a set of relevant actors from which to recommend an actor to a user, in accordance with some embodiments of the disclosure. Process 700 may be executed by control circuitry 504 (FIG. 5) as instructed by the media guidance application. Control circuitry 504 may be implemented on user equipment 602, 604, and/or 606 (FIG. 6). In addition, one or more actions of process 700 may be incorporated into or combined with one or more actions of any other process or embodiment.

Process 700 begins at 702, where control circuitry 504 searches, at a first frequency, a set of irrelevant actors for an actor associated with an actor score that is between a promising actor threshold score and a relevant actor threshold score. For example, control circuitry 504 may access a threshold parameters data structure, located at any of storage 508, media content source 616 and media guidance data source 618, and retrieve a promising actor threshold score of five and a relevant actor threshold score of seven. Control circuitry 504 may query (e.g., by using database management languages such as SQL, JAPQL, CODASYL or another suitable language) data structure 102 every six months for an entry associated with an actor score that is between five and seven. As an illustrative example, when control circuitry 504 performs this query at time 100, control circuitry 504 may receive, because the actor score associated with the actor Chris Pratt is six, entry 120 associated with actor Chris Pratt as a result of the query. Process 700 continues to 704, where control circuitry 504, in response to identifying the actor associated with the actor score that is between the promising actor threshold score and the relevant actor threshold score, includes the actor in a set of promising actors. Control circuitry 504 may delete entry 120 associated with Chris Pratt from data structure 102 (i.e., the set of irrelevant actors) and include an entry associated with "Chris Pratt" (entry 146) in data structure 104 (i.e., the set of promising actors). FIG. 1B depicts data structures 102, 104 and 106 following the update, at a time 150 later than time 100.

Process 700 continues to 706, where control circuitry 504 updates, based on a plurality of factors, actor scores corresponding to actors included in the set of promising actors. For example, control circuitry 504 may update the actor score of a given actor based on any of: the actor score assigned by a review source; number of media assets that the given actor has acted in; popularity of a media assets in which the given actor has acted; level of acting of the given actor; popularity of the given actor; salary of the given actor and number of pre-defined awards that the given actor has received. As an illustrative example, control circuitry 504 may update the value of the actor score 114 field of entry 146, associated with Chris Pratt, to eight. FIG. 1C depicts data structures 102, 104 and 106 following the update to Chris Pratt's actor score, at a time 160 later than time 150.

Process 700 continues to 708, where control circuitry 504 searches, at a second frequency, the set of promising actors for an actor associated with an actor score that exceeds the relevant actor threshold score, where the second frequency is greater than the first frequency. Following from the previous example, control circuitry 504 may query (e.g., by using database management languages such as SQL, JAPQL, CODASYL or another suitable language) data structure 104 (i.e., the set of promising actors) every month for an actor who is associated with an actor score that is greater than seven. Control circuitry 504 may receive, because the actor score associated with the actor Chris Pratt is eight, entry 146 associated with actor Chris Pratt as a result of the query. Process 700 continues to 710, where control circuitry 504 determines, based on the updated actor score associated with the actor exceeding the relevant actor threshold score, that the actor is a relevant actor. Control circuitry 504, upon receiving entry 146 as a result of the query, may determine that actor Chris Pratt is a relevant actor. Process 700 continues to 712, where control circuitry 504, in response to determining that the actor is a relevant actor, includes the actor in a set of relevant actors. For example, the media guidance application may delete entry 146 associated with Chris Pratt from data structure 104 (i.e., the set of promising actors) and include an entry associated with "Chris Pratt" in data structure 106. FIG. 1D depicts data structures 102, 104 and 106 following the update, at a time 170 later than time 160. Data structure 104 no longer includes an entry associated with Chris Pratt. Data structure 106 has been updated to include entry 148 associated with Chris Pratt.

Figure 8:
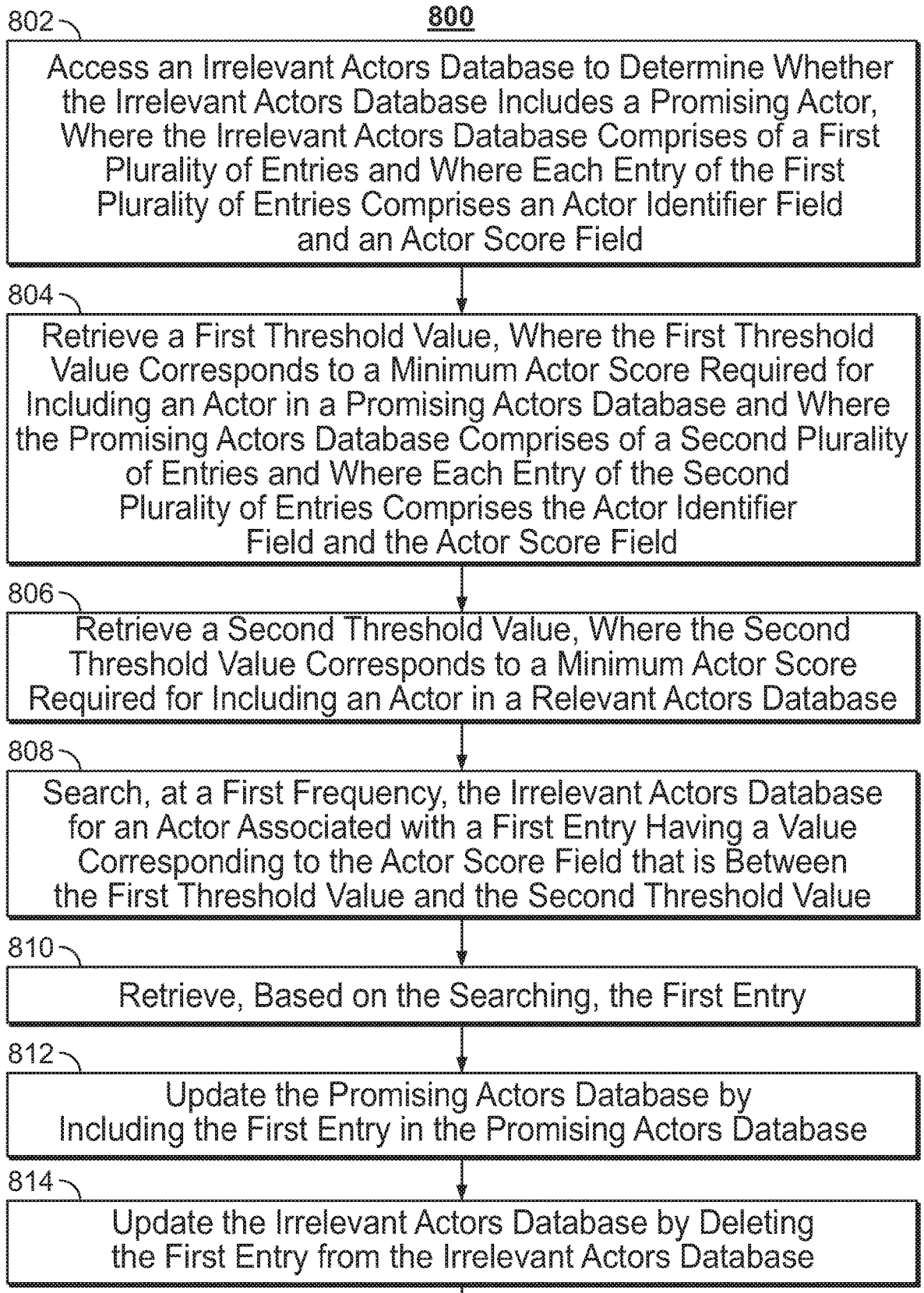
FIG. 8 is a flowchart of illustrative steps involved in recommending an actor based on entries in a particular database, in accordance with some embodiments of the disclosure.
Figure 8:
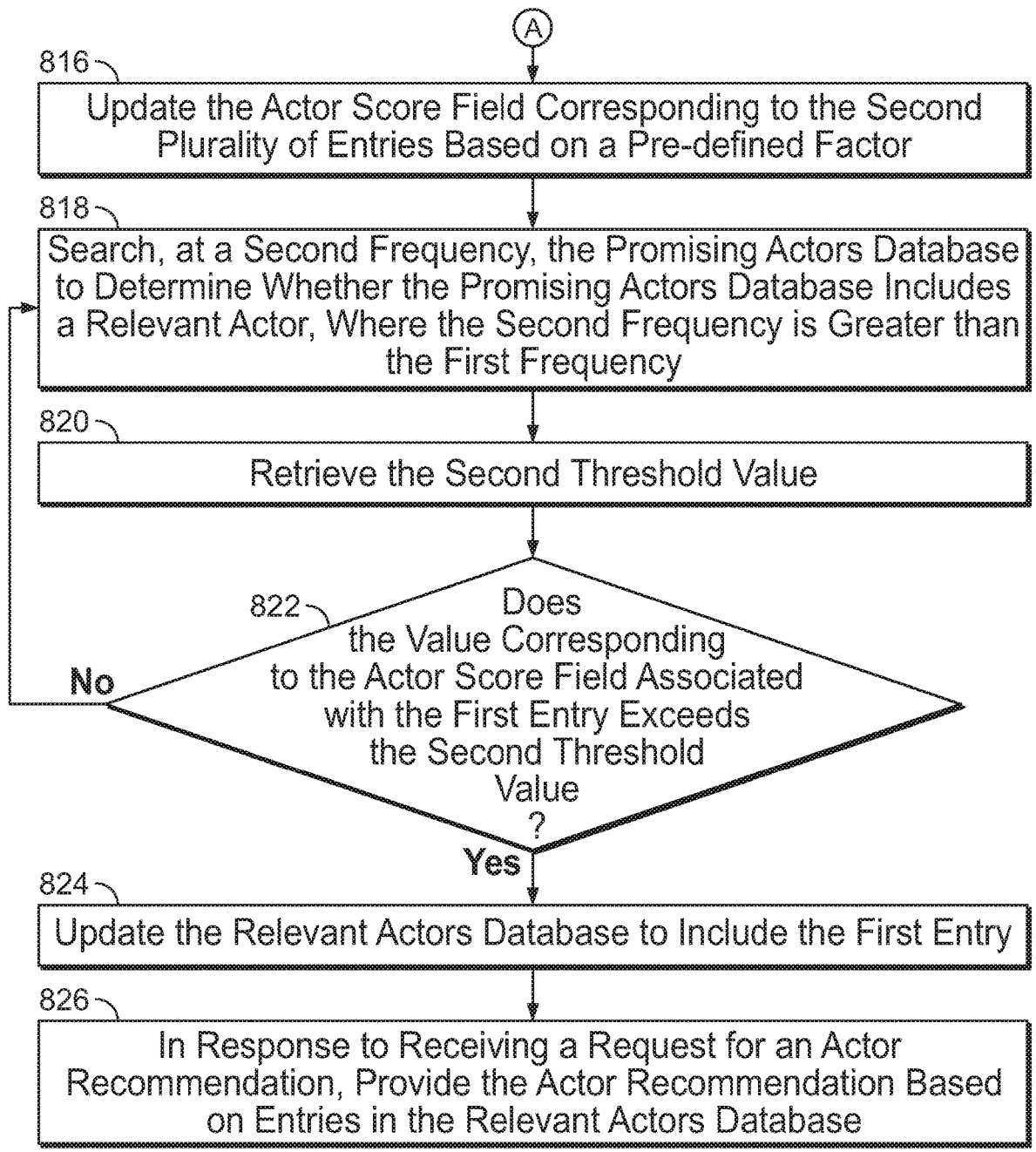

FIG. 8 is a flowchart of illustrative steps involved in recommending an actor based on entries in a particular database, in accordance with some embodiments of the disclosure. Process 800 may be executed by control circuitry 504 (FIG. 5) as instructed by the media guidance application. Control circuitry 504 may be implemented on user equipment 602, 604, and/or 606 (FIG. 6). In addition, one or more actions of process 800 may be incorporated into or combined with one or more actions of any other process or embodiment.

Process 800 begins at 802, where control circuitry 504 accesses an irrelevant actors database to determine whether the irrelevant actors database includes a promising actor, where the irrelevant actors database comprises of a first plurality of entries and where each entry of the first plurality of entries comprises an actor identifier field and an actor score field. As an illustrative example, at time 100, data structure 102 may include entries 120, 122, 124, 126, 128, 130 and 132. Each entry in data structure 102 may include an actor ID 108 field and an actor score 110 field. Process 800 continues to 804, where control circuitry 504 retrieves a first threshold value, where the first threshold value corresponds to a minimum actor score required for including an actor in a promising actors database and where the promising actors database comprises a second plurality of entries and where each entry of the second plurality of entries comprises the actor identifier field and the actor score field. For example, control circuitry 504 may access a threshold parameters data structure, located at any of storage 508, media content source 616 and media guidance data source 618, to retrieve the first threshold value of five. As an illustrative example, at time 100, data structure 104 (i.e., the promising actors database) may include entries 134, 136, 138 and 140. Each entry in data structure 104 may include an actor ID 112 field and an actor score 114 field.

Process 800 continues to 806, where control circuitry 504 retrieves a second threshold value, where the second threshold value corresponds to a minimum actor score required for including an actor in a relevant actors database. For example, control circuitry 504 may access the threshold parameters data structure and retrieve a second threshold value of seven. Process 800 continues to 808, where control circuitry 504 searches, at a first frequency, the irrelevant actors database for an actor associated with a first entry having a value corresponding to the actor score field that is between the first threshold value and the second threshold value. For example, control circuitry 504 may query (e.g., by using database management languages such as SQL, JAPQL, CODASYL or another suitable language) data structure 102 every six months for an actor who is associated with an actor score that is between five and seven. Process 800 continues to 810, where control circuitry 504 retrieves, based on the searching, the first entry. For example, control circuitry 504 may perform this query at time 100 and, because the actor score associated with the actor Chris Pratt is six, control circuitry 504 may receive entry 120 as a result of the query.

Process 800 continues to 812, where control circuitry 504 updates the promising actors database by including the first entry in the promising actors database. Process 800 continues to 804, where control circuitry 504 updates the irrelevant actors database by deleting the first entry from the irrelevant actors database. For example, control circuitry 504 may delete entry 120 associated with Chris Pratt from data structure 102 (i.e., the irrelevant actors database) and include an entry associated with "Chris Pratt" in data structure 104. FIG. 1B depicts data structures 102, 104 and 106 following the update, at a time 150 later than time 100. Data structure 102 no longer includes an entry associated with Chris Pratt. Data structure 104 has been updated to include entry 146 associated with Chris Pratt. Process 800 continues to 816, where control circuitry 504 updates the actor score field corresponding to the second plurality of entries based on a pre-defined factor. For example, control circuitry 504 may update the actor score of a given actor based on any of: actor score assigned by a review source; number of media assets that the given actor has acted in; popularity of a media assets in which the given actor has acted; level of acting of the given actor; popularity of the given actor; salary of the given actor and number of pre-defined awards that the given actor has received. As an illustrative example, control circuitry 504 may update, based on increased popularity of Chris Pratt's movies, the value of the actor score 114 field of entry associated with Chris Pratt (i.e., entry 146) to eight. FIG. 1C depicts data structures 102, 104 and 106 following the update to Chris Pratt's actor score, at a time 160 later than time 150.

Process 800 continues to 818, where control circuitry 504 searches, at a second frequency, the promising actors database to determine whether the promising actors database includes a relevant actor, where the second frequency is greater than the first frequency. Process 800 continues to 820, where control circuitry 504 retrieves the second threshold value. Process 800 continues to 822, where control circuitry 504 determines whether the value corresponding to the actor score field associated with the first entry exceeds the second threshold value. Following from the previous example, control circuitry 504 may retrieve a value of seven for the second threshold value. Control circuitry 504 may query (e.g., by using database management languages such as SQL, JAPQL, CODASYL or another suitable language) data structure 104 (i.e., the promising actors database) every month for all entries that are associated with actor scores greater than seven. Control circuitry 504 may receive, because the actor score associated with the actor Chris Pratt is eight, entry 146 as a result of the query. Accordingly, the media guidance application may determine that the actor score associated with the entry corresponding to Chris Pratt exceeds the second threshold value.

If, at 822, control circuitry 504 determines that the value corresponding to the actor score field associated with the first entry does not exceed the second threshold value, process 800 reverts to 818, where control circuitry 504 continues searching, at a second frequency, the promising actors database for a relevant actor. If, at 822, control circuitry 504 determines that the value corresponding to the actor score field associated with the first entry exceeds the second threshold value, process 800 continues to 824. At 824, control circuitry 504 updates the relevant actors database to include the first entry. For example, control circuitry 504 may delete entry 146 associated with Chris Pratt from data structure 104 (i.e., the promising actors database) and include an entry associated with "Chris Pratt" (entry 148) in data structure 106. FIG. 1D depicts data structures 102, 104 and 106 following the update, at a time 170 later than time 160. Data structure 104 no longer includes an entry associated with Chris Pratt. Data structure 106 has been updated to include entry 148 associated with Chris Pratt.

Process 800 continues to 826, where control circuitry 504, in response to receiving a request for an actor recommendation, provides the actor recommendation based on entries in the relevant actors database. Control circuitry 504 may receive, upon a user selecting, via user input interface 510 on any of user television equipment 602, user computer equipment 604 and wireless user communications device 606, a selectable "receive actor recommendations" option, a request from a user for an actor recommendation. Control circuitry 504 may then recommend an actor based on entries in the relevant actors database. For example, control circuitry 504 may recommend the actor Chris Pratt, who is now included in data structure 106 (i.e., the relevant actors database), but not Famke Janssen, who is included in data structure 102 (i.e., the irrelevant actors database).

Figure 9:
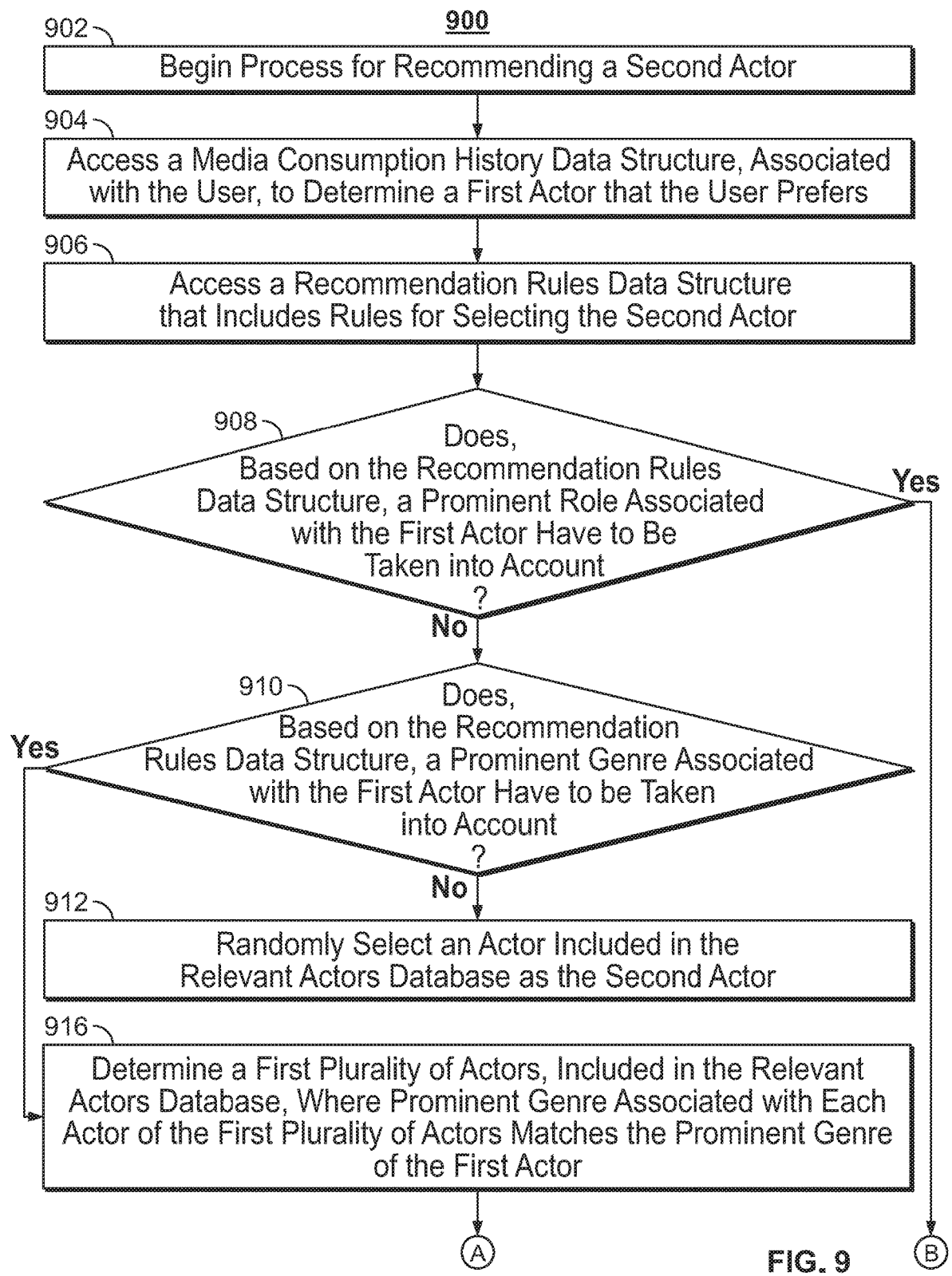
FIG. 9 is another flowchart of illustrative steps involved in recommending an actor based on entries in a particular database, in accordance with some embodiments of the disclosure.
Figure 9:
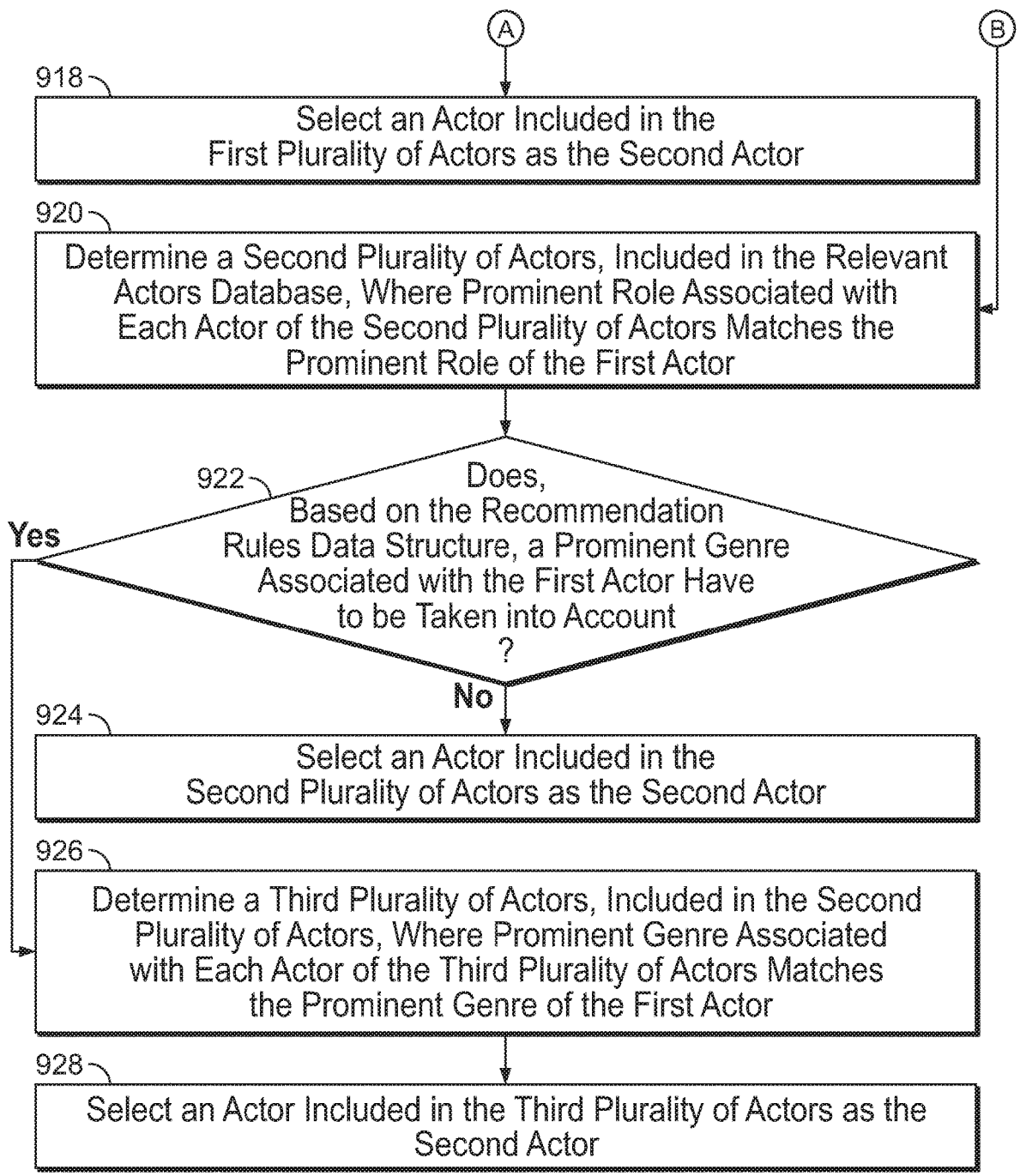

FIG. 9 is another flowchart of illustrative steps involved in recommending an actor based on entries in a particular database, in accordance with some embodiments of the disclosure. Process 900 may be executed by control circuitry 504 (FIG. 5) as instructed by the media guidance application. Control circuitry 504 may be implemented on user equipment 602, 604, and/or 606 (FIG. 6). In addition, one or more actions of process 900 may be incorporated into or combined with one or more actions of any other process or embodiment.

Process 900 begins at 902, where control circuitry 504 begins the process for recommending a second actor. Process 900 continues to 904, where control circuitry 504 accesses a media consumption history data structure, associated with the user, to determine a first actor that the user prefers. Control circuitry 504 may identify the media consumption history data structure (e.g., user's profile located at any of storage 508, media content source 616 and media guidance data source 618) associated with the user based on a unique identifier associated with the user. The media consumption history data structure of the user may include information about the user's media consumption habits. For example, the media consumption history data structure may include information about the user's preferred media assets, genre, actor, director, producer, content sources, review sources and other similar information. As a matter of example, control circuitry 504 may determine, based on a list of preferred actors included in user Teddy Jones' user profile, that user Teddy Jones likes the actor Leonardo DiCaprio.

Process 900 continues to 906, where control circuitry 504 accesses a recommendation rules data structure that includes rules for selecting the second actor. Process 900 continues to 908, where control circuitry 504 determines whether, based on the recommendation rules data structure, a prominent role associated with the first actor has to be taken into account. For example, control circuitry 504 may access the recommendation rules data structure, located at any of storage 508, media content source 616 and media guidance data source 618, and retrieve a flag associated with a "take prominent role into account" rule entry. Upon retrieving a false value for the flag, control circuitry 504 may determine that the prominent role associated with the first actor does not have to be taken into account. If, at 908, control circuitry 504 determines that the prominent role associated with the first actor does not have to be taken into account, process 900 continues to 910.

At 910, control circuitry 504 determines, based on the recommendation rules data structure, whether a prominent genre associated with the first actor has to be taken into account. For example, control circuitry 504 may retrieve a false flag associated with a "take prominent genre into account" rule entry and determine that the prominent genre associated with the first actor does not have to be taken into account. If, at 910, control circuitry 504 determines that the prominent genre associated with the first actor does not have to be taken into account, process 900 continues to 912. At 912, control circuitry 504 randomly selects an actor included in the relevant actors database as the second actor. For example, control circuitry 504 may randomly select, using a suitable random selection algorithm, entry 142 in data structure 106 and recommend actress Jennifer Lawrence.

If, at 910, control circuitry 504 determines that the prominent genre associated with the first actor has to be taken into account, process 900 continues to 916. At 916, control circuitry 504 determines a first plurality of actors, included in the relevant actors database, where the prominent genre associated with each actor of the first plurality of actors matches the prominent genre of the first actor. As an illustrative example, control circuitry 504 may retrieve, from a data structure associated with Leonardo DiCaprio, a prominent genre of drama for Leonardo DiCaprio. For example, each entry in the data structure 106 (e.g., the relevant actors database) may include an additional prominent genre field, where the value of the prominent genre field of a given entry is the most common genre corresponding to the actor associated with the given entry. Control circuitry 504 may query, in manners discussed previously in relation to querying databases for actors associated with a specific range of actor score, data structure 106 for entries that have a value of drama in the prominent genre field. As an illustrative example, control circuitry 504 may receive an entry associated with Chris Pratt (e.g., entry 148), an entry associated with Viola Davis, and an entry associated with Nicole Kidman as a result of the query. Process 900 continues to 918, where control circuitry 504 selects an actor included in the first plurality of actors as the second actor. For example, control circuitry 504 may select Viola Davis for recommending to the user.

If, at 908, control circuitry 504 determines that the prominent role associated with the first actor has to be taken into account, process 900 continues to 920. At 920, control circuitry 504 determines a second plurality of actors, included in the relevant actors database, where the prominent role associated with each actor of the second plurality of actors matches the prominent role of the first actor. As an illustrative example, control circuitry 504 may retrieve, from a data structure associated with Leonardo DiCaprio, a prominent role of leading actor for Leonardo DiCaprio. For example, each entry in the data structure 106 (e.g., the relevant actors database) may include an additional prominent role field, where the value of the prominent role field of a given entry is the most common genre corresponding to the actor associated with the given entry. Control circuitry 504 may query, in manners discussed previously in relation to querying databases for actors associated with a specific range of actor score, data structure 106 for entries that have a value of leading actor in the prominent role field. As an illustrative example, control circuitry 504 may receive an entry associated with Chris Pratt (e.g., entry 148), an entry associated with Jennifer Lawrence (e.g., entry 142), an entry associated with Shah Rukh Khan and an entry associated with Nicole Kidman as a result of the query.

Process 900 continues to 922, where control circuitry 504 determines, based on the recommendation rules data structure, whether a prominent genre associated with the first actor has to be taken into account. If, at 922, control circuitry 504 determines that the prominent genre associated with the first actor does not have to be taken into account, process 900 continues to 924. At 924, control circuitry 504 selects an actor included in the second plurality of actors as the second actor. Following from the example above, where the second plurality of actors includes Chris Pratt, Jennifer Lawrence, Shah Rukh Khan and Nicole Kidman, control circuitry 504 may select actor Chris Pratt to recommend to the user. If, at 922, control circuitry 504 determines that the prominent genre associated with the first actor has to be taken into account, process 900 continues to 926. At 926, control circuitry 504 determines a third plurality of actors, included in the second plurality of actors, where prominent genre associated with each actor of the third plurality of actors matches the prominent genre of the first actor. For example, control circuitry 504 may further query the entries corresponding to the second plurality of actors for entries that are associated with a value of drama in the prominent genre field. As an illustrative example, the prominent genre associated with Chris Pratt, Shah Rukh Khan, Jennifer Lawrence and Nicole Kidman may be drama, romantic comedy, action and drama respectively. In this case, control circuitry 504 may receive entries associated with Chris Pratt and Nicole Kidman as a result of the query.

Process 900 continues to 928, where control circuitry 504 selects an actor included in the third plurality of actors as the second actor. For example, control circuitry 504 may select Chris Pratt to recommend to the user.

Figure 10:
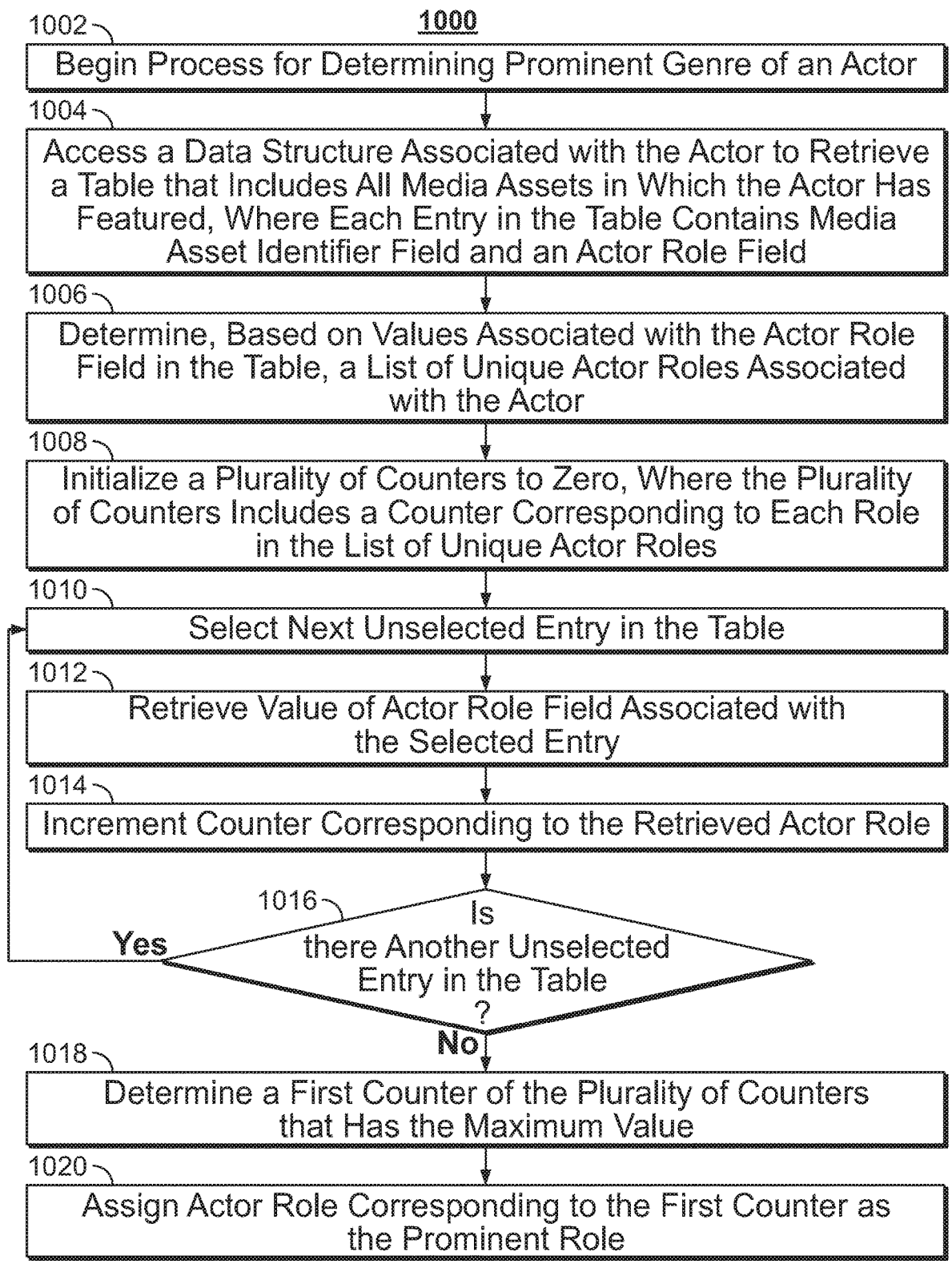
FIG. 10 is a flowchart of illustrative steps involved in determining a prominent genre of an actor, in accordance with some embodiments of the disclosure.

FIG. 10 is a flowchart of illustrative steps involved in determining a prominent genre of an actor, in accordance with some embodiments of the disclosure. Process 1000 may be executed by control circuitry 504 (FIG. 5) as instructed by the media guidance application. Control circuitry 504 may be implemented on user equipment 602, 604, and/or 606 (FIG. 6). In addition, one or more actions of process 1000 may be incorporated into or combined with one or more actions of any other process or embodiment.

Process 1000 begins at 1002, where control circuitry 504 begins the process for determining the prominent genre of an actor. Process 1000 continues to 1004, where control circuitry 504 accesses a data structure associated with the actor to retrieve a table that includes all media assets in which the actor has featured, where each entry in the table contains a media asset identifier field and an actor role field. As an illustrative example, control circuitry 504 may retrieve, for Leonardo DiCaprio, a table that includes ten movies (e.g., Leonardo DiCaprio movie table) as the complete table of all movies in which Leonardo DiCaprio has featured. The Leonardo DiCaprio movie table may also include, for each movie, a role of Leonardo DiCaprio in that movie. Process 1000 continues to 1006, where control circuitry 504 determines, based on values associated with the actor role field in the table, a list of unique actor roles associated with the actor. For example, control circuitry 504 may use a SQL SELECT DISTINCT operation to determine a list of unique roles included in the Leonardo DiCaprio movie table. As a matter of example, control circuitry 504 may determine unique roles of leading actor, supporting actor and cameo appearance.

Process 1000 continues to 1008, where control circuitry 504 initializes a plurality of counters to zero, where the plurality of counters includes a counter corresponding to each role in the list of unique actor roles. For example, control circuitry 504 may initialize leading actor counter, supporting actor counter and cameo appearance counter to zero. Process 1000 continues to 1010, where control circuitry 504 selects next unselected entry in the table. Process 1000 continues to 1012, where control circuitry 504 retrieves the value of the actor role field associated with the selected entry. Process 1000 continues to 1014, where control circuitry 504 increments counter corresponding to the retrieved actor role. For example, control circuitry 504 may select the first entry in the Leonardo DiCaprio movie table and determine that the actor role for the selected first entry is leading actor. Accordingly, control circuitry 504 may increment value of leading actor counter to one. Process 1000 continues to 1016, where control circuitry 504 determines whether there is another unselected entry in the table. In this instance, control circuitry 504 may determine that there are nine unselected entries in the Leonardo DiCaprio movie table. If, at 1016, control circuitry 504 determines that there is another unselected entry in the table, process 1000 reverts to 1010. For example, control circuitry 504 iterates through all entries in the Leonardo DiCaprio movie table and updates the appropriate counters.

If, at 1016, control circuitry 504 determines that there is no other unselected entry in the table, process 1000 continues to 1018. At 1018, control circuitry 504 determines a first counter of the plurality of counters that has the maximum value. Process 1000 continues to 1020, where control circuitry 504 assigns actor role corresponding to the first counter as the prominent role. For example, after control circuitry 504 has iterated through all entries in the Leonardo DiCaprio movie table, control circuitry 504 may execute a function that determines the counter with the maximum value. As an illustrative example, control circuitry 504 may determine that the counter corresponding to leading actor role has the maximum value and, accordingly, the media guidance application may determine that Leonardo DiCaprio's prominent role is leading actor.

Figure 11:
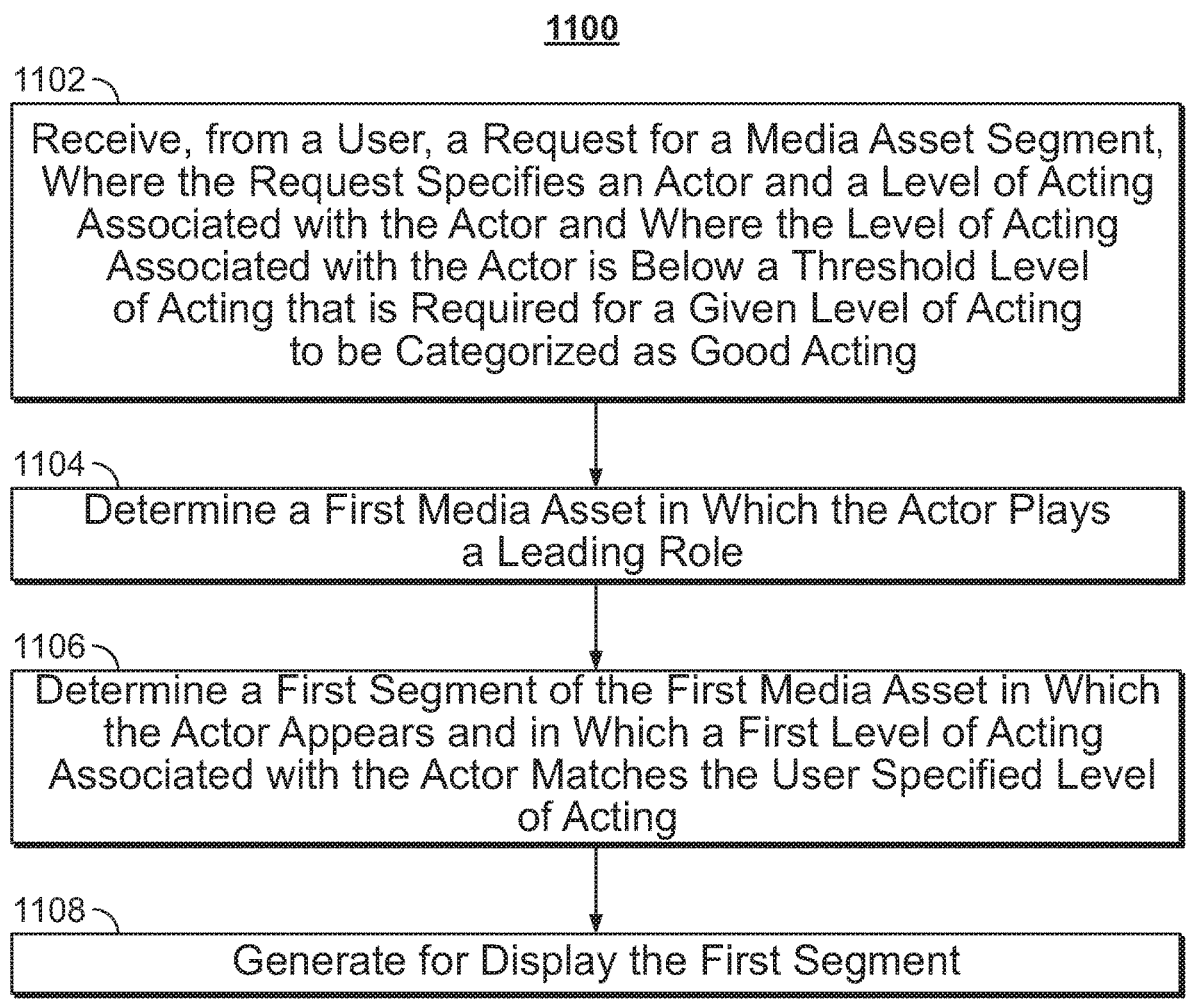
FIG. 11 is a flowchart of illustrative steps involved in providing segments of content associated with a pre-specified quality of acting, in accordance with some embodiments of the disclosure.

FIG. 11 is a flowchart of illustrative steps involved in providing segments of content associated with a pre-specified quality of acting, in accordance with some embodiments of the disclosure. Process 1100 may be executed by control circuitry 504 (FIG. 5) as instructed by the media guidance application. Control circuitry 504 may be implemented on user equipment 602, 604, and/or 606 (FIG. 6). In addition, one or more actions of process 1100 may be incorporated into or combined with one or more actions of any other process or embodiment.

Process 1100 begins at 1102 where control circuitry 504 receives, from a user, a request for a media asset segment, where the request specifies an actor and a level of acting associated with the actor and where the level of acting associated with the actor is below a threshold level of acting that is required for a given level of acting to be categorized as good acting. For example, control circuitry 504 may receive a user input, via display 220, that indicates that the user would like to view a movie clip associated with actor Chris Pratt (e.g., user enters "Chris Pratt" in text entry 204 option), where Chris Pratt's level of acting is "poor" (e.g., user selects selectable option 206).

Process 1100 continues to 1104, where control circuitry 504 determines a first media asset in which the actor plays a leading role. For example, control circuitry 504 may access a database (e.g., a media content data source database), located at any of storage 508, media content source 616 and media guidance data source 618, where each entry includes information about a movie, contributors to the movie and roles of the contributors in the movie (e.g., lead actor, supporting actor, director). Control circuitry 504 may then query the database, using database management languages (e.g., SQL, JAPQL, CODASYL or another suitable language), for an entry where actor Chris Pratt is a contributor and where the role of Chris Pratt is a lead actor. As an illustrative example, control circuitry 504 may use the SQL SELECT command to perform this query. Control circuitry 504 may receive an entry in which actor Chris Pratt is listed as a lead actor as a result of the query. As an illustrative example, control circuitry 504 may determine, based on the received entry, that Chris Pratt was a lead actor in the movie "Jurassic Park."

Process 1100 continues to 1106, where control circuitry 504 determines a first segment of the first media asset in which the actor appears and in which a first level of acting associated with the actor matches the user-specified level of acting. Process 1100 continues to 1108, where control circuitry 504 generates for display the first segment. As an illustrative example, control circuitry 504 may determine, based on metadata associated with "Jurassic Park," that Chris Pratt appears in media asset segment 216 of "Jurassic Park." Control circuitry 504 may determine, based on a review, that Chris Pratt's acting in media asset segment 216 of "Jurassic Park" is poor. Accordingly, control circuitry 504 may present media asset segment 216 of "Jurassic Park" to the user.

Figure 12:
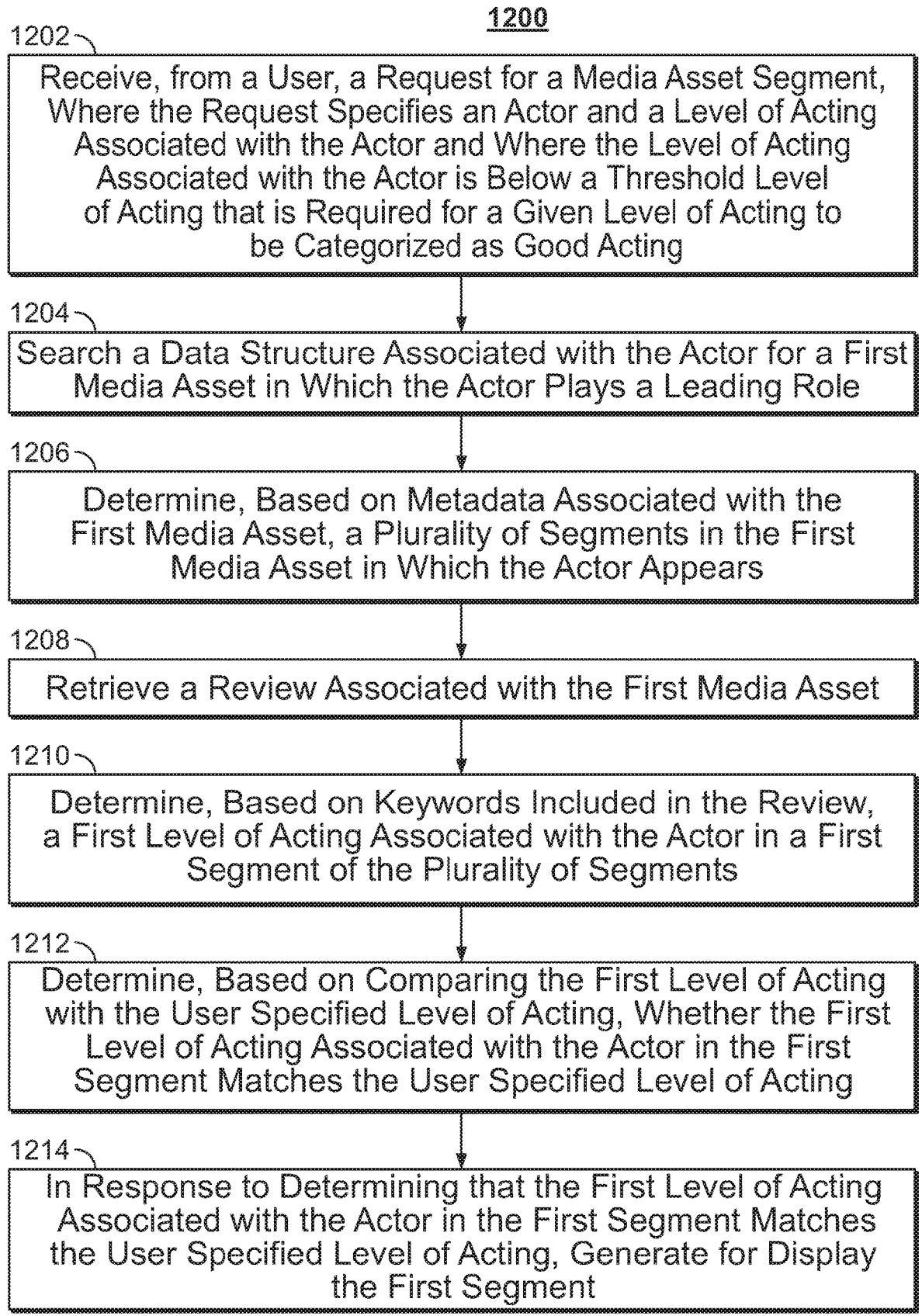
FIG. 12 is another flowchart of illustrative steps involved in providing segments of content associated with a pre-specified quality of acting, in accordance with some embodiments of the disclosure.

FIG. 12 is another flowchart of illustrative steps involved in providing segments of content associated with a pre-specified quality of acting, in accordance with some embodiments of the disclosure. Process 1200 may be executed by control circuitry 504 (FIG. 5) as instructed by the media guidance application. Control circuitry 504 may be implemented on user equipment 602, 604, and/or 606 (FIG. 6). In addition, one or more actions of process 1200 may be incorporated into or combined with one or more actions of any other process or embodiment.

Process 1200 begins at 1202, where control circuitry 504 receives, from a user, a request for a media asset segment, where the request specifies an actor and a level of acting associated with the actor and where the level of acting associated with the actor is below a threshold level of acting that is required for a given level of acting to be categorized as good acting. For example, control circuitry 504 may receive a user input, via display 220, that indicates that the user would like to view a movie clip associated with actor Chris Pratt (e.g., user enters "Chris Pratt" in text entry 204 option), where Chris Pratt's level of acting is "poor" (e.g., user selects selectable option 206).

Process 1200 continues to 1204, where control circuitry 504 searches a data structure associated with the actor for a first media asset in which the actor plays a leading role. For example, control circuitry 504 may access a database (e.g., a media content data source database), located at any of storage 508, media content source 616 and media guidance data source 618, where each entry includes information about a movie, contributors to the movie and roles of the contributors in the movie (e.g., lead actor, supporting actor, director). Control circuitry 504 may then query the database, using database management languages (e.g., SQL, JAPQL, CODASYL or another suitable language), for an entry where actor Chris Pratt is a contributor and where the role of Chris Pratt is a lead actor. As an illustrative example, control circuitry 504 may use the SQL SELECT command to perform this query. Control circuitry 504 may receive an entry in which actor Chris Pratt is listed as a lead actor as a result of the query. As an illustrative example, control circuitry 504 may determine, based on the received entry, that Chris Pratt was a lead actor in the movie "Jurassic Park."

Process 1200 continues to 1206, where control circuitry 504 determines, based on metadata associated with the first media asset, a plurality of segments in the first media asset in which the actor appears. For example, control circuitry 504 may parse metadata associated with "Jurassic Park" to retrieve start time and end time of each segment of "Jurassic Park" in which Chris Pratt appears. For example, control circuitry 504 may retrieve time codes (00:10:00:00) and (00:12:00:00) as start time and end time respectively of a first segment of "Jurassic Park" in which Chris Pratt appears. As an illustrative example, the first segment of "Jurassic Park" in which Chris Pratt appears may be media asset segment 216.

Process 1200 continues to 1208, where control circuitry 504 retrieves a review associated with the first media asset. Process 1200 continues to 1210, where control circuitry 504 determines, based on keywords included in the review, a first level of acting associated with the actor in a first segment of the plurality of segments. For example, control circuitry 504 may access a source, located at any of storage 508, media content source 616 and media guidance data source 618, that provides information about media assets to retrieve a review associated with "Jurassic Park." Control circuitry 504 may parse the review for a portion of the review that is associated with media asset segment 216. For example, control circuitry 504 may determine that the words "unrealistic" and "wooden" were used to describe Chris Pratt's acting in media asset segment 216.

As a matter of example, control circuitry 504 may use natural language processing to determine a degree of positivity corresponding to the keywords included in the review. The media guidance application may then access a look-up table that defines the relationship between a given degree of positivity and a corresponding level of acting to retrieve the first level of acting associated with the actor. For example, control circuitry 504 may determine a level of acting of two-and-a-half for Chris Pratt's acting in media asset segment 216 of "Jurassic Park."

Process 1200 continues to 1212, where control circuitry 504 determines, based on comparing the first level of acting with the user specified level of acting, whether the first level of acting associated with the actor in the first segment matches the user-specified level of acting. Process 1200 continues to 1214, where control circuitry 504, in response to determining that the first level of acting associated with the actor in the first segment matches the user-specified level of acting, generates for display the first segment. For example, control circuitry 504 may determine, based on comparing a determined level of acting (e.g., two-and-half) with the level of acting received from the user (e.g., "poor" acting corresponding to a range of zero through three level of acting), that Chris Pratt's acting in media asset segment 216 of "Jurassic Park" matches the user-specified level of acting. Accordingly, control circuitry 504 may display media asset segment 216 of "Jurassic Park" to the user in display 250.

Figure 13:
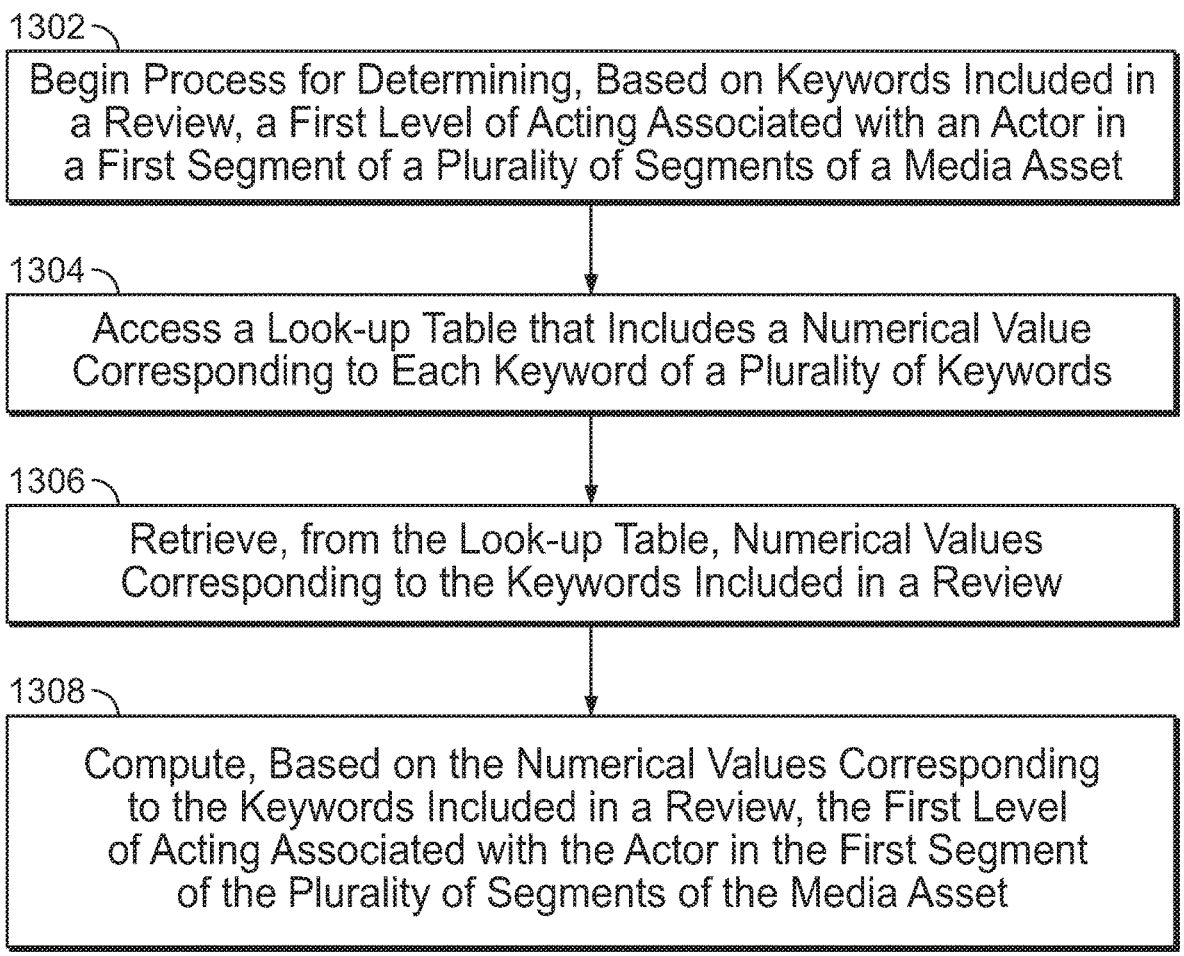
FIG. 13 is a flowchart of illustrative steps involved in computing, based on keywords included in a review, a level of acting associated with an actor in a given segment, in accordance with some embodiments of the disclosure.

FIG. 13 is a flowchart of illustrative steps involved in computing, based on keywords included in a review, a level of acting associated with an actor in a given segment, in accordance with some embodiments of the disclosure. Process 1300 may be executed by control circuitry 504 (FIG. 5) as instructed by the media guidance application. Control circuitry 504 may be implemented on user equipment 602, 604, and/or 606 (FIG. 6). In addition, one or more actions of process 1300 may be incorporated into or combined with one or more actions of any other process or embodiment.

Process 1300 begins at 1302, where control circuitry 504 begins a process for determining, based on keywords included in a review, a first level of acting associated with an actor in a first segment of a plurality of segments of a media asset. Process 1300 continues to 1304, where control circuitry 504 accesses a look-up table that includes a numerical value corresponding to each keyword of a plurality of keywords. For example, control circuitry 504 may access a look-up table, located at any of storage 508, media content source 616 and media guidance data source 618, containing numerical values corresponding to different keywords to determine a score associated with a given keyword. As an illustrative example, a look-up table may contain values, corresponding to keywords, on a scale of zero to ten, where a higher value corresponds to a higher quality of acting.

Process 1300 continues to 1306, where control circuitry 504 retrieves, from the look-up table, numerical values corresponding to the keywords included in a review. For example, control circuitry 504 may determine that the words "unrealistic" and "wooden" were used, in a review, to describe Chris Pratt's acting in media asset segment 216. Control circuitry 504 may retrieve values of two and three corresponding to the keywords "unrealistic" and "wooden" respectively. Process 1300 continues to 1308, where control circuitry 504 computes, based on the numerical values corresponding to the keywords included in a review, the first level of acting associated with the actor in the first segment of the plurality of segments of the media asset. As an illustrative example, control circuitry 504 may use a formula that averages scores associated with keywords to compute the first level of acting in the first segment. Based on values of two and three corresponding to the keywords "unrealistic" and "wooden" respectively, control circuitry 504 may compute a level of acting of two-and-a-half for Chris Pratt's acting in media asset segment 216 of "Jurassic Park."

It is contemplated that the steps or descriptions of FIGS. 7-13 may be used with any other embodiment of this disclosure. In addition, the steps and descriptions described in relation to FIG. 7-13 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending actors based on entries in a particular database, the method comprising:
    accessing an irrelevant actors database to determine whether the irrelevant actors database includes a promising actor, wherein the irrelevant actors database comprises a first plurality of entries, and wherein each entry of the first plurality of entries comprises an actor identifier field and an actor score field;
    retrieving a first threshold value, wherein the first threshold value corresponds to a minimum actor score required for including an actor in a promising actors database, wherein the promising actors database comprises a second plurality of entries, and wherein each entry of the second plurality of entries comprises the actor identifier field and the actor score field;
    retrieving a second threshold value, wherein the second threshold value corresponds to a minimum actor score required for including an actor in a relevant actors database;
    searching, at a first frequency, the irrelevant actors database for an actor associated with a first entry having a value corresponding to the actor score field that is between the first threshold value and the second threshold value;
    retrieving, based on the searching, the first entry;
    updating the promising actors database by including the first entry in the promising actors database;
    updating the irrelevant actors database by deleting the first entry from the irrelevant actors database;
    updating the actor score field corresponding to the second plurality of entries based on a pre-defined factor;
    searching, at a second frequency, the promising actors database to determine whether the promising actors database includes a relevant actor, wherein the second frequency is greater than the first frequency;
    retrieving the second threshold value;
    determining whether the value corresponding to the actor score field associated with the first entry exceeds the second threshold value;
    in response to determining that the value corresponding to the actor score field associated with the first entry exceeds the second threshold value, updating the relevant actors database to include the first entry; and
    in response to receiving a request for an actor recommendation, providing the actor recommendation based on entries in the relevant actors database.

2. The method of claim 1, further comprising:
    searching, at the first frequency, the irrelevant actors database for a second actor associated with a second entry having a value corresponding to the actor score field exceeds the second threshold value;
    retrieving, based on the searching for the second actor associated with a second entry, the second entry;
    updating the relevant actors database by including the second entry in the relevant actors database; and
    updating the irrelevant actors database by deleting the second entry from the irrelevant actors database.

3. The method of claim 1, further comprising:
    searching, at a third frequency, the relevant actors database for a third actor associated with a third entry having a value corresponding to the actor score field that is less than the second threshold value;
    retrieving, based on the searching for the third actor associated with a third entry, the third entry;
    determining whether the value corresponding to the actor score field of the third entry is less than the first threshold value;
    in response to determining that the value corresponding to the actor score field of the third entry is less than the first threshold value, updating the irrelevant actors database by including the third entry in the irrelevant actors database;
    in response to determining that the value corresponding to the actor score field of the third entry is not less than the first threshold value, updating the promising actors database by including the third entry in the promising actors database; and
    updating the relevant actors database by deleting the third entry from the relevant actors database.

4. The method of claim 1, wherein the pre-defined factor based on which the actor score field associated with a given entry of the second plurality of entries is updated includes any of:
    a score assigned to a given actor, corresponding to the given entry, by a review source;
    number of media assets that the given actor has acted in;
    popularity of a media asset in which the given actor has acted;
    level of acting of the given actor;
    popularity of the given actor;
    salary of the given actor; and
    number of pre-defined awards that the given actor has received.

5. The method of claim 1, wherein updating the actor score field corresponding to a given entry of the second plurality of entries based on the pre-defined factor further comprises:
    retrieving a first actor score assigned to a given actor, corresponding to the given entry, by a first review source;
    retrieving a first importance level associated with the first review source, wherein the first importance level is an indicator of how important inclusion of the first actor score is in the computation of a new actor score corresponding to the given actor;
    retrieving a second score assigned to the given actor by a second review source;
    retrieving a second importance level associated with the second review source, wherein the second importance level is an indicator of how important inclusion of the second actor score is in the computation of the new actor score corresponding to the given actor and wherein the second importance level is less than the first importance level;
    computing the new actor score, wherein the new actor score is a weighted average of the first actor score and the second actor score and wherein the first actor score is weighted greater than the second actor score; and
    updating value of the actor score field corresponding to the given entry to the new actor score.

6. The method of claim 5, wherein the first importance level is based on any of:
    popularity of the first review source;
    accuracy of the first review source;

entity providing the first review source; and
a user preference.

7. The method of claim 1, wherein providing the actor recommendation based on entries in the relevant actors database further comprises:
determining a user associated with the request for the actor recommendation;
accessing a media consumption history data structure, associated with the user, to determine a first actor that the user prefers;
determining a prominent role associated with the first actor, wherein the prominent role associated with the first actor is most common role of the first actor;
determining a plurality of actors, included in the relevant actors database, wherein prominent role associated with each actor of the plurality of actors matches the prominent role of the first actor; and
recommending a second actor of the plurality of actors.

8. The method of claim 7, wherein recommending the second actor of the plurality of actors further comprises:
determining a prominent genre associated with the first actor, wherein the prominent genre associated with the first actor is most common genre associated with the first actor;
determining an actor of the plurality of actors, wherein prominent genre associated with the actor of the plurality of actors matches the prominent genre associated with the first actor; and
selecting the actor of the plurality of actors as the second actor.

9. The method of claim 7, wherein recommending the second actor of the plurality of actors further comprises:
determining a prominent media asset industry associated with the first actor, wherein the prominent media asset industry associated with the first actor is most common media asset industry associated with the first actor;
determining an actor of the plurality of actors, wherein prominent media asset industry associated with the actor of the plurality of actors matches the prominent media asset industry associated with the first actor; and
selecting the actor of the plurality of actors as the second actor.

10. The method of claim 7, wherein determining the prominent role associated with the first actor comprises:
determining a first media asset in which the first actor appears;
retrieving a first credit list associated with the first media asset, wherein the first credit lists all actors appearing in the first media asset;
determining a first position of the first actor in the first credit list and a total number of actors in the first credit list;
computing a first rank percentage of the first actor based on the first position of the first actor in the first credit list and the total number of actors in the first credit list;
determining a second media asset in which the first actor appears;
retrieving a second credit list associated with the second media asset, wherein the second credit lists all actors appearing in the second media asset;
determining a second position of the first actor in the second credit list and a total number of actors in the second credit list;
computing a second rank percentage of the first actor based on the second position of the first actor in the second credit list and the total number of actors in the second credit list;
computing, based on the first rank percentage and the second rank percentage, an average rank percentage of the first actor;
retrieving a role probability distribution wherein the role probability distribution provides probabilities of various roles in media assets;
determining a first role associated with the role probability distribution that has a cumulative probability range that includes the average rank percentage of the first actor; and
selecting the first role as the prominent role.

11. A system for recommending actors based on entries in a particular database, the system comprising:
control circuitry configured to:
access an irrelevant actors database to determine whether the irrelevant actors database includes a promising actor, wherein the irrelevant actors database comprises a first plurality of entries, and wherein each entry of the first plurality of entries comprises an actor identifier field and an actor score field;
retrieve a first threshold value, wherein the first threshold value corresponds to a minimum actor score required for including an actor in a promising actors database, wherein the promising actors database comprises a second plurality of entries, and wherein each entry of the second plurality of entries comprises the actor identifier field and the actor score field;
retrieve a second threshold value, wherein the second threshold value corresponds to a minimum actor score required for including an actor in a relevant actors database;
search, at a first frequency, the irrelevant actors database for an actor associated with a first entry having a value corresponding to the actor score field that is between the first threshold value and the second threshold value;
retrieve, based on the searching, the first entry;
update the promising actors database by including the first entry in the promising actors database;
update the irrelevant actors database by deleting the first entry from the irrelevant actors database;
update the actor score field corresponding to the second plurality of entries based on a pre-defined factor;
search, at a second frequency, the promising actors database to determine whether the promising actors database includes a relevant actor, wherein the second frequency is greater than the first frequency;
retrieve the second threshold value;
determine whether the value corresponding to the actor score field associated with the first entry exceeds the second threshold value;
in response to determining that the value corresponding to the actor score field associated with the first entry exceeds the second threshold value, update the relevant actors database to include the first entry; and
in response to receiving a request for an actor recommendation, provide the actor recommendation based on entries in the relevant actors database.

12. The system of claim 11, wherein the control circuitry is further configured to:
search, at the first frequency, the irrelevant actors database for a second actor associated with a second entry having a value corresponding to the actor score field exceeds the second threshold value;
retrieve, based on the searching for the second actor associated with a second entry, the second entry;
update the relevant actors database by including the second entry in the relevant actors database; and update the irrelevant actors database by deleting the second entry from the irrelevant actors database.

13. The system of claim 11, wherein the control circuitry is further configured to:
search, at a third frequency, the relevant actors database for a third actor associated with a third entry having a value corresponding to the actor score field that is less than the second threshold value;
retrieve, based on the searching for the third actor associated with a third entry, the third entry;
determine whether the value corresponding to the actor score field of the third entry is less than the first threshold value;
in response to determining that the value corresponding to the actor score field of the third entry is less than the first threshold value, update the irrelevant actors database by including the third entry in the irrelevant actors database;
in response to determining that the value corresponding to the actor score field of the third entry is not less than the first threshold value, update the promising actors database by including the third entry in the promising actors database; and
update the relevant actors database by deleting the third entry from the relevant actors database.

14. The system of claim 11, wherein the pre-defined factor based on which the actor score field associated with a given entry of the second plurality of entries is updated includes any of:
a score assigned to a given actor, corresponding to the given entry, by a review source;
number of media assets that the given actor has acted in;
popularity of a media asset in which the given actor has acted;
level of acting of the given actor;
popularity of the given actor;
salary of the given actor; and
number of pre-defined awards that the given actor has received.

15. The system of claim 11, wherein the control circuitry is further configured, when updating the actor score field corresponding to a given entry of the second plurality of entries based on the pre-defined factor, to:
retrieve a first actor score assigned to a given actor, corresponding to the given entry, by a first review source;
retrieve a first importance level associated with the first review source, wherein the first importance level is an indicator of how important inclusion of the first actor score is in the computation of a new actor score corresponding to the given actor;
retrieve a second score assigned to the given actor by a second review source;
retrieve a second importance level associated with the second review source, wherein the second importance level is an indicator of how important inclusion of the second actor score is in the computation of the new actor score corresponding to the given actor and wherein the second importance level is less than the first importance level;
compute the new actor score, wherein the new actor score is a weighted average of the first actor score and the second actor score and wherein the first actor score is weighted greater than the second actor score; and
update value of the actor score field corresponding to the given entry to the new actor score.

16. The system of claim 15, wherein the first importance level is based on any of:
popularity of the first review source;
accuracy of the first review source;
entity providing the first review source; and
a user preference.

17. The system of claim 11, wherein the control circuitry is further configured, when providing the actor recommendation based on entries in the relevant actors database, to:
determine a user associated with the request for the actor recommendation;
access a media consumption history data structure, associated with the user, to determine a first actor that the user prefers;
determine a prominent role associated with the first actor, wherein the prominent role associated with the first actor is most common role of the first actor;
determine a plurality of actors, included in the relevant actors database, wherein prominent role associated with each actor of the plurality of actors matches the prominent role of the first actor; and
recommend a second actor of the plurality of actors.

18. The system of claim 17, wherein the control circuitry is further configured, when recommending the second actor of the plurality of actors, to:
determine a prominent genre associated with the first actor, wherein the prominent genre associated with the first actor is most common genre associated with the first actor;
determine an actor of the plurality of actors, wherein prominent genre associated with the actor of the plurality of actors matches the prominent genre associated with the first actor; and
select the actor of the plurality of actors as the second actor.

19. The system of claim 17, wherein the control circuitry is further configured, when recommending the second actor of the plurality of actors, to:
determine a prominent media asset industry associated with the first actor, wherein the prominent media asset industry associated with the first actor is most common media asset industry associated with the first actor;
determine an actor of the plurality of actors, wherein prominent media asset industry associated with the actor of the plurality of actors matches the prominent media asset industry associated with the first actor; and
select the actor of the plurality of actors as the second actor.

20. The system of claim 17, wherein the control circuitry is configured, when determining the prominent role associated with the first actor, to:
determine a first media asset in which the first actor appears;
retrieve a first credit list associated with the first media asset, wherein the first credit lists all actors appearing in the first media asset;
determine a first position of the first actor in the first credit list and a total number of actors in the first credit list;
compute a first rank percentage of the first actor based on the first position of the first actor in the first credit list and the total number of actors in the first credit list;
determine a second media asset in which the first actor appears;
retrieve a second credit list associated with the second media asset, wherein the second credit lists all actors appearing in the second media asset;

determine a second position of the first actor in the second credit list and a total number of actors in the second credit list;
compute a second rank percentage of the first actor based on the second position of the first actor in the second credit list and the total number of actors in the second credit list;
compute, based on the first rank percentage and the second rank percentage, an average rank percentage of the first actor;
retrieve a role probability distribution wherein the role probability distribution provides probabilities of various roles in media assets;
determine a first role associated with the role probability distribution that has a cumulative probability range that includes the average rank percentage of the first actor; and
select the first role as the prominent role.

* * * * *